United States Patent
Mae et al.

(10) Patent No.: US 8,995,816 B2
(45) Date of Patent: Mar. 31, 2015

(54) RECORDING APPARATUS, RECORDING METHOD, AND RECORDING PROGRAM, AND IMAGE CAPTURING APPARATUS, IMAGE CAPTURING METHOD AND IMAGE CAPTURING PROGRAM

(75) Inventors: Atsushi Mae, Kanagawa (JP); Kenichiro Aridome, Kanagawa (JP); Yukio Isobe, Kanagawa (JP); Naoki Morimoto, Tokyo (JP)

(73) Assignee: Sony Corporation (JP)

( * ) Notice: Subject to any disclaimer, the term of this patent is extended or adjusted under 35 U.S.C. 154(b) by 1684 days.

(21) Appl. No.: 11/988,978

(22) PCT Filed: May 10, 2007

(86) PCT No.: PCT/JP2007/060081
§ 371 (c)(1),
(2), (4) Date: Jan. 16, 2008

(87) PCT Pub. No.: WO2007/135932
PCT Pub. Date: Nov. 29, 2007

(65) Prior Publication Data
US 2009/0263103 A1 Oct. 22, 2009

(30) Foreign Application Priority Data

May 18, 2006 (JP) ................. P2006-138701

(51) Int. Cl.
*H04N 9/80* (2006.01)
*H04N 9/82* (2006.01)
(Continued)

(52) U.S. Cl.
CPC ............ *H04N 9/8205* (2013.01); *G11B 27/105* (2013.01); *G11B 27/322* (2013.01); *G11B 2220/2541* (2013.01)
USPC ......................................... 386/239; 386/241

(58) Field of Classification Search
USPC ................ 386/239, 241, 242, 286; 369/30.08
See application file for complete search history.

(56) References Cited

U.S. PATENT DOCUMENTS 5,949,955 A 9/1999 Nakai
7,283,429 B2 * 10/2007 Suzuki ....................... 369/30.09
(Continued)

FOREIGN PATENT DOCUMENTS

EP 1441351 A2 7/2004
EP 1523184 A1 4/2005
(Continued)

OTHER PUBLICATIONS

Search Report from corresponding SG Application 200800681-9 dated Jun. 25, 2009.

*Primary Examiner* — Ashok Patel
*Assistant Examiner* — Daniel Potratz
(74) *Attorney, Agent, or Firm* — Lerner, David, Littenberg, Krumholz & Mentlik, LLP

(57) ABSTRACT

To improve user-friendliness in recording AV data created after recording is started until it is stopped as a file. AV data that are created after recording is started until it is stopped are recorded as a file. Information that represents a reproduction region and mark information that represents a jump position are additionally written to a reproduction list file. At this point, it is determined whether or not restrictions that have been set to the reproduction list file and an attribute file for additional writing are satisfied on the basis of the reproduction list file as an additionally writable candidate and the attribute file that correlates reproduction time and address of the AV data. When having been determined that they be satisfied, the reproduction region information and the mark information are additionally written to the reproduction list file as the additionally writable candidate. When having been determined that they be not satisfied, a new reproduction list file is created. As a result, the user can perform a recording operation for the AV data without necessity of recognizing the restrictions that have been set to the reproduction list file and the attribute file.

47 Claims, 53 Drawing Sheets

(51) Int. Cl.
   *G11B 27/10* (2006.01)
   *G11B 27/32* (2006.01)

(56) References Cited

U.S. PATENT DOCUMENTS

| | | | |
|---|---|---|---|
| 7,660,512 B2 * | 2/2010 | Kellner et al. | 386/326 |
| 7,668,842 B2 * | 2/2010 | LaChapelle et al. | 707/999.1 |
| 7,835,622 B2 * | 11/2010 | Seo et al. | 386/241 |
| 2005/0175321 A1 | 8/2005 | Aridome et al. | |
| 2006/0265421 A1 * | 11/2006 | Ranasinghe et al. | 707/104.1 |
| 2007/0014536 A1 * | 1/2007 | Hellman | 386/94 |

FOREIGN PATENT DOCUMENTS

| | | |
|---|---|---|
| JP | 2004-350251 A | 12/2004 |
| JP | 2005-027159 A | 1/2005 |
| JP | 2005-317076 A | 11/2005 |
| WO | WO-2006/030767 A1 | 3/2006 |

* cited by examiner

Fig. 6

| SYNTAX | DATA LENGTH (BITS) | MNEMONIC |
|---|---|---|
| Index table file { | | |
|     TypeIndicator | 8 * 4 | bslbf |
|     TypeIndicator2 | 8 * 4 | bslbf |
|     IndexesStartAddress | 32 | uimsbf |
|     ExtensionDataStartAddress | 32 | uimsbf |
|     reserved | 192 | bslbf |
|     blkAppInfoBDMV() | | |
|     for (i=0; i<N1; i++) { | | |
|         padding_word | 16 | bslbf |
|     } | | |
|     blkIndexes() | | |
|     for (i=0; i<N2; i++) { | | |
|         padding_word | 16 | bslbf |
|     } | | |
|     blkExtensionData() | | |
|     for (i=0; i<N3; i++) { | | |
|         padding_word | 16 | bslbf |
|     } | | |
| } | | |

Fig. 7

| SYNTAX | DATA LENGTH (BITS) | MNEMONIC |
|---|---|---|
| blkIndexes() { | | |
|     Length | 32 | uimsbf |
|     FirstPlaybackTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         FirstPlaybackTitleMobjIDRef | 16 | uimsbf |
|         reserved | 32 | bslbf |
|     } | | |
|     MenuTitle() { | | |
|         reserved | 1 | bslbf |
|         '1' | 1 | bslbf |
|         reserved | 31 | bslbf |
|         '1' | 1 | bslbf |
|         reserved | 14 | bslbf |
|         MenuTitleMobjIDRef | 16 | uimsbf |
|         reserved | 32 | bslbf |
|     } | | |
|     NumberOfTitles | 16 | uimsbf |
|     for (title_id=0; title_id < NumberOfTitles; title_id++) { | | |
|         MovieTitle[title_id]() { | | |
|             reserved | 1 | bslbf |
|             '1' | 1 | bslbf |
|             reserved | 46 | bslbf |
|             MovieTitleMobjIDRef[title_id] | 16 | uimsbf |
|             reserved | 32 | bslbf |
|         } | | |
|     } | | |
| } | | |

*Fig. 8*

| SYNTAX | DATA LENGTH (BITS) | MNEMONIC |
|---|---|---|
| MovieObject file { | | |
|     TypeIndicator | 8 * 4 | bslbf |
|     TypeIndicator2 | 8 * 4 | bslbf |
|     ExtensionDataStartAddress | 32 | uimsbf |
|     reserved | 224 | bslbf |
|     blkMovieObjects() | | |
|     for (i=0; i<N1; i++) { | | |
|         padding_word | 16 | bslbf |
|     } | | |
|     blkExtensionData() | | |
|     for (i=0; i<N2; i++) { | | |
|         padding_word | 16 | bslbf |
|     } | | |
| } | | |

Fig. 9

| SYNTAX | DATA LENGTH (BITS) | MNEMONIC |
|---|---|---|
| blkMovieObjects() { | | |
|   Length | 32 | uimsbf |
|   reserved | 32 | bslbf |
|   NumberOfMobjs | 16 | uimsbf |
|   for (mobj_id=0; mobj_id<NumberOfMobjs; mobj_id++) { | | |
|     MovieObject[mobj_id]() { | | |
|       TerminalInfo() { | | |
|         "1" | 1 | bslbf |
|         reserved | 15 | bslbf |
|     } | | |
|     NumberOfNavigationCommands[mobj_id] | 16 | uimsbf |
|     for (command_id=0; command_id<NumberOfNavigationCommands[mobj_id]; command_id++){ | | |
|       NavigationCommand[mobj_id][command_id] | 96 | bslbf |
|     } | | |
|   } | | |
| } | | |

Fig. 10

| SYNTAX | DATA LENGTH (BITS) | MNEMONIC |
|---|---|---|
| Movie PlayList file { | | |
|     TypeIndicator | 8 * 4 | bslbf |
|     TypeIndicator2 | 8 * 4 | bslbf |
|     PlayListStartAddress | 32 | uimsbf |
|     PlayListMarkStartAddress | 32 | uimsbf |
|     ExtensionDataStartAddress | 32 | uimsbf |
|     reserved | 160 | bslbf |
|     blkAppInfoPlayList() | | |
|     for (i=0; i<N1; i++) { | | |
|         padding_word | 16 | bslbf |
|     } | | |
|     blkPlayList() | | |
|     for (i=0; i<N2; i++) { | | |
|         padding_word | 16 | bslbf |
|     } | | |
|     blkPlayListMark() | | |
|     for (i=0; i<N3; i++) { | | |
|         padding_word | 16 | bslbf |
|     } | | |
|     blkExtensionData() | | |
|     for (i=0; i<N4; i++) { | | |
|         padding_word | 16 | bslbf |
|     } | | |
| } | | |

*Fig. 11*

| SYNTAX | DATA LENGTH (BITS) | MNEMONIC |
|---|---|---|
| blkPlayList() { | | |
|     Length | 32 | uimsbf |
|     reserved | 16 | bslbf |
|     NumberOfPlayItems | 16 | uimsbf |
|     NumberOfSubPaths | 16 | uimsbf |
|     for(*PlayItem_id*=0;<br>        *PlayItem_id*<*NumberOfPlayItems*; *PlayItem_id*++) { | | |
|         blkPlayItem() | | |
|     } | | |
|     for(*SubPath_id*=0;<br>        *SubPath_id*<*NumberOfSubPaths*; *SubPath_id*++) { | | |
|         blkSubPath() | | |
|     } | | |
| } | | |

Fig. 12

| SYNTAX | DATA LENGTH (BITS) | MNEMONIC |
|---|---|---|
| blkPlayItem() { | | |
|     Length | 16 | uimsbf |
|     ClipInformationFileName | 8 * 5 | bslbf |
|     ClipCodecIdentifier | 8 * 4 | bslbf |
|     reserved | 12 | bslbf |
|     ConnectionCondition | 4 | bslbf |
|     RefToSTCID | 8 | uimsbf |
|     INTime | 32 | uimsbf |
|     OUTTime | 32 | uimsbf |
|     blkUOMaskTable() | | |
|     PlayItemRandomAccessFlag | 1 | bslbf |
|     reserved | 7 | bslbf |
|     StillMode | 8 | bslbf |
|     if (StillMode== 0x01){ | | |
|         StillTime | 16 | uimsbf |
|     } else { | | |
|         reserved | 16 | bslbf |
|     } | | |
|     blkSTNTable() | | |
| } | | |

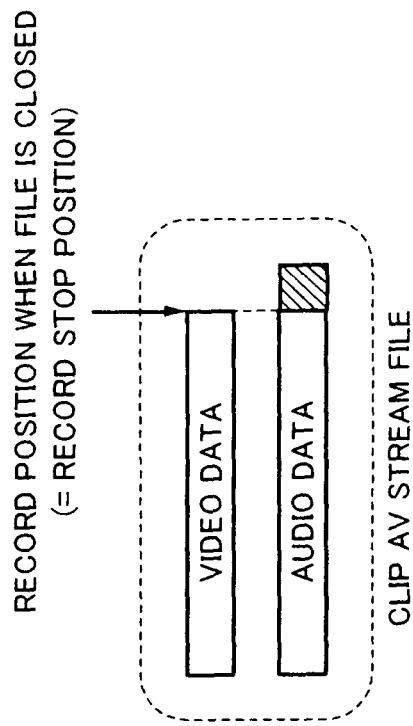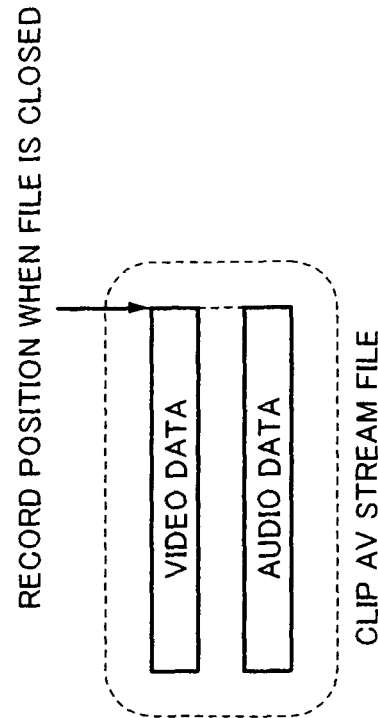
Fig. 13A
Fig. 13B

Fig. 14

| SYNTAX | DATA LENGTH (BITS) | MNEMONIC |
|---|---|---|
| blkPlayListMark() { | | |
|     Length | 32 | uimsbf |
|     NumberOfPlayListMarks | 16 | uimsbf |
|     for(*PL_mark_id*=0;<br>        *PL_mark_id*< *NumberOfPlayListMarks*;<br>        *PL_mark_id*++) { | | |
|         reserved | 8 | bslbf |
|         MarkType | 8 | bslbf |
|         RefToPlayItemID | 16 | uimsbf |
|         MarkTimeStamp | 32 | uimsbf |
|         EntryESPID | 16 | uimsbf |
|         Duration | 32 | uimsbf |
|     } | | |
| } | | |

Fig. 15

| SYNTAX | DATA LENGTH (BITS) | MNEMONIC |
|---|---|---|
| Clip information file { | | |
|     TypeIndicator | 8 * 4 | bslbf |
|     TypeIndicator2 | 8 * 4 | bslbf |
|     SequenceInfoStartAddress | 32 | uimsbf |
|     ProgramInfoStartAddress | 32 | uimsbf |
|     CPIStartAddress | 32 | uimsbf |
|     ClipMarkStartAddress | 32 | uimsbf |
|     ExtensionDataStartAddress | 32 | uimsbf |
|     reserved | 96 | bslbf |
|     blkClipInfo() | | |
|     for (i=0; i<N1; i++) { | | |
|         padding_word | 16 | bslbf |
|     } | | |
|     blkSequenceInfo() | | |
|     for (i=0; i<N2; i++) { | | |
|         padding_word | 16 | bslbf |
|     } | | |
|     blkProgramInfo() | | |
|     for (i=0; i<N3; i++) { | | |
|         padding_word | 16 | bslbf |
|     } | | |
|     blkCPI() | | |
|     for (i=0; i<N4; i++) { | | |
|         padding_word | 16 | bslbf |
|     } | | |
|     blkClipMark() | | |
|     for (i=0; i<N5; i++) { | | |
|         padding_word | 16 | bslbf |
|     } | | |
|     blkExtensionData() | | |
|     for (i=0; i<N6; i++) { | | |
|         padding_word | 16 | bslbf |
|     } | | |
| } | | |

*Fig. 16*

| SYNTAX | DATA LENGTH (BITS) | MNEMONIC |
|---|---|---|
| blkClipInfo() { | | |
|     Length | 32 | uimsbf |
|     reserved | 16 | bslbf |
|     ClipStreamType | 8 | bslbf |
|     ApplicationType | 8 | bslbf |
|     reserved | 31 | bslbf |
|     IsCC5 | 1 | bslbf |
|     TSRecordingRate | 32 | uimsbf |
|     NumberOfSourcePackets | 32 | uimsbf |
|     reserved | 1024 | bslbf |
|     TSTypeInfoBlock() | | |
|     if (IsCC5 ==1$_b$) { | | |
|         reserved | 8 | bslbf |
|         FollowingClipStreamType | 8 | bslbf |
|         reserved | 32 | bslbf |
|         FollowingClipInformationFileName | 8 * 5 | bslbf |
|         ClipCodecIdentifier | 8 * 4 | bslbf |
|         reserved | 8 | bslbf |
|     } | | |
| } | | |

Fig. 17

| SYNTAX | DATA LENGTH (BITS) | MNEMONIC |
|---|---|---|
| blkProgramInfo() { | | |
|   Length | 32 | uimsbf |
|   reserved | 15 | bslbf |
|   '1' | 1 | bslbf |
|   SPNProgramSequenceStart | 32 | uimsbf |
|   ProgramMapPID | 16 | uimsbf |
|   NumberOfStreamsInPS | 8 | uimsbf |
|   reserved | 8 | bslbf |
|   for (stream_index=0; stream_index<NumberOfStreamsInPS; stream_index++) { | | |
|     StreamPID[stream_index] | 16 | uimsbf |
|     blkStreamCodingInfo( stream_index) | | |
|   } | | |
| } | | |

Fig. 18

| SYNTAX | DATA LENGTH (BITS) | MNEMONIC |
|---|---|---|
| blkStreamCodingInfo(*stream_index*) { | | |
|     Length | 8 | uimsbf |
|     StreamCodingType | 8 | bslbf |
|     if (*StreamCodingType*==0x1B) { | | |
|         VideoFormat | 4 | bslbf |
|         FrameRate | 4 | bslbf |
|         AspectRatio | 4 | bslbf |
|         reserved | 2 | bslbf |
|         CCFlag | 1 | bslbf |
|         reserved | 17 | bslbf |
|         reserved | 128 | bslbf |
|     } else if (*StreamCodingType*==0x80 \|\|<br>        *StreamCodingType*==0x81) { | | |
|         AudioPresentationType | 4 | bslbf |
|         SamplingFrequency | 4 | bslbf |
|         AudioLanguageCode | 8 * 3 | bslbf |
|         reserved | 128 | bslbf |
|     } else if (*StreamCodingType*==0x90) {<br>        // Overlay Bitmap stream | | |
|         OBLanguageCode | 8 * 3 | bslbf |
|         reserved | 136 | bslbf |
|     } else if (*StreamCodingType*==0x91) {<br>        // Menu Bitmap stream | | |
|         MBLanguageCode | 8 * 3 | bslbf |
|         reserved | 136 | bslbf |
|     } | | |
| } | | |

Fig. 19

| VideoFormat | DESCRIPTION | STANDARDIZATION |
|---|---|---|
| 0 | reserved | |
| 1 | 480i | ITU-R BT.601-4[38] |
| 2 | 576i | ITU-R BT.601-4[38] |
| 3 | 480p | SMPTE 293M[39] |
| 4 | 1080i | SMPTE 274M[40] |
| 5 | 720p | SMPTE 296M[41] |
| 6 | 1080p | SMPTE 274M[40] |
| 7 | 576p | ITU-R BT.1358[42] |
| 8-14 | reserved | |
| 15 | reserved | |

Fig. 20

| FrameRate | DESCRIPTION [Hz] |
|---|---|
| 0 | reserved |
| 1 | 24000/1001 (23.976...) |
| 2 | 24 |
| 3 | 25 |
| 4 | 30000/1001 (29.97...) |
| 5 | reserved |
| 6 | 50 |
| 7 | 60000/1001 (59.94...) |
| 8 | reserved |
| 9-14 | reserved |
| 15 | reserved |

Fig. 21

| AspectRatio | DESCRIPTION |
|---|---|
| 0 | reserved |
| 1 | reserved |
| 2 | DISPLAY ASPECT RATIO = 4 : 3 |
| 3 | DISPLAY ASPECT RATIO = 16 : 9 |
| 4 | reserved |
| 5-14 | reserved |
| 15 | reserved |

*Fig. 22*

| SYNTAX | DATA LENGTH (BITS) | MNEMONIC |
|---|---|---|
| blkCPI() { | | |
|     Length | 32 | uimsbf |
|     if(Length !=0) { | | |
|         reserved | 12 | bslbf |
|         CPIType | 4 | bslbf |
|         blkEPMap() | | |
|     } | | |
| } | | |

Fig. 23

| SYNTAX | DATA LENGTH (BITS) | MNEMONIC |
|---|---|---|
| blkEPMap(){ | | |
|     reserved | 8 | bslbf |
|     NumberOfStreamPIDEntries | 8 | uimsbf |
|     for (k=0; k<NumberOfStreamPIDEntries; k++) { | | |
|         StreamPID[k] | 16 | bslbf |
|         reserved | 10 | bslbf |
|         EPStreamType[k] | 4 | bslbf |
|         NumberOfEPCoarseEntries[k] | 16 | uimsbf |
|         NumberOfEPFineEntries[k] | 18 | uimsbf |
|         EPMapForOneStreamPIDStartAddress[k] | 32 | uimsbf |
|     } | | |
|     for (i=0; i<X; i++) { | | |
|         padding_word | 16 | bslbf |
|     } | | |
|     for (k=0; k<NumberOfStreamPIDEntries; k++) { | | |
|         blkEPMapForOneStreamPID(EPStreamType[k], NumberOfEPCoarseEntries[k], NumberOfEPFineEntries[k]) | | |
|         for (i=0; i<Y[k]; i++) { | | |
|             padding_word | 16 | bslbf |
|         } | | |
|     } | | |
| } | | |

*Fig. 24*

| SYNTAX | DATA LENGTH (BITS) | MNEMONIC |
|---|---|---|
| blkEPMapForOneStreamPID(*EP_stream_type, Nc, Nf*) { | | |
|     EPFineTableStartAddress | 32 | uimsbf |
|     for (i=0; i<*Nc*; i++) { | | |
|     // EP coarse table | | |
|         RefToEPFineID*[i]* | 18 | uimsbf |
|         PTSEPCoarse*[i]* | 14 | uimsbf |
|         SPNEPCoarse*[i]* | 32 | uimsbf |
|     } | | |
|     for (i=0; i<X; i++) { | | |
|         padding_word | 16 | bslbf |
|     } | | |
|     for (*EP_fine_id* =0; *EP_fine_id* < *Nf*, *EP_fine_id*++) { | | |
|     // EP fine table | | |
|         ReservedEPFine*[EP_fine_id]* | 1 | bslbf |
|         IEndPositionOffset*[EP_fine_id]* | 3 | bslbf |
|         PTSEPFine*[EP_fine_id]* | 11 | uimsbf |
|         SPNEPFine*[EP_fine_id]* | 17 | uimsbf |
|     } | | |
| } | | |

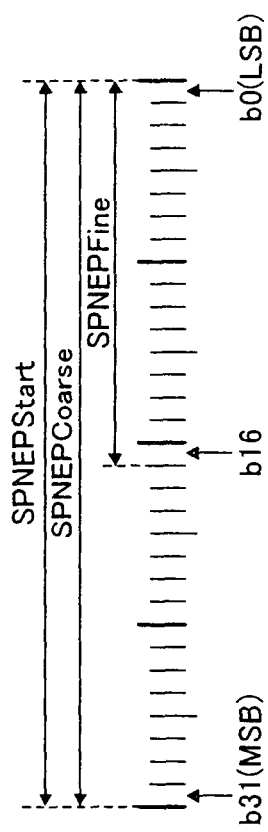

Fig. 27

| SYNTAX | DATA LENGTH (BITS) | MNEMONIC |
|---|---|---|
| blkExtensionData() { | | |
|   Length | 32 | uimsbf |
|   if(Length !=0){ | | |
|     DataBlockStartAddress | 32 | uimsbf |
|     reserved | 24 | |
|     NumberOfExtDataEntries | 8 | uimsbf |
|     for (i=0; i<*NumberOfExtDataEntries*; i++) { | | |
|       ext_data_entry() { | | |
|         ExtDataType | 16 | uimsbf |
|         ExtDataVersion | 16 | uimsbf |
|         ExtDataStartAddress | 32 | uimsbf |
|         ExtDataLength | 32 | uimsbf |
|       } | | |
|     } | | |
|     for (i=0; i<L1; i++) { | | |
|       padding_word | 16 | bslbf |
|       padding_word | 16 | bslbf |
|     } | | |
|     DataBlock() | 32+ 8*(Length - DataBlockStartAddress) | |
|   } | | |
| } | | |

Fig. 31

| SYNTAX | DATA LENGTH (BITS) | MNEMONIC |
|---|---|---|
| blkIndexExtensionData(){ | | |
|     TypeIndicator | 8 * 4 | uimsbf |
|     reserved | 8 * 4 | bslbf |
|     TableOfPlayListsStartAddress | 32 | uimsbf |
|     MakersPrivateDataStartAddress | 32 | uimsbf |
|     reserved | 192 | bslbf |
|     blkUIAppInfoAVCHD() | | |
|     for(i=0; i<N1;i++) { | | |
|         padding_word | 16 | bslbf |
|     } | | |
|     blkTableOfPlayLists() | | |
|     for(i=0; i<N2;i++) { | | |
|         padding_word | 16 | bslbf |
|     } | | |
|     blkMakersPrivateData() | | |
|     for (i=0; i<N3;i++){ | | |
|         padding_word | 16 | bslbf |
|     } | | |
| } | | |

Fig. 32

| SYNTAX | DATA LENGTH (BITS) | MNEMONIC |
|---|---|---|
| blkTableOfPlayLists() { | | |
|     Length | 32 | uimsbf |
|     blkFirstPlaybackTitlePlayLists() | | |
|     blkMenuTitlePlayLists() | | |
|     NumberOfTitlePlayListPair | 16 | bslbf |
|     for(i=0; i< NumberOfTitlePlayListPair;i++){ | | |
|         blkMovieTitlePlayListPair() { | | |
|             PlayListFileName | 8 * 5 | bslbf |
|             reserved | 6 | bslbf |
|             PlayListAttribute | 2 | uimsbf |
|             reserved | 16 | bslbf |
|             RefToTitleId | 16 | uimsbf |
|         } | | |
|     } | | |
| } | | |

*Fig. 33*

| SYNTAX | DATA LENGTH (BITS) | MNEMONIC |
|---|---|---|
| blkPlayListExtensionData() { | | |
|     TypeIndicator | 8 * 4 | bslbf |
|     reserved | 8 * 4 | bslbf |
|     PlayListMarkExtStartAddress | 32 | uimsbf |
|     MakersPrivateDataStartAddress | 32 | uimsbf |
|     reserved | 192 | bslbf |
|     blkPlayListMeta() | | |
|     for (i=0; i<N1; i++){ | | |
|         padding_word | 16 | bslbf |
|     } | | |
|     blkPlayListMarkExt() | | |
|     for (i=0; i<N2; i++){ | | |
|         padding_word | 16 | bslbf |
|     } | | |
|     blkMakersPrivateData() | | |
|     for (i=0; i<N3; i++){ | | |
|         padding_word | 16 | bslbf |
|     } | | |
| } | | |

Fig. 34

| SYNTAX | DATA LENGTH (BITS) | MNEMONIC |
|---|---|---|
| blkPlayListMeta() { | | |
|     Length | 32 | uimsbf |
|     MakerID | 16 | uimsbf |
|     MakerModelCode | 16 | uimsbf |
|     reserved | 32 | bslbf |
|     RefToMenuThumbnailIndex | 16 | uimsbf |
|     blkTimeZone() | 8 | uimsbf |
|     RecordTimeAndDate | 4 * 14 | uimsbf |
|     reserved | 8 | bslbf |
|     PlayListCharacterSet | 8 | uimsbf |
|     PlayListNameLength | 8 | bslbf |
|     PlayListName | 8 * 255 | uimsbf |
|     Additional_data(){ | | |
|         Length2 | 32 | uimsbf |
|         reserved | 8 * Length2 | bslbf |
|     } | | |
| } | | |

Fig. 35

| SYNTAX | DATA LENGTH (BITS) | MNEMONIC |
|---|---|---|
| blkMakersPrivateData() { | | |
|   Length | 32 | uimsbf |
|   if(Length !=0){ | | |
|     DataBlockStartAddress | 32 | uimsbf |
|     reserved | 24 | bslbf |
|     NumberOfMakerEntries | 8 | uimsbf |
|     for (i=0; i<NumberOfMakerEntries; i++){ | | |
|       MakerID | 16 | uimsbf |
|       MakerModelCode | 16 | uimsbf |
|       MpdStartAddress | 32 | uimsbf |
|       MpdLength | 32 | uimsbf |
|     } | | |
|     for (i=0; i<L1; i++) { | | |
|       padding_word | 16 | bslbf |
|       padding_word | 16 | bslbf |
|     } | | |
|     DataBlock() | 32+ 8 * (Length − DataBlockStartAddress) | |
|   } | | |
| } | | |

Fig. 36

| SYNTAX | DATA LENGTH (BITS) | MNEMONIC |
|---|---|---|
| blkClipExtensionData() { | | |
|     TypeIndicator | 8 * 4 | bslbf |
|     reserved | 8 * 4 | bslbf |
|     ProgramInfoExtStartAddress | 32 | uimsbf |
|     MakersPrivateDataStartAddress | 32 | uimsbf |
|     reserved | 192 | bslbf |
|     blkClipInfoExt() | | |
|     for(i=0; i<N1;i++){ | | |
|         padding_word | 16 | bslbf |
|     } | | |
|     blkProgramInfoExt() | | |
|     for(i=0; i<N2;i++){ | | |
|         padding_word | 16 | bslbf |
|     } | | |
|     blkMakersPrivateData() | | |
|     for(i=0; i<N3;i++){ | | |
|         padding_word | | |
|     } | 16 | bslbf |
| } | | |

Fig. 37

| SYNTAX | DATA LENGTH (BITS) | MNEMONIC |
|---|---|---|
| blkProgramInfoExt() { | | |
|   Length | 32 | uimsbf |
|   reserved | 8 | bslbf |
|   NumberOfProgramSequences  /* Fixed to 1 | 8 | uimsbf |
|   for (i=0; i<*NumberOfProgramSequences*; i++) { | | |
|     NumberOfStreamCodingInfoExtInPs[i] | 8 | uimsbf |
|     reserved | 8 | bslbf |
|     for (j=0; j<*NumberOfStreamCodingInfoExtInPs*[i]; j++) { | | |
|       StreamPID[i][j] | 16 | uimsbf |
|       blkStreamCodingInfoExt(i,j) | | |
|     } | | |
|   } | | |
| } | | |

Fig. 38

| SYNTAX | DATA LENGTH (BITS) | MNEMONIC |
|---|---|---|
| blkStreamCodingInfoExt(i,j) { | | |
|     Length | 8 | uimsbf |
|     StreamCodingType | 8 | bslbf |
|     if (StreamCodingType==0x1B) { | | |
|         HorizontalSize | 8 | uimsbf |
|         profile_idc | 8 | uimsbf |
|         constraint_set0_flag | 1 | bslbf |
|         constraint_set1_flag | 1 | bslbf |
|         constraint_set2_flag | 1 | bslbf |
|         constraint_set3_flag | 1 | bslbf |
|         reserved | 4 | bslbf |
|         level_idc | 8 | uimsbf |
|         reserved | 48 | bslbf |
|     } | | |
| } | | |

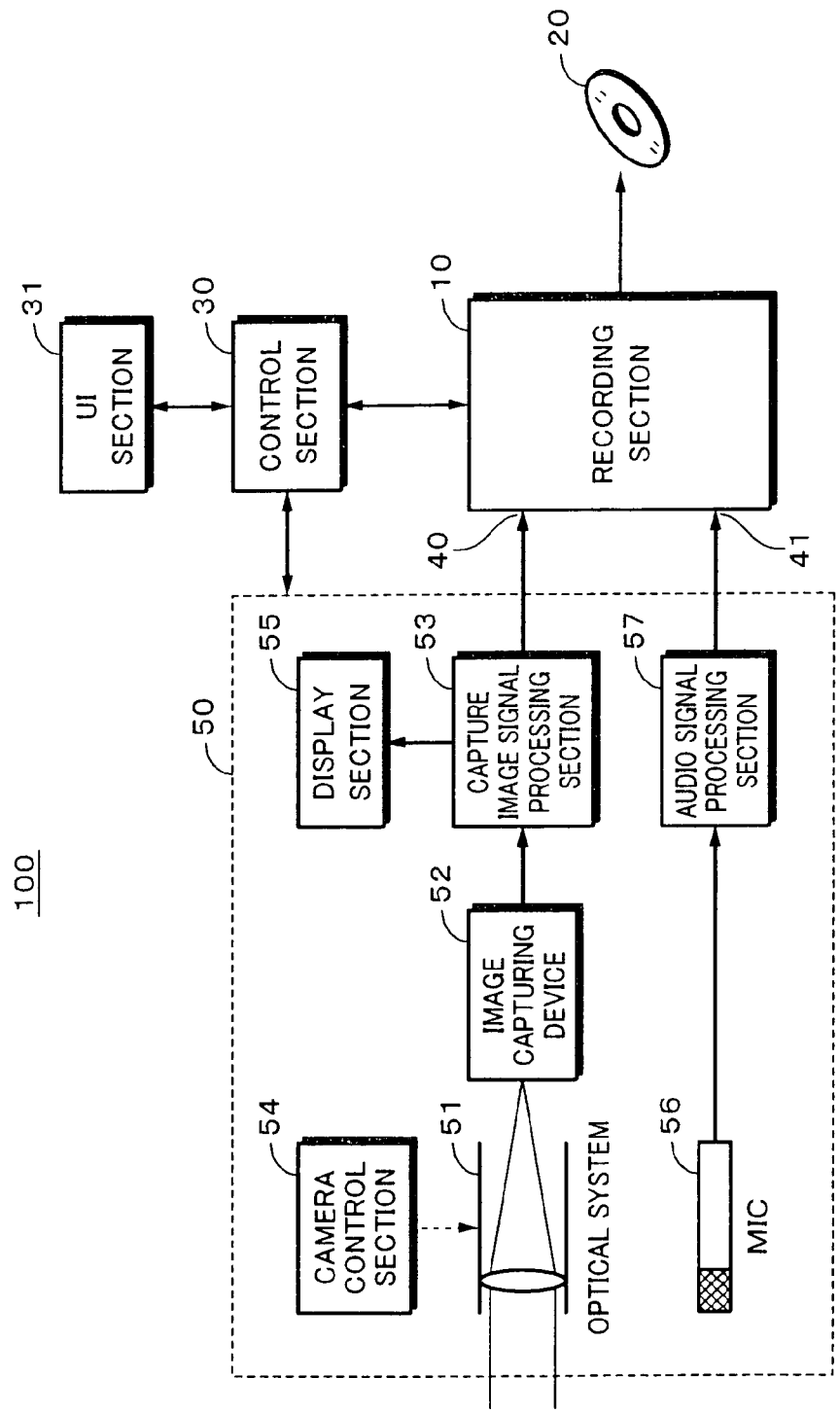

RECORDING APPARATUS, RECORDING METHOD, AND RECORDING PROGRAM, AND IMAGE CAPTURING APPARATUS, IMAGE CAPTURING METHOD AND IMAGE CAPTURING PROGRAM

CROSS REFERENCE TO RELATED APPLICATIONS

The present application is a national phase entry under 35 U.S.C. §371 of International Application No. PCT/JP2007/060081 filed May 10, 2007, published on Nov. 29, 2007 as WO 2007/135932 A1, which claims priority from Japanese Patent Application No. JP 2006-138701 filed in the Japanese Patent Office on May 18, 2006.

TECHNICAL FIELD

The present invention relates to a recording apparatus, a recording method, a recording program, an image capturing apparatus, an image capturing method, and an image capturing program that are suitable for recording stream data of which video data and audio data have been multiplexed to a record medium.

BACKGROUND ART

As a record medium that is recordable and detachable from a recording and reproducing apparatus, that has a relatively large recording capacity, and that is suitable for recording AV (Audio/Video) data composed of video data and audio data, so far, DVD (Digital Versatile Disc) that has a recording capacity of 4.7 GB (Giga Bytes) or more has been widely used. Patent document "Japanese Patent Application Laid-Open No. 2004-350251" describes an image capturing apparatus that records DVD-Video formatted data to a recordable type DVD.

Video data and audio data are generally recorded on a record medium in the unit of video data created after the record start operation until the record stop operation. A reproduction region and a reproduction order of the video data created after the record start operation until the record stop operation are generally designated with reproduction list information. When a recorded AV stream is managed in the unit of video data created after the record start operation until the record stop operation with reproduction list information, the AV stream can be easily edited by freely setting the reproduction region and the reproduction order of the AV stream without necessity of processing the AV stream on the record medium.

It is assumed that video data and audio data are recorded as files to a record medium. For example, video data and audio data are recorded as files in the unit of data created after the record start operation until the record stop operation. Since video data and audio data are recorded as files, they have a more affinity to other apparatus such as a computer apparatus. Thus, recorded data can be expected to be more effectively used.

Thus, when video data and audio data that have been continuously recorded as files to one record medium according to a sequences of record start operations and record stop operations are reproduced in the order of which they have been recorded, it is necessary to perform a particular technique. For example, it can be contemplated that information about a plurality of units of video data and audio data that are continuously recorded to one record medium according to a sequence of record start operations and record stop operations is controlled to be additionally written to one reproduction list file that stores reproduction list information. When such a recording control is performed, it becomes easy to continuously reproduce a plurality of units of video data and audio data that have been recorded.

When information about video data and audio data that are continuously recorded is controlled to be additionally written to a reproduction list file whenever the record start operation and the record stop operation are preformed, the data size of the reproduction list file increases whenever the record start operation and the record stop operation are performed. On the other hand, it is contemplated that in a recording apparatus and a reproducing apparatus, the reproduction list file is temporarily read to the memory and video data and audio data recorded as files are reproduced according to the reproduction list file. In addition, another management information with which video data and audio data that have been recorded to the record medium is read to the memory. Thus, as the size of the reproduction list file becomes large, it consumes the memory space. Thus, as a problem of the conventional apparatus, other processes may be adversely affected.

When video data and audio data are recorded as files, it is necessary to provide a mechanism that can search video data for a frame to be reproduced and easily edit video data in the unit of one frame. To do that, it can be contemplated that for example reproduction time information of video data and addresses of files of video data are correlated. Data that represent the relationship between the reproduction time information and addresses of files increases as video data are recorded. Thus, in this case, when video data and audio data are recorded or reproduced, the data that represent such a relationship becomes large and it consumes the memory space. Thus, as a problem of the conventional apparatus, other processes may be adversely affected.

In addition, as a problem of the conventional apparatus, when video data are tried to be recorded in the state that the memory space is insufficient, the system may forcibly stop recording video data and audio data or hang up.

Moreover, in recent years, a variety of video formats have been commonly used. With respect to scanning lines and scanning methods, these formats include 480i having 480 scanning lines, 576i having 576 scanning lines, 1080i having 1080 scanning lines, and so forth as interlace scanning formats and 480p having 480 scanning lines, 576p having 576 scanning lines, 720p having 720 scanning lines, 1080p having 1080 scanning lines, and so forth as progressive scanning formats.

In addition, a recording apparatus needs to record video data according to such various types of formats. Moreover, video data need to be recorded in a plurality of formats to one record medium. However, as described above, when information of video data and audio data continuously recorded as files to the record medium is controlled to be additionally written to one reproduction list file, it is likely that a trouble occurs on the reproducing apparatus side that reproduces files from the record medium. As a problem of the conventional apparatus, when video data and audio data recorded as files are continuously reproduced according to the reproduction list file, if the format of video data of the next file is different from that of the preceding file, the decoder cannot perform its process at a proper timing or the apparatus may stop because of a hang-up of the decoder.

DISCLOSURE OF THE INVENTION

Therefore, an object of the present invention is to provide a recording apparatus, a recording method, a recording program, an image capturing apparatus, an image capturing method, and an image capturing program that allow user-friendliness in recoding video data and audio data created after a record start operation until a record stop operation to be improved.

To solve the foregoing problem, a first aspect of the present invention is in a recoding apparatus which multiplexes video data and audio data and records multiplexed data to a record medium, characterized in that the recording apparatus comprise a data input section which inputs the video data and the audio data, a record command input section which inputs a record start command and a record stop command for the video data and the audio data, a recording section which multiplexes the video data and the audio data and records the multiplexed stream as a stream file to the record medium, and a management information creation section which creates reproduction management information for controlling a reproduction of the stream file recorded on the record medium, the reproduction management information being composed of first management information which represents attribute information of the stream file and second management information which contains information which represents a reproduction method for the stream file, and the management information creation section determines whether or not the information which represents the reproduction method for the stream file recorded on the record medium is additionally written to a predetermined entry of the second management information contained in an existing entry of the reproduction management information according to the record start command by the record command input section based on the existing entry of the reproduction management information.

In addition, a second aspect of the present invention is in a recoding method of multiplexing video data and audio data and recording multiplexed data to a record medium, characterized in that the recording method comprise a record command input step of inputting a record start command and a record stop command for the video data and the audio data that have been input to a data input section, a recording step of multiplexing the video data and the audio data and recording the multiplexed stream as a stream file to the record medium, and a management information creation step of generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information according to the record start command by the record command input section based on the existing entry of the reproduction management information.

A third aspect of the present invention is in a recoding program of causing a computer apparatus to execute a recording method of multiplexing video data and audio data and recording multiplexed data to a record medium, characterized in that the recording method comprise a record command input step of inputting a record start command and a record stop command for the video data and the audio data that have been input to a data input section, a recording step of multiplexing the video data and the audio data and recording the multiplexed stream as a stream file to the record medium, and a management information creation step of generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information according to the record start command by the record command input section based on the existing entry of the reproduction management information.

A fourth aspect of the present invention is in an image capturing apparatus which multiplexes video data captured and obtained from a subject by an image capturing section and audio data collected and obtained by a sound collecting section and records multiplexed video data and audio data to a record medium, characterized in that the image capturing apparatus comprises the image capturing section which captures the image of the subject and outputs the video data, the sound collecting section which collects a sound and outputs audio data, a recording section which multiplexes the video data and the audio data and records the multiplexed stream as a stream file to the record medium, an operation section which accepts user's operations for a record start command and a record stop command for the video data and the audio data to the record medium, and a management information creation section which creates reproduction management information for controlling a reproduction of the stream file recorded on the record medium, the reproduction management information being composed of first management information which represents attribute information of the stream file and second management information which contains information which represents a reproduction method for the stream file, the management information creation section determines whether or not the information which represents the reproduction method for the stream file recorded on the record medium is additionally written to a predetermined entry of the second management information contained in an existing entry of the reproduction management information according to the record start command corresponding to the user's operations to the operation section based on the existing entry of the reproduction management information.

A fifth aspect of the present invention is in an image capturing method of multiplexing video data captured and obtained from a subject by an image capturing section and audio data collected and obtained by a sound collecting section and recording multiplexed video data and audio data to a record medium, characterized in that the image capturing method comprises a recording step of multiplexing the video data and the audio data captured and obtained from an subject by the image capturing section and the audio data collected and obtained by the sound collecting section and recording the multiplexed stream as a stream file to the record medium, an accepting step of accepting user's operations for a record start command and a record stop command for the video data and the audio data to the record medium against an operation section, and a management information creation step for generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information according to the record start command corresponding to the user's operations to the operation section based on the existing entry of the reproduction management information.

A sixth aspect of the present invention is in an image capturing program of causing a computer apparatus to execute an image capturing method of multiplexing video data captured and obtained from a subject by an image capturing section and audio data collected and obtained by a sound collecting section and recording multiplexed video data and audio data to a record medium, characterized in that the image capturing method comprises a recording step of multiplexing the video data and the audio data captured and obtained from an subject by the image capturing section and the audio data collected and obtained by the sound collecting section and recording the multiplexed stream as a stream file to the record medium, an accepting step of accepting user's operations for a record start command and a record stop command for the video data and the audio data to the record medium against an operation section, and a management information creation step for generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information according to the record start command corresponding to the user's operations to the operation section based on the existing entry of the reproduction management information.

As described above, in the first, second, and third aspects of the present invention, reproduction management information for controlling the reproduction of a stream file recorded on a record medium is created. The reproduction management information is composed of first management information that represents attribute information of a stream file composed of a stream of which video data and audio data have been multiplexed and second management information that contains information that represents a reproduction method for the stream file. An additionally recording ability/inability determination of determining whether or not the information that represents the reproduction method for the stream file recorded on the record medium is additionally written to a predetermined entry of the second management information contained in an existing entry of the reproduction management information according to a record start command for the video data on the basis of the existing entry of the reproduction management information. Thus, even if the record start operation and the record stop operation are repeatedly performed, the second management information is controlled to be adequately created without necessity of user's recognition for the second management information.

As described above, in the fourth, fifth, and sixth aspects of the present invention, reproduction management information for controlling the reproduction of a stream file recorded on a record medium is created. The reproduction management information is composed of first management information that represents attribute information of a stream file composed of a stream of which captured and obtained video data and collected and obtained audio data have been multiplexed and second management information that contains information that represents a reproduction method for the stream file. An additionally recording ability/inability determination of determining whether or not the information that represents the reproduction method for the stream file composed of video data captured and obtained from a subject and recorded on the record medium is additionally written to a predetermined entry of the second management information contained in an existing entry of the reproduction management information according to a record start command corresponding to a user's operation against an operation section on the basis of the existing entry of the reproduction management information. Thus, even if the record start operation and the record stop operation are repeatedly performed for capturing, the second management information is controlled to be adequately created without necessity of user's recognition for the second management information.

As described above, in the first, second, and third aspects of the present invention, reproduction management information for controlling the reproduction of a stream file recorded on a record medium is created. The reproduction management information is composed of first management information that represents attribute information of a stream file composed of a stream of which video data and audio data have been multiplexed and second management information that contains information that represents a reproduction method for the stream file. An additionally recording ability/inability determination of determining whether or not the information that represents the reproduction method for the stream file recorded on the record medium is additionally written to a predetermined entry of the second management information contained in an existing entry of the reproduction management information according to a record start command for the video data on the basis of the existing entry of the reproduction management information. Thus, there is provided an effect of which even if the record start operation and the record stop operation are repeatedly performed, the second management information is controlled to be adequately created without necessity of user's recognition for the second management information.

As described above, in the fourth, fifth, and sixth aspects of the present invention, reproduction management information for controlling the reproduction of a stream file recorded on a record medium is created. The reproduction management information is composed of first management information that represents attribute information of a stream file composed of a stream of which captured and obtained video data and collected and obtained audio data have been multiplexed and second management information that contains information that represents a reproduction method for the stream file. An additionally recording ability/inability determination of determining whether or not the information that represents the reproduction method for the stream file composed of video data captured and obtained from a subject and recorded on the record medium is additionally written to a predetermined entry of the second management information contained in an existing entry of the reproduction management information according to a record start command corresponding to a user's operation against an operation section on the basis of the existing entry of the reproduction management information. Thus, there is provided an effect of which even if the record start operation and the record stop operation are repeatedly performed for capturing, the second management information is controlled to be adequately created without necessity of user's recognition for the second management information.

BRIEF DESCRIPTION OF DRAWINGS

FIG. 6 is a schematic diagram showing syntax that represents an example of the structure of a file "index.bdmv";

FIG. 7 is a schematic diagram showing syntax that represents an example of the structure of a block blkindexes( );

FIG. 8 is a schematic diagram showing syntax that represents an example of the structure of a file "MovieObject.bdmv";

FIG. 9 is a schematic diagram showing syntax that represents an example of the structure of a block blkMovieObjects( );

FIG. 10 is a schematic diagram showing syntax that represents an example of the structure of a play list file "xxxxx.mpls";

FIG. 11 is a schematic diagram showing syntax that represents an example of the structure of a block blkPlayList( );

FIG. 12 is a schematic diagram showing syntax that represents an example of the structure of a block blkPlayItem( );

FIG. 13A and FIG. 13B are schematic diagrams for describing first and second seamless connections, respectively;

FIG. 14 is a schematic diagram showing syntax that represents an example of the structure of a block blkPlayListMark( );

FIG. 15 is a schematic diagram showing syntax that represents an example of the structure of a click information file;

FIG. 16 is a schematic diagram showing syntax that represents an example of the structure of a block blkClipInfo( );

FIG. 17 is a schematic diagram showing syntax that represents an example of the structure of a block blkProgramInfo( );

FIG. 18 is a schematic diagram showing syntax that represents an example of the structure of a block blkStreamCodingInfo (stream_index);

FIG. 19 is a schematic diagram showing an example of a list of formats of video data represented in a field VideoFormat;

FIG. 20 is a schematic diagram showing an example of a list of frame rates represented in a field FrameRate;

FIG. 21 is a schematic diagram showing an example of a list of frame rates represented in a field AspectRatio;

FIG. 22 is a schematic diagram showing syntax that represents an example of the structure of a block blkCPI( );

FIG. 23 is a schematic diagram showing syntax that represents an example of the structure of a block blkEPMap( );

FIG. 24 is a schematic diagram showing syntax that represents an example of the structure of a block blkEPMapForOneStreamPID (EP_stream_type, Nc, Nf);

FIG. 26 is a schematic diagram showing an example of the formats of an entry SPNEPCoarse and an entry SPNEPFine;

FIG. 27 is a schematic diagram showing syntax that represents an example of the structure of a block blkExtensionData( );

FIG. 31 is a schematic diagram showing syntax that represents an example of the structure of a block DataBlock( ) of a field blkExtensionData( ) in a file "index.bdmv";

FIG. 32 is a schematic diagram showing syntax that represents an example of the structure of a block blkTableofPlayList( );

FIG. 33 is a schematic diagram showing syntax that represents an example of the structure of a block DataBlock( ) of a block blkExtensionData( ) in a play list file "xxxxx.mpls";

FIG. 34 is a schematic diagram showing syntax that represents an example of the structure of a block blkPlayListMeta( );

FIG. 35 is a schematic diagram showing syntax that represents an example of the structure of a block blkMakersPrivateData( ) in a play list file;

FIG. 36 is a schematic diagram showing syntax that represents an example of the structure of a block DataBlock( ) of a block blkExtensionData( ) in a clip information file;

FIG. 37 is a schematic diagram showing syntax that represents an example of the structure of a block blkProgramInfoExt( );

FIG. 38 is a schematic diagram showing syntax that represents an example of the structure of a block blkStreamCodingInfoExt(i, j);

FIG. 53 is a block diagram showing an example of the structure of a video camera apparatus according to another embodiment of the present invention.

BEST MODES FOR CARRYING OUT THE INVENTION

Next, with reference to accompanying drawings, an embodiment of the present invention will be described. For easy understanding, an example of a format applicable to the present invention will be described (hereinafter, referred to as the AVCHD format). The AVCHD format is currently being proposed as a record format of which an AV (Audio/Video) stream of which video data and audio data have been multiplexed in a predetermined manner is recorded to a recordable record medium. The AVCHD format allows an AV stream recorded on a record medium to be managed in the unit of one clip with a play list.

A bit stream that has been encoded, for example, according to the ITU-U (International Telecommunication Union-Telecommunication Standardization Sector) recommendation H.264 or the ISO (International Organization for Standardization)/IEC (International Electrotechnical Commission) International Standard 14496-10 (MPEG-4 part 10) Advanced Video Coding (hereinafter, referred to as the H.264|AVC) and that has been multiplexed according to the MPEG2 systems is referred to as a clip AV stream (or an AV stream). A clip AV stream is recorded as a file to a disc by a predetermined file system. This file is referred to as a clip AV stream file (or an AV stream file).

A clip AV stream file is a management unit on a file system. Thus, a clip AV stream file is not always a user-friendly management unit. To facilitate user-friendliness, it is necessary to provide a mechanism of continuously reproducing a plurality of clip AV stream files into which video contents are divided and a mechanism of partly reproducing a clip AV stream file and record information necessary to smoothly perform a special reproduction operation, a cue reproduction operation, and so forth as a database to a disc.

Figure 1:
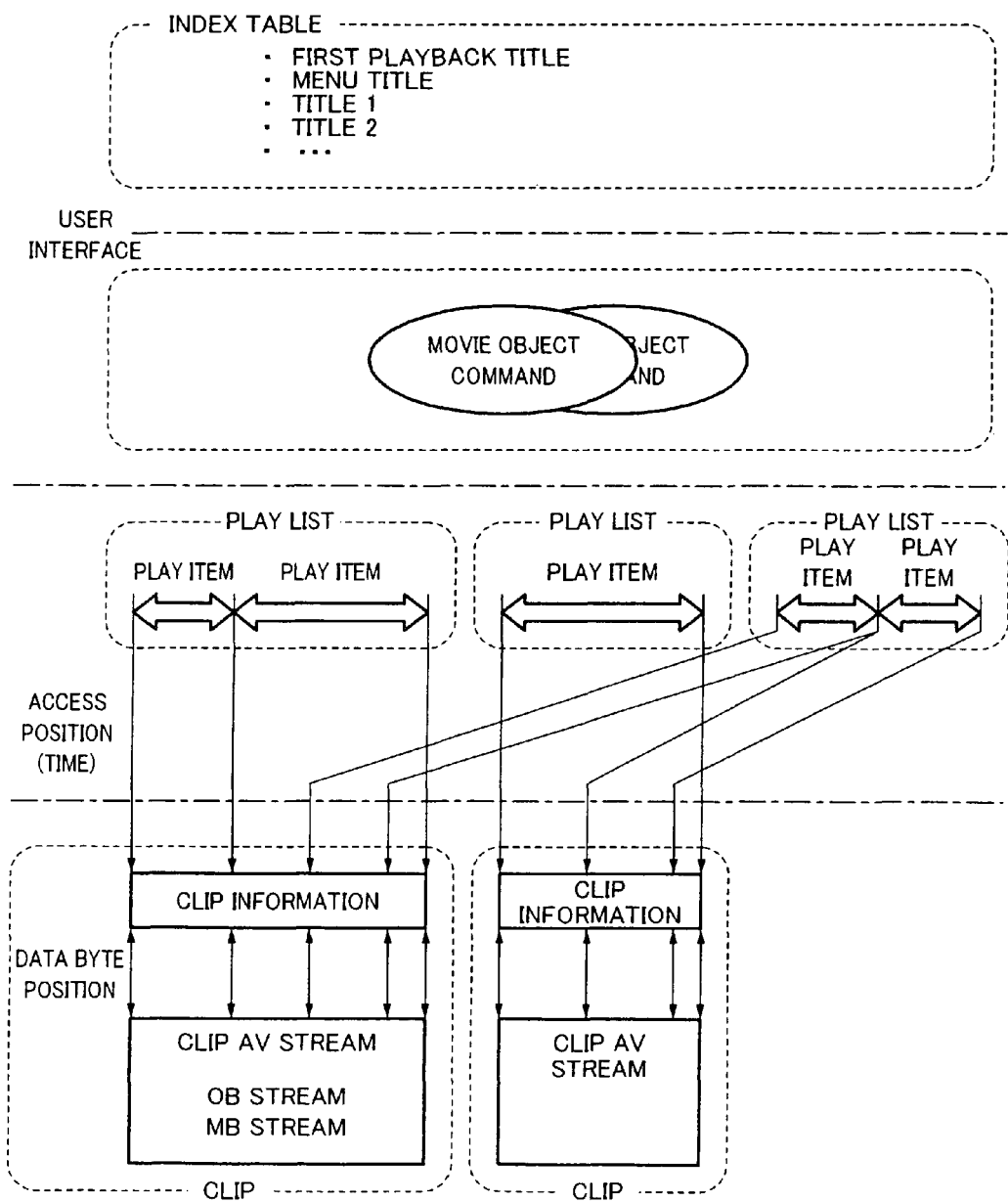
FIG. 1 is a schematic diagram showing an outline of a data model prescribed in the AVCHD format applicable to the present invention.

FIG. 1 shows an outline of a data model prescribed in the AVCHD format applicable to the present invention. As shown in FIG. 1, the AVCHD format has a data structure with four hierarchical layers. The lowest layer is a layer on which a clip AV stream is placed (for convenience, hereinafter, referred to as the clip layer). Placed above the clip layer is a layer for play lists (PlayList) with which reproduction positions of the clip AV stream are designated and play items (PlayItem) (for convenience, referred to as the play list layer). Placed above the play list layer is a layer for movie objects (Movie Object) each of which is composed of commands that designate the reproduction order of play lists and so forth (for convenience, referred to as the object layer). The highest layer is a layer for an index table with which titles and so forth stored on the record medium are managed (for convenience, referred to as the index layer).

Next, the clip layer will be described. A clip AV stream is a bit stream of which video data and audio data have been multiplexed, for example, according to the MPEG2 TS (transport stream) format. Information about the clip AV stream is recorded as clip information (Clip Information) in a file.

In addition, an OB stream (Overlay Bitmap stream) that is a graphic stream for a subtitle and an MB stream (Menu Bitmap stream) as a stream of data (such as button image data) for a menu indication can be multiplexed with a clip AV stream.

A pair of a clip AV stream file and a clip information file in which clip information corresponding to the clip AV stream file has been recorded is treated as an object and referred to as a clip (Clip). In other words, a clip is one object composed of a clip AV stream and clip information.

A file is generally treated as a sequence of bytes. Contents of a clip AV stream file are mapped on the time base. An entry point of a clip is mainly designated on the time base. When a time stamp of an access point is given to a predetermined clip, a clip information file can be used to find address information with which data are read from the clip AV stream file.

Next, the play list layer will be described. A play list designates an AV stream file to be reproduced. A play list is composed of pairs of a reproduction start point (IN point) and a reproduction end point (OUT point) with which a reproduction position of a designated AV stream file is designated. A pair of the reproduction start point and the reproduction end point is referred to as a play item (PlayItem). A play list is composed of a set of play items. When a play item is reproduced, a part of an AV stream file referred from the play item is reproduced. In other words, a region of a clip is reproduced on the basis of information of an IN point and an OUT point of a play item.

Next, the object layer will be described. A movie object contains a navigation command program and terminal information that is associated with the movie object. The navigation program is a command (navigation command) for controlling the reproduction of a play list.

Next, the index layer will be described. The index layer is composed of an index table (Index Table). The index table is a table in the top level that defines titles of contents recorded on a disc. A module manager of player resident system software controls the reproduction of data of the record medium on the basis of title information stored in the index table.

Figure 2:
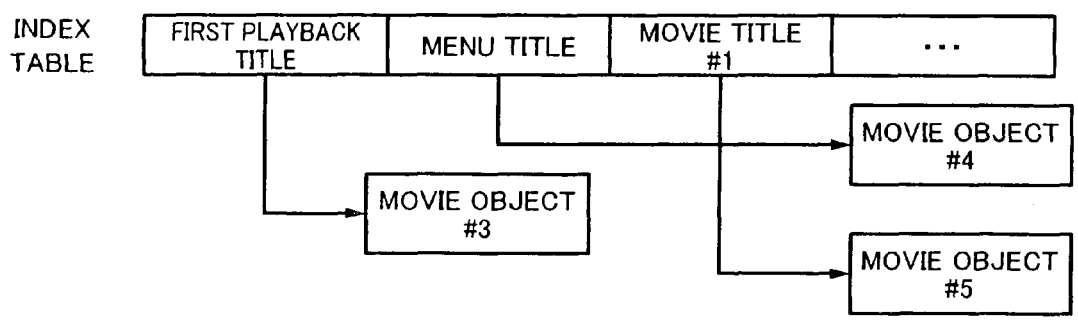
FIG. 2 is a schematic diagram for describing an index table.

In other words, as schematically shown in FIG. 2, any entries in the index table are referred to as titles. All of a first playback title (First PlaybackTitle), a menu title (MenuTitle), and movie title (MovieTitle) #1, #2, and so forth that are entries in the index table are titles. Each title represents a link to a movie object.

For easy understanding, for example, in a reproduction-only record medium, when contents stored in this record medium are a movie, the first playback title corresponds to an advertisement picture of a movie maker, which is followed by the main body of the movie. When contents are a movie, the menu title corresponds to a menu screen with which operations for which the main body is reproduced, a chapter is searched, a subtitle and a language are set, and a bonus picture is reproduced are selected. The movie titles are pictures selected from the menu title. A title may be structured as a menu screen.

Figure 3:
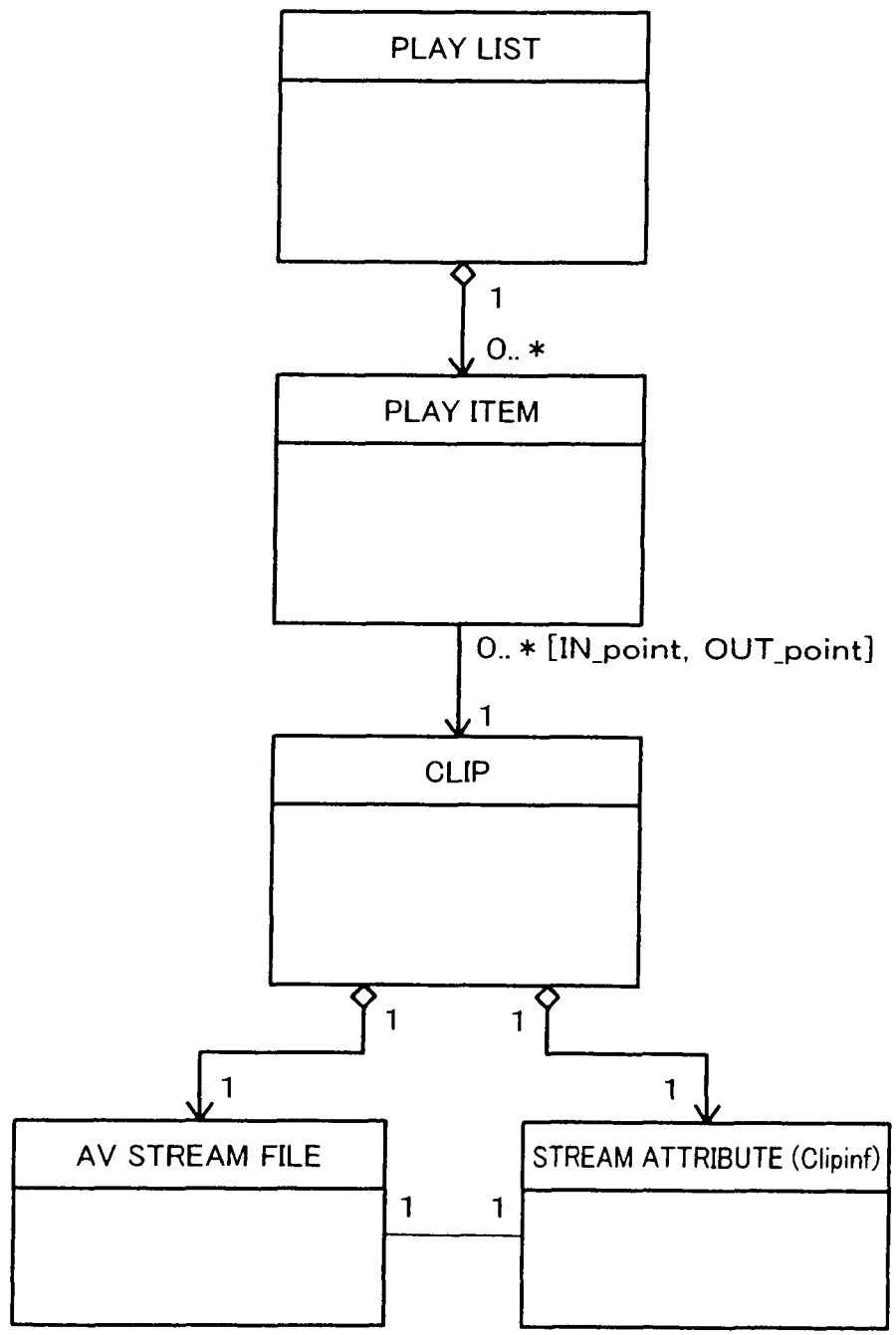
FIG. 3 is an UML diagram showing the relationship of a clip AV stream, clip information, a clip, a play item, and a play list.

FIG. 3 is a UML (Unified Modeling Language) diagram showing the relationship of the foregoing clip AV stream, clip information (Stream Attributes), a clip, a play item, and a play list. A play list is correlated with one or a plurality of play items. A play item is correlated with one clip. One clip can be correlated with a plurality of play items whose start point and/or end point different from each other. One clip refers to one clip AV stream file. Likewise, one clip refers to one clip information file. A clip AV stream file and a clip information file have a relationship of one to one. With such a structure, the reproduction order can be non-destructively designated to reproduce only a desired portion of a clip AV stream file without necessity of changing it.

Figure 4:
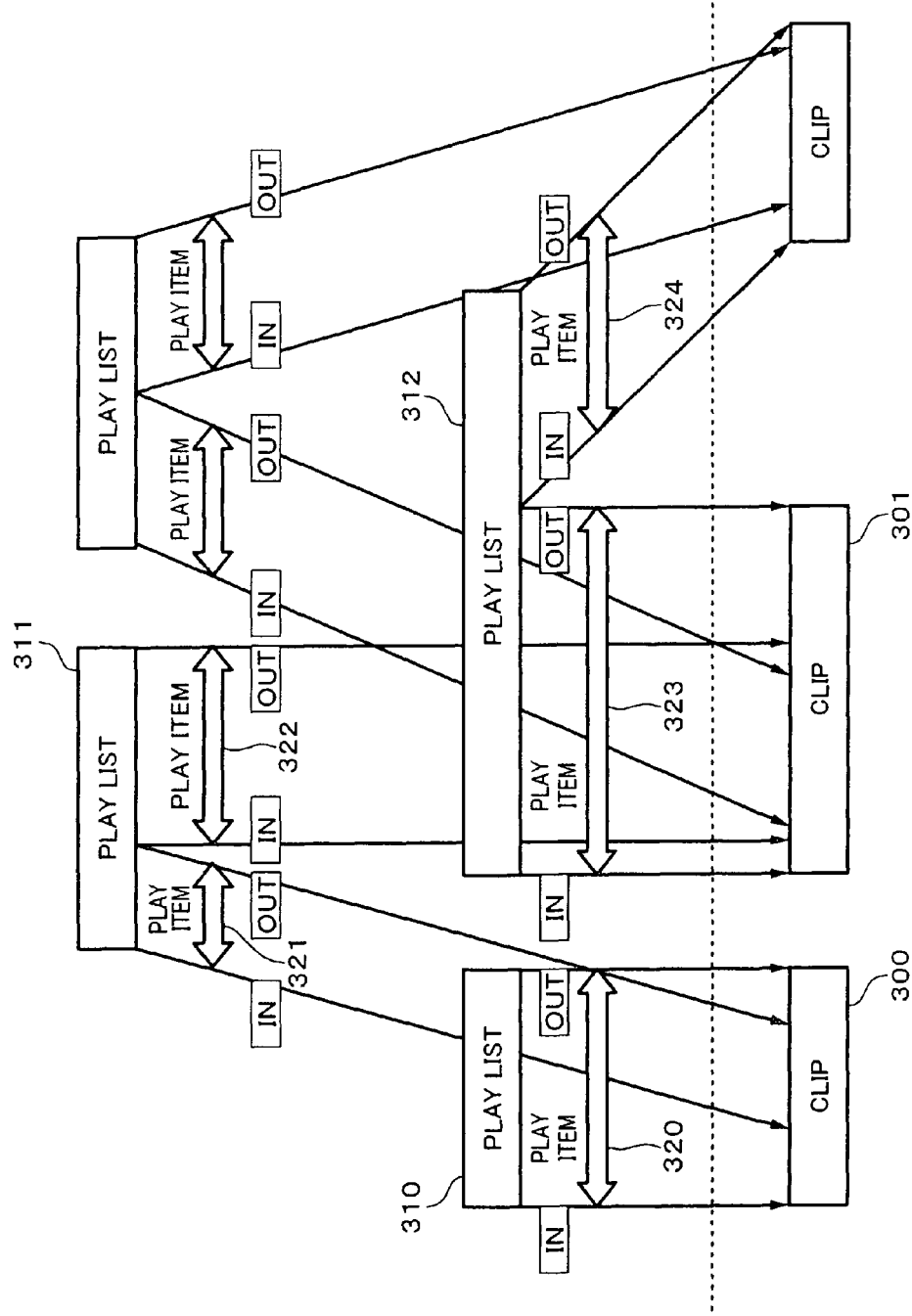
FIG. 4 is a schematic diagram for describing a method of referring to the same clip from a plurality of play lists.

In addition, as shown in FIG. 4, the same clip can be referred from a plurality of play lists. In addition, a plurality of clips can be designated from one play list. A clip is referred with an IN point and an OUT point of a play item in a play list. In the example shown in FIG. 4, a clip 300 is referred from a play item 320 of a play list 310. In addition, the clip 300 is referred for a region designated by an IN point and an OUT point of a play item 321 of a play list 311 that has the play item 321 and a play item 322. In addition, a clip 301 is referred for a region designated by an IN point and an OUT point of the play item 322 of the play list 312. In addition, the clip 301 is referred for a region designated by an IN point and an OUT point of a play item 323 of a play list 312 that has the play item 323 and a play item 324. In the example shown in FIG. 4, the clip 301 is also referred from another play list.

Figure 5:
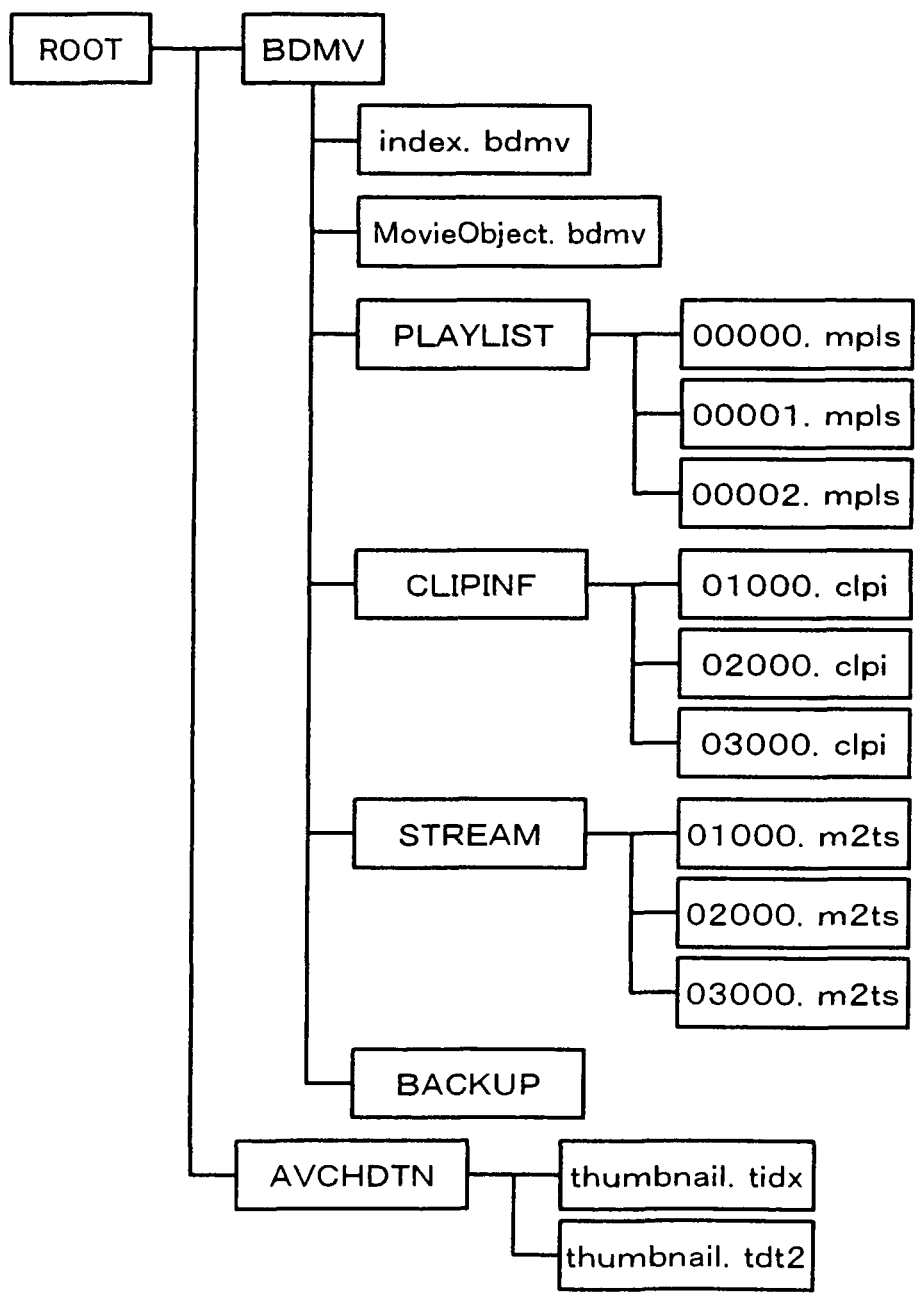
FIG. 5 is a schematic diagram for describing a management structure of files recorded on a record medium.

Next, with reference to FIG. 5, the management structure for files in the AVCHD format on a record medium will be described. Files are hierarchically managed with a directory structure. One directory (in FIG. 5, a root directory) is created on a record medium. Below the directory is the range managed by one recoding and reproducing system.

Placed below the root directory is a directory "BDMV". When necessary, placed below the root direction is a directory "AVCHDTN". Placed in the directory "AVCHDTN", are thumbnail files of which representative images of clips have been reduced in a predetermined size. Placed in the directory "BDMV" is the data structure described with reference to FIG. 1.

Placed immediately below the directory "BDMV" are only two files, a file "index.bdmv" and a file "MovieObject.bdmv". Placed below the directory "BDMV" are a directory "PLAYLIST", a directory "CLIPINF", a directory "STREAM", and a directory "BACKUP". The directory "BACKUP" stores backups of individual directories and files.

The file "index.bdmv" describes the contents of the directory "BDMV". In other words, this file "index.bdmv" corresponds to the index table in the index layer, which is the foregoing highest layer. The file "MovieObject.bdmv" stores information about at least one movie object. In other words, this file "Movieobject.bdmv" corresponds to the foregoing object layer.

The directory "PLAYLIST" is a directory in which the database of play lists is placed. In other words, the directory "PLAYLIST" contains a file "xxxxx.mpls" that is a file with respect to a play list. The file "xxxxx.mpls" is a file created for each play list. In the file name, "xxxxx" followed by a "." (period) is a five-digit numeral. "mpls" preceded by the period is a fixed extension of a file of this type.

The directory "CLIPINF" is a directory in which a database of clips is placed. In other words, the directory "CLIPINF" contains a file "zzzzz.clpi" that is a clip information file corresponding to a clip AV stream file. In the file name, "zzzzz" followed by a "." (period) is a five-digit numeral. "clpi" preceded by the period is a fixed extension of a file of this type.

The directory "STREAM" is a directory in which an AV stream file as an entity is placed. In other words, the directory "STREAM" contains a clip AV stream file corresponding to a clip information file. A clip AV stream file is composed of an MPEG2 (Moving Pictures Experts Group 2) transport stream (hereinafter abbreviated as an MPEG2 TS). The file name of a clip AV stream file is "zzzzz.m2ts". When "zzzzz" followed by the period of the file name of the clip AV stream file is the same as that of the corresponding clip information file, their relationship can be easily recognized.

Two types of thumbnail files thumbnail.tidx and thumbnail.tdt2 can be placed in the directory "AVCHDTN". The thumbnail file thumbnail.tidx stores a thumbnail image that has been encrypted in a predetermined system. In contrast, the thumbnail file thumbnail.tdt2 stores a thumbnail image that has not been encrypted. Since it is likely that a thumbnail image corresponding to a clip that the user has captured, for example, with a video camera is copy-free, this thumbnail image is stored in thumbnail file thumbnail.tdt2.

Next, among files shown in FIG. 5, those that strongly relate to the present invention will be described in more detail. First of all, the file "index.bdmv", which is placed immediately below the directory "BDMV", will be described. FIG. 6 shows syntax that represents an example of the structure of the file "index.bdmv". In this example, syntax is represented according to syntax of the C language, which is used as a programming language for computer devices and so forth. This applies to drawings that show syntax of other files.

In FIG. 6, a field TypeIndicator has a data length of 32 bits and denotes that this file is an index table. A field TypeIndicator2 has a data length of 32 bits and represents the version of the file "index.bdmv". A field "IndexesStartAddress" has a data length of 32 bits and represents the start address of a block blkindexes( ) in this syntax.

A field ExtensionDataStartAddress has a data length of 32 bits and represents the start address of a block blkExtensionData( ) in this syntax. The block blkExtensionData( ) is a block that can store predetermined extension data. The field ExtensionDataStartAddress represents the start address of the block blkExtensionData( ) as the relative number of bytes from the beginning of bytes of this file "index.bdmv". The relative number of bytes starts with "0". If the value of the field ExtensionDataStartAddress is "0", it denotes that this file "index.bdmv" does not contain the block blkExtensionData( ).

The field ExtensionDataStartAddress is followed by an area reserved that has a data length of 192 bytes. The area reserved is an area reserved for a byte alignment, a future field addition, and so forth. This applies to the description that follows. A block blkAppInfoBDMV( ) is a block in which the contents creator can describe any information and does not affect the operation of the player and so forth.

A block blkindexes( ) is substantial contents of this file "index.bdmv". The contents described in this file "index.bdmv" designate the first playback reproduced when the disc is loaded into the player, and a title (a movie object) that is called from the top menu. A play list file (that will be described later) is read according to a command described in a movie object or the like called by an index table.

FIG. 7 shows syntax that represents an example of the structure of the block blkindexes( ). A field length has a data length of 32 bits and represents the data length immediately after this field Length until the end of this block blkindexes( ). The field length is followed by a block FirstPlaybackTitle( ) and a block MenuTitle( ).

The block FirstPlaybackTitle( ) describes information about an object used in the first playback. The block FirstPlaybackTitle( ) describes an area reserved having a data length of 1 bit, followed by a fixed value "1". The block FirstPlaybackTitle( ) further describes a fixed value "1" through an area reserved having a data length of 31 bits. Followed by an area reserved having a data length of 14 bits, a field FirstPlaybackTitleMobjIDRef having a data length of 16 bits is placed. This field FirstPlaybackTitleMobjIDRef represents the ID of a movie object used in the first playback title.

The ID of a movie object is represented by a value mobj_id used as a loop variable in a for loop statement of a movie object based on syntax of a movie object that will be described later, for example, with reference to FIG. 8 and FIG. 9. In this example, the field FirstPlaybackTitleMobjIDRef stores a value mobj_id corresponding to a movie object to be referred.

The field FirstPlaybackTitleMobjIDRef of the block FirstPlaybackTitle( ) in the block blkindexes( ) may represent a movie object of the top menu or a title.

The block MenuTitle( ) describes information about an object used in the top menu. The block MenuTitle( ) describes an area reserved having a data length of 1 bits, followed by a fixed value "1". Followed by an area reserved having a data length of 31 bits, a fixed value "1" is described. In addition, followed by an area reserved having a data length of 14 bits, a field MenuTitleMobjIDRef having a data length of 16 bits is placed. The field MenuTitleMobjIDRef represents the ID of a movie object used in the menu title.

The block MenuTitle( ) is followed by a field NumberOfTitles that has a data length of 16 bits and that represents the number of titles that the user can select and that can be reproduced. According to the next for loop statement, the number of times represented by this field NumberofTitles, a block MovieTitle[title_id]( ) is described with an argument of a value title_id. The block MovieTitle[title_id]( ) describes information of each title. The value title_id is a numeric value from "0" to a value represented by the field NumberOfTitles and identifies a title.

In the block MovieTitle[title_id]( ), followed by an area reserved having a data length of 1 bit, a fixed value "1" is described. In addition, followed by an area reserved having a data length of 46 bits, a field MovieTitleMobjIDRef is described. The field MovieTitleMobjIDRef has a data length of 16 bits and represents the ID of a movie object used in this title. The field MovieTitleMobjIDRef is followed by an area reserved having a data length of 32 bits.

FIG. 8 shows syntax that represents an example of the structure of the file "MovieObject.bdmv" placed immediately below the directory "BDMV". A field TypeIndicator has a data length of 32 bits (4 bytes) and denotes that this file is the file "MovieObject.bdmv". The field TypeIndicator describes a four-letter character string encoded according to an encoding system prescribed in the ISO (International Organization for Standardization) 646. In the example shown in FIG. 8, the field TypeIndicator describes a four-letter character string "MOBJ" encoded according to a system prescribed in the ISO 646 and denotes that this file is the file "Movieobject.bdmv".

A field TypeIndicator2 has a data length of 32 bits (4 bytes) and represents the version number of this file "MovieObject.bdmv". In this file "Movieobject.bdmv", the field TypeIndicator2 should be four-letter character string "0100" encoded according to an encoding system prescribed in the ISO 646.

A field ExtensionDataStartAddress has a data length of 32 bits and represents the start address of blkExtensionData( ) in this syntax. The field ExtensionDataStartAddress represents the start address of the block blkExtensionData( ) as the relative number of bytes from the beginning of bytes of this file "Movieobject.bdmv". The relative number of bytes starts with "0". If the value of this field ExtensionDataStartAddress is "0", it denotes that the block blkExtensionData( ) does not exist in the file "Movieobject.bdmv".

A field padding_word in syntax shown in FIG. 8 has a data length of 16 bits. According to syntax of this file "Movieobject.bdmv", the field padding_word is inserted the number of times represented by a value N1 or a value N2 into a for loop statement. The value N1 or the value N2 is "0" or any positive integer. As the field padding_word, any value can be used.

Followed by the field ExtensionDataStartAddress, an area reserved having a data length of 224 bits is placed. Thereafter, a block blkMovieobjects( ) that is the main body of this file "Movieobject.bdmv" is stored.

FIG. 9 shows syntax that represents an example of the structure of the block blkMovieobjects( ). A field Length has a data length of 32 bits and represents the data length immediately after this field Length until the end of this block blkMovieobjects( ). Followed by an area reserved having a data length of 32 bits, a field NumberofMobjs is placed. The field NumberOfMobjs represents the number of movie objects stored according to a for loop statement immediately preceded by the field NumberOfMobjs. A movie object is uniquely identified by a value mobj_id used as a loop variable of the for loop statement. The value mobj_id starts with "0". Movie objects are defined in the order described in the for loop statement.

A block TerminalInfo( ) in the for loop statement describes a fixed value "1", followed by an area reserved having a data length of 15 bits. Thereafter, a field NumberOfNavigationCommands[mobj_id] having a data length of 16 bits is placed. This field NumberOfNavigationCommands[mobj_id] represents the number of navigation commands (NavigationCommand) contained in a movie object MovieObject[mobj_id]( ) represented by a value mobj_id.

According to a for loop statement with a loop variable of value command_id, navigation commands are described for the number represented by a field NumberofNavigationCommands[mobj_id]. In other words, the field NavigationCommand[mobj_id][command_id] placed in this for loop statement contains navigation commands NavigationCommand's in the order represented by a value command_id contained in a block MovieObject[mobj_id]( ) represented by a value mobj_id. The value command_id starts with "0". The navigation commands NavigationCommand's are defined in the order described in this for loop statement.

FIG. 10 shows syntax that represents an example of the structure of a play list file "xxxxx.mpls". A field TypeIndicator has a data length of 32 bits (4 bytes) and denotes that this file is a play list file. A field TypeIndicator2 has a data length of 32 bits (4 bytes) and represents the version of this play list file. A field PlayListStartAddress has a data length of 32 bits and represents the start address of a block blkPlayList( ) in this syntax.

A field PlayListMarkStartAddress has a data length of 32 bits and represents the start address of a block blkPlayListMark( ) in this syntax. A field ExtensionDataStartAddress has a data length of 32 bits and represents the start address of a block blkExtensionData( ) in this syntax. The field Extension- DataStartAddress represents the start address of a block blkExtensionData( ) as the relative number of bytes from the beginning of bytes of the file "xxxxx.mpls". The relative number of bytes starts with "0". If the value of the field ExtensionDataStartAddress is 0, it denotes that the block blkExtensionData( ) does not exist in this file "xxxxx.mpls".

Followed by an area reserved having a data length of 160 bits, a block blkAppInfoPlayList( ) is placed. The block blkAppInfoPlayList( ) describes information such as the type and reproduction restrictions of a play list described in the next block blkPlayList( ). The block blkPlayList( ) describes a play list. The block blkPlayListMark( ) describes a point to be jumped as in a chapter jump. The block blkExtensionData( ) is a block that can store predetermined extension data.

FIG. 11 shows syntax that represents an example of the structure of the block blkPlayList( ). A field Length has a data length of 32 bits and represents the data length immediately after this field Length until the end of the block blkPlayList( ). The field Length is followed by an area reserved having a data length of 16 bits, followed by a field NumberOfPlayItems. The field NumberofPlayItems has a data length of 16 bits and represents the number of play items contained in this block blkPlayList( ). A field NumberofSubPath represents the number of sub paths contained in this block blkPlayList( ).

According to the next for loop statement, blocks blkPlayItem( )'s that describe a play item are described for the number represented by the field NumberOfPlayItems. A count value based on the for loop statement becomes an identifier PlayItem_id of a block blkPlayItem( ). According to the next for loop statement, blocks blkSubPath( )'s are described for the number represented by the field NumberOfSubPath. A count value based on the for loop statement becomes an identifier SubPath_id of a block blkSubPath( ).

A sub path can be provided corresponding to a sub play item while a main path is provided corresponding to a play item that is mainly reproduced. A sub path can be used to designate for example audio data for after-recording, and a sub image to be reproduced in synchronization with a clip designated in a play item.

FIG. 12 shows syntax that represents an example of the structure of a block blkPlayItem( ). A field Length has a data length of 16 bits and represents the data length immediately after this field Length until the end of the block blkPlayItem( ).

A field ClipInformationFileName has a data length of 40 bits (5 bytes) and represents the file name of a clip information file to which this block blkPlayItem( ) refers. In this play item, a clip information file having a filename represented by the field ClipInformationFileName is read. A field ClipCodecIdentification has a data length of 32 bits (4 bytes) and represents the codec system of a clip AV stream used in this play item in this block blkPlayItem( ).

Followed by an area reserved having a data length of 12 bits, a field ConnectionCondition is placed. The field ConnectionCondition has a data length of 4 bits and represents information about a connection state of clips. For recordable record mediums, as the value of the field ConnectionCondition, "1", "5", or "6" is used. When the value of the field ConnectionCondition is "1", it denotes that a clip referred from the current play item and a clip referred from the immediately earlier play item are not seamlessly connected. When the value of the field ConnectionCondition is "5" or "6", it denotes that a clip referred from the current play item and a clip referred from the immediately earlier play item are seamlessly connected. The term "seamlessly connected" means that the reproduction of clips is controlled such that one clip and the next clip are successfully reproduced at frame timings.

When the value of the field ConnectionCondition is "5", the recording length of audio data of a clip to which the current play item refers is longer than the recording length of video data thereof (refer to FIG. 13A). Thus, when clips are connected, a fade-out process for audio data can be performed. For example, when a clip is closed by a user's record stop operation, the value of the field ConnectionCondition is "5". Hereinafter, the clip connection method of which the value of the field ConnectionCondition is "5" is referred to as the first seamless connection.

When the value of the field ConnectionCondition is "6", the recording length of audio data of a clip to which the current play item refer is the same as the recording length of video data thereof (refer to FIG. 13B). Thus, clips can be seamlessly connected. For example, when a clip is closed due to a cause of the system other than a user's record stop operation, the value of the field ConnectionCondition is "6". Hereinafter, the clip connection method of which the value of the field ConnectionCondition is referred to as the second seamless connection.

A field RefToSTCID has a data length of 8 bits and represents information about a discontinuous point of a system timebase (STC). A field INTime and a field OUTTime each have a data length of 32 bits and represent the reproduction range of a main clip AV stream. The field INTime represents a start point (IN point), whereas the field OUTTime represents an end point (OUT point).

A block blkUOMaskTable( ) is a table in which an acceptance restriction for a user's input is set. A flag PlayItemRandomAccessFlag that has a data length of 1 bit prescribes permission/restriction of random access for the play item of this block blkPlayItem( ). Thereafter, followed by an area reserved having a data length of 7 bits, a field StillMode is placed. The field StillMode has a data length of 8 bits and denotes whether or not the last picture of the play item in the block blkPlayItem( ) is displayed as a still image. When the value of the field StillMode is "0x01" (binary), a field StillTime that has a data length of 16 bits represents a still time based on an if statement. When the value of the field StillMode is not "0x01", an area having a data length of 16 bits is reserved.

A numeric value with "0x" denotes that it is expressed in hexadecimal notation. This applies to the similar notation.

A block blkSTNTable( ) manages an attribute of the clip AV stream, PID number, record position on the record medium, and so forth that the play item of this block blkPlayItem( ) manages.

FIG. 14 shows syntax that represents an example of the structure of a block blkPlayListMark( ). A field Length has a data length of 32 bits and represents the data length immediately after this field Length until the end of the block blkPlayListMark( ).

A field NumberofPlayListMark has a data length of 16 bits and represents the number of play list marks contained in this block blkPlayListMark( ). According to the next for loop statement, information of play list marks for the number represented by the field NumberofPlayListMarks is described.

In the for loop statement, followed by an area reserved having a data length of 8 bits, a field MarkType is placed. The field MarkType has a data length of 8 bits and represents the type of a mark. Play list marks are defined as two types of marks that are an entry mark (Entry Mark) and a link point (Link Point). This field MarkType represents one of these types. To define a chapter, an entry mark is used. Since link points less relate to the present invention, its description will be omitted. The foregoing field NumberOfPlayListMarks represents the total value of entry marks and link points.

A field RefToPlayItemID has a data length of 16 bits and describes identification information PlayItem_id that represents a play item to which a mark is placed. A field MarkTimeStamp has a data length of 32 bits and describes a time stamp that represents a point to which a mark is placed. A field EntryESPID has a data length of 16 bits and represents the value of the PID of a TS packet that contains an elementary stream represented by a mark. A field Duration is an unsigned integer that has a data length of 32 bits and that represents a measured result in the unit of a 45 kHz clock. When the value stored in this field Duration is "0", this field is meaningless.

FIG. 15 shows syntax that represents an example of the structure of a clip information file. A field TypeIndicator has a data length of 32 bits (4 bytes) and denotes that this file is a clip information file. A field TypeIndicator2 has a data length of 32 bits (4 bytes) and represents the version of this clip information file.

This clip information file has a block blkClipInfo( ), a block blksequenceInfo( ), a block blkProgramInfo( ), a block blkCPI( ), a blockblkClipMark( ), and a block blkExtensionData( ). A field SequenceInfoStartAddress, a field ProgramInfoStartAddress, a field CPIStartAddress, a field ClipMarkStartAddress, and a field ExtensionDataStartAddress each have a data length of 32 bits and represent the start address of their corresponding block.

The field ExteensionDataStartAddress represents the start address of the block blkExtensionData( ) as the relative number of bytes from the beginning of bytes of this clip information file. The relative number of bytes starts with "0". If the value of this field ExtensionDataStartAddress is "0", it denotes that the block blkExtensionData( ) does not exist in this file "index.bdmv".

The block blkClipInfo( ) after an area reserved having a data length of 96 bits preceded by the fields that represents their start address. The block blkClipInfo( ) describes information about a clip AV stream that this clip information file manages. The block blksequenceInfo( ) describes information with which sequences having continuous STCs and ATCs (arrival time base) are managed as one sequence. The block blkProgramInfo( ) describes information, for example, about the encoding system and aspect ratio of the clip AV stream managed in this clip information file. The block blkCPI( ) stores information, for example, about characteristic point information CPI that represents characteristic points such as a random access start point in the AV stream.

The block blkClipMark( ) describes an index point (jump point) such as a chapter position added to a clip for a cue operation. The block blkExtensionData( ) is an area that can store extension data. Since the block blkClipMark( ) and the block blkSequenceInfo( ) in the clip information file less relate to the present invention, their description will be omitted.

FIG. 16 shows syntax that represents an example of the structure of a block blkClipInfo( ). A field Length has a data length of 32 bits and represents the data length immediately after this field Length until the end of the block blkClipInfo( ). Followed by an area reserved having a data length of 16 bits, a field ClipStreamType is placed.

The field ClipStreamType has a data length of 8 bits and represents the type of a clip AV stream. The value of this field ClipStreamType is fixed, for example, "1". A field ApplicationType has a data length of 8 bits and denotes how a clip AV stream (a file having an extension "m2ts") has been multiplexed. When the value of the field ApplicationType is "1", the corresponding clip AV stream is reproduced as a regular moving picture. The field ApplicationType is followed by an area reserved having a data length of 31 bits.

A flag IsCC5 has a data length of 1 bit and denotes whether or not the corresponding clip and the next clip are connected by the foregoing first seamless connection, namely the method of which the value of the field ConnectionCondition is "5" with the block blkPlayItem( ) of the play list. When the value of the flag IsCC5 is "1" (binary value), it denotes that clips are connected by the first seamless connection.

A field TSRecordingRate represents the recording rate of a clip AV stream file in the unit of bytes/second. A field NumberofSourcePackets represents the number of source packets contained in a clip AV stream. Followed by an area reserved having a data length of 1024 bits, a block TSTypeInfoBlock( ) is placed. The block TSTypeInfoBlock( ) stores information that represents the type of packets that store a clip AV stream. Since this block TSTypeInfoBlock( ) less relates to the present invention, its detailed description will be omitted.

When the value of the foregoing flag IsCC5 is "1", followed by an if statement, information is described. Followed by an area reserved having a data length of 8 bits after the if statement, a field FollowingClipStreamType is placed. The field FollowingClipStreamType has a data length of 8 bits and represents the type of a clip preceded by the clip corresponding to the clip information file. Followed by an area reserved having a data length of 32 bits, a field FollowingClipInformaionFileName is placed.

The field FollowingClipInformaionFileName has a data length of 40 bits and describes the file name of the clip information file corresponding to the next clip of the clip corresponding to this clip information file. The next field ClipCodecIdentifier has a data length of 32 bits (4 bytes) and represents the encoding system of the next clip. In this example, the field ClipCodecIdentifier is a fixed four-letter character string "M2TS" encoded according to a system prescribed in the ISO 646. Next, an area reserved having a data length of 8 bits is placed.

FIG. 17 shows syntax showing an example of the structure of a block blkProgramInfo( ). A field Length has a data length of 32 bits and represents the data length immediately after this field Length until the end of the block blkProgramInfo( ). Followed by an area reserved having a data length of 15 bits, a fixed value "1" having a data length of 1 bit is described.

A field SPNProgramSequenceStart has a data length of 32 bits and describes a source packet number with which a program sequence starts in the corresponding clip AV stream. A field ProgramMapPID has a data length of 16 bits and represents the value of the PID of a TS packet that contains a program map section applicable to the program sequence. A field NumberOfStreamsInPS has a data length of 8 bits and represents the number of elementary streams defined in the program sequence. The field NumberOfStreamsInPS is followed by an area reserved having a data length of 8 bits.

According to the next for loop statement, with a loop variable of a value [stream_index], pairs of a field StreamPID [stream_index] and a block blkStreamCodingInfo(stream_index) are stored for the number represented by the field NumberofStreamInPS. The field StreamPID[stream_index] represents the value of the PID corresponding to the elementary stream described in the PMT (Program Map Table) referred by the program sequence. The next block blkStreamCodingInfo(stream_index) describes information about the encoding system of the elementary stream represented by the corresponding field StreamPID[stream_index].

FIG. 18 shows syntax that represents an example of the structure of a block blkStreamCodingInfo(stream_index). A field Length has a data length of 8 bits and represents the data length immediately after this field Length to the end of the block blkStreamCodingInfo(stream_index).

The field Length is followed by a field StreamCodingType having a data length of 8 bits. The field StreamCodingType represents the encoding type of the elementary stream represented by the value [stream_index]. As the value of the field StreamCodingType, for example, value "0x1B", value "0x80", value "0x81", value "0x90", and value "0x91" are defined. When the value of the field StreamCodingType is "0x1B", it denotes that the encoding type of the stream is a video stream. When the value of the field StreamCodingType is "0x80" or "0x81", it denotes that the encoding type of the stream is an audio stream. When the value of the field StreamCodingType is "0x90", it denotes that the encoding type of the stream is an OB stream. When the value of the field StreamCodingType is "0x91", it denotes that the encoding type of the stream is an MB stream. According to the next if statement, information is described on the basis of the value of this field StreamCodingType.

When the value of field StreamCodingType is, for example, "0x1B" and thereby the elementary stream represented by the value [stream_index] is a video stream, according to the if statement, a field VideoFormat, a field FrameRate, and a field AspectRatio are described, followed by an area reserved having a data length of 2 bits, and a flag CCFlag is described. After the flag CCFlag, an area reserved having a data length of 17 bits and an area reserved having a data length of 128 bits are placed.

The field VideoFormat has a data length of 4 bits and represents the format of video data represented by the value [stream_index]. FIG. 19 shows an example of a list of formats of video data represented by the field VideoFormat. As exemplified in FIG. 19, the format of video data is identified by value "0" to value "15" represented by 4 bits. Value "0" and value "8" to value "15" are reserved. Value "1" to value "7" represent 480i, 576i, 480p, 1080i, 720p, 1080p, and 576p of formats of video data, respectively.

Suffixes "i" and "p" of the video formats represent interlace scanning and progressive scanning, respectively. On the other hand, numerals of the video formats represent the numbers of scanning lines. These video formats have been standardized by ITU (International Telecommunication Union)-R, BT.601-4 (480i and 576i), ITU-R BT.1358 (576p), SMPTE (Society of Motion Picture and Television Engineers) 293M (480p), SMPTE 274M (1080i and 1080p) and SMPTE 296M (720p).

In the block blkStreamcodingInfo(stream_index), the field FrameRate has a data length of 4 bits and represents the frame rate of video data represented by the value [stream_index]. FIG. 20 shows an example of a list of frame rates represented by the field FrameRate. As exemplified in FIG. 20, the frame rates of video data are identified by value "0" to value "15" represented by 4 bits. Value "0", value "5", and value "8" to value "15" are reserved. Value "1" to value "4" represent (24000/1001) Hz (namely around 23.97 Hz), 24 Hz, 25 Hz, and (30000/1001) Hz (namely around 29.97 Hz) as frame rates (field frequencies), respectively. Value "6" and value "7" represent 50 Hz and (60000/1001) Hz (namely around 59.94 Hz) as frame rates, respectively.

In the block blkStreamCodingInfo(stream_index), the field AspectRatio has a data length of 4 bits and represents the aspect ratio of video data represented by the value [stream_index]. FIG. 21 shows an example of a list of frame rates represented by the field AspectRatio. As exemplified in FIG. 21, the aspect ratio of video data is identified by value "0" to value "15" of the field AspectRatio represented by 4 bits. Value "0", value "1", and value "4" to value "15" are reserved. Value "2" represents 4:3 as an aspect ratio. Value "3" represents 16:9 as an aspect ratio.

In the block blkStreamCodingInfo(stream_index), when the value of the field StreamCodingType is "0x80", "0x81", "0x90", or "0x91", according to the description of "else if" of the if statement, information is described on the basis of the encoding type represented by the value. Since the description about streams of encoding types other than a video stream less relates to the present invention, the detailed description will be omitted.

FIG. 22 shows syntax that represents an example of the structure of a block blk(PIC) of a clip information file. In an encoded stream such as an MPEG stream that has been interframe compressed, the decoding start position is limited to a part of the encoded stream such as the beginning of a GOP (Group Of Picture). A CPI (Characteristic Point Information) is a database of information of decoding start positions. The CPI correlates reproduction times and addresses of a file. In other words, the CPI has a table of information that represents start positions of decoding units.

When such a database is defined, if video data are reproduced from any time, the address of the file corresponding to the reproduction position can be obtained by referring to the CPI on the basis of the reproduction time. Since this address is the beginning of a decoding unit, the player can read the data from the address of the file and quickly display a picture.

The start position of a decoding unit contained in the CPI (in this example, the start position of a GOP) is referred to as an EP (Entry Point) entry.

In FIG. 22, a field Length has a data length of 32 bits and represents the data length immediately after this field Length until the end of the block blkCPI( ). According to the next if statement, unless the value of the field Length is "0", followed by an area reserved having a data length of 12 bits, a field CPIType is placed. The field CPIType has a data length of 4 bits and represents the type of the CPI. The next block blkEPMap stores a table that associates PTS values with byte addresses of the corresponding clip AV stream file.

FIG. 23 shows syntax that represents an example of the structure of a block blkEPMap( ). Followed by an area reserved having a data length of 8 bits, a field NumberOfStreamPIDEntries is placed. The field NumberOfStreamPIDEntries has a data length of 8 bits and represents the number of entries of blocks blkEPMapForOneStreamPID's in the block blkEPMap( ). According to a for loop statement, with a loop variable of a value [k], information about entry points is described for the number represented by the field NumberOfStreamPIDEntries.

In the for loop statement, a field StreamPID[k] has a data length of 16 bits and represents the value of the PID of a transport packet that transports an elementary stream referred from a block blkEPMapForOneStreamPID as a 14-th entry of the block blkEPMap( ) (hereinafter, described as the [k]-th block blkEPMapForOneStreamPID).

Followed by an area reserved having a data length of 10 bits, a field EPStreamType[k] is placed. The field EPStreamType[k] has a data length of 4 bits and represents the type of an elementary stream referred from the [k]-th block blkEPMapForOneStreamPID. A field NumberOfEPCoarseEntries[k] has a data length of 16 bits and represents the number of entries in a coarse unit search sub table (EP coarse table) in the [k]-th block blkEPMapForOneStreamPID. A field NumberOfEPFineEntries[k] has a data length of 18 bits and represents the number of entries in a fine unit search sub table (EP file table) in the [k]-th block blkEPMapForOneStream-PID. A field EPMapForOneStreamPIDStartAddress[k] has a data length of 32 bits and represents the relative byte position of the beginning of the [k]-th block blkEPMapForonestreampID in the block blkEPMap( ). This value is represented by the number of bytes from the first byte of the block blkEPMap( ).

After the description of the foregoing for loop statement, followed by a padding word having a data length of an integer multiple of 16 bits, according to a for loop statement, with a loop variable of a value [k], blocks blkEPMapForOneStreamPID(EPStreamType[k], NumberOfEPCoarseEntries[k], and NumberOfEPFineEntries[k])'s are stored for the number represented by the field NumberOfStreamPIDEntries. In other words, the argument NumberOfEPCoarseEntries[k] represents the number of entries PTSEPCoarse's and entries SPNEPCoarse's stored in the sub table (EP coarse table). Likewise, the argument NumberOfEPFineEntries[k] represents the number of entries PTSEPFine's and entries SPNEPFie's stored in the sub table (EP fine table). Hereinafter, the argument NumberOfEPCoarseEntries[k] and the argument NumberOfEPFineEntries[k] are sometimes referred to as the number of entries Nc and the number of entries Nf, respectively.

FIG. 24 shows syntax that represents an example of the structure of a block blkEPMapForOneStreamPID(EP_stream_type, Nc, Nf). To describe semantics of the block blkEpMapForonestreamPID(EP_stream_type, Nc, Nf), meaning of an entry PTSEPStart and an entry SPNEPStart that are entries as the sources of data stored in the block blkEPMapForOneStreamPID(EP_stream_type, Nc, Nf) will be described.

An entry PTSEPStart and an entry SPNEPStart associated with the entry PTSEPStart represent entry points of an AV stream. An entry PTSEPFine and an entry PTSEPCoarse associated with an entry PTSEPFine are obtained from the same entry PTSEPStart. In addition, an entry SPNEPFine and an entry SPNEPCoarseassociated with an entry SPNEPFine are obtained from the same entry SPNEPStart.

Figure 25:
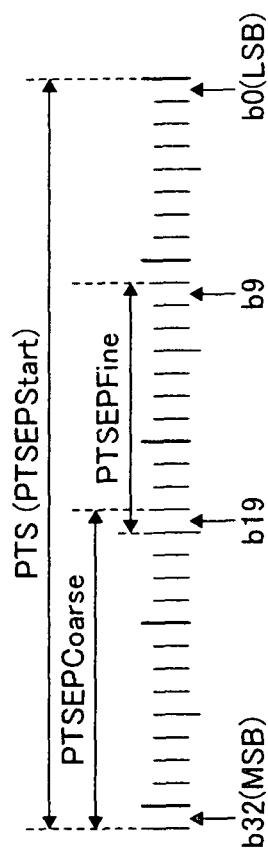
FIG. 25 is a schematic diagram showing an example of the formats of an entry PTSEPCoarse and an entry PTSEPFine.

FIG. 25 shows an example of formats of the entry PTSEPCoarse and the entry PTSEPFine. The PTS, namely the entry PTSEPStart, has a data length of 33 bits. When the MSB and the LSB of the entry PTSEPStart are 32-th bit and 0-th bit, respectively, in the example shown in FIG. 25, 14 bits from the 32-th bit to the 19-th bit of the entry PTSEPStart are used for the entry PTSEPCoarse for a coarse unit search. The entry PTSEPCoarse allows for a search with a resolution in the range from 5.8 seconds, to 26.5 hours. Eleven bits from the 19-th bit to the 9-th bit of the entry PTSEPStart are used for the entry PTSEPFine for a fine unit search. The entry PTSEPfine allows for a search with a resolution in the range from 5.7 milliseconds to 11.5 seconds. The 19-th bit of the entry PTSEPStart is commonly used for the entry PTSEPCoarse and the entry PTSEPFine. Nine bits from the 0-th bit to the 8-th bit on the LSB side of the entry PTSEPStart are not used.

FIG. 26 shows an example of the formats of the entry SPNEPCoarse and the entry SPNEPFine. The source packet number, namely the entry SPNEPStart has a data length of 32 bits. When the MSB and the LSB of the entry SPNEPStart are 31-st bit and 0-th bit, in the example shown in FIG. 26, all bits from the 31-st bit to the 0-th bit of the entry SPNEPStart are used for the entry SPNEPCoarse for a coarse unit search. Seventeen bits from the 16-th bit to the 0-th bit of the entry SPNEPStart are used for the entry SPNEPFine for a fine unit search. The entry SPNEPFine allows for a search for up to around 25 MB (Mega Byte) AV stream file.

For a source packet number, a predetermined number of bits on the MSB side of the entry SPNEPCoarse may be used. For example, seventeen bits from the 31-St bit to the 16-th bit of the entry SPNEPStart may be used for the entry SPNEPCoarse and seventeen bits from the 16-th bit to the 0-th bit of the entry SPNEPStart may be used for the entry SPNEPFine.

Based on the foregoing, the entry PTSEPStart and the entry SPNEPStart are defined as follows.

As shown in FIG. 25, the entry PTSEPStart is an unsigned integer that has a data length of 33 bits and represents a PTS having a data length of 33 bits of a video access unit that starts with a random accessible picture (for example, an IDR (Instantaneous Decoding Refresh) picture or an I (Intra) picture) of an AV stream.

As shown in FIG. 26, the entry SPNEPStart is an unsigned integer having a data length of 32 bits and represents the address of a source packet including the first byte of a video access unit associated with the entry PTSEPStart in an AV stream file. The entry SPNEPStart is represented as a source packet number. The entry SPNEPstart is counted as a value that starts with "1" and increments by 1 for each source packet from the first source packet of an AV stream file.

Referring to FIG. 24, the block blkEPMapForOneStreamPID(EP_stream_type, Nc, Nf) describes a first for loop statement and a second for loop statement. The first for loop statement describes a sub table (EP coarse table) for a coarse unit search. The second for loop statement describes a sub table (EP fine table) for a fine unit search performed on the basis of the search result of the sub table (EP coarse table).

The first for loop statement is immediately preceded by a field EPFineTableStartAddress. The field EPFineTableStartAddress has a data length of 32 bits and represents the start address of the first byte of a field ReservedEPFine[EP_fine_id] of the second for loop as the relative number of bytes from the first byte of the block blkEPMapForOneStreamPID (EP_stream_type, Nc, Nf). The relative number of bytes starts with value "0".

The first for loop statement is repeated with a loop variable [i] the number of times presented by the number of entries of the sub table (EP coarse table). Pairs of a field RefToEPFineID[i], an entry PTSEPCoarse[i], and an entry SPNEPCoarse[i] are stored for the number represented by the number of entries Nc. In the first for loop statement, the field RefToEPFine[i] has a data length of 18 bits and represents the entry number in the sub table (EP fine table) of the entry PTSEPFine associated with the entry PTSEPCoarse represented by the field PTSEPCoarse[i] preceded by the field RefToEPFineID[i]. The entry PTSEPFine and the entry PTSEPCoarse associated with this entry PTSEPFine are obtained from the same entry PTSEPStart. The field RefToEPFineID[i] is obtained by the value of the loop variable [EP_fine_id] defined in the order described in the second for loop statement.

After the first for loop statement, followed by a padding word, the second for loop statement is described. The second for loop statement is repeated with a loop variable [EP_fine_id] the number of times represented by the number of entries Nf of the sub table (EP fine table). Pairs of a field ReservedEPFine[EP_fine_id] having a data length of 1 bit, a field IEndPositionOffset[EP_fine_id] having a data length of 3 bits, a field PTSEPFine[EP_fine_id] having a data length of 11 bits, and a field SPNEPFine[EP_fine_id] having a data length of 17 bit are stored for the number represented by the number of entries Nf. Among of these fields, the field PTSEPFine[EP_fine_id] and the field SPNEPFine[EP_fine_id] stores the entry PTSEPFine and the entry SPNEPFine, respectively, referred from the sub table (EP fine table) on the basis of the loop variable [EP_fine_id].

The entry PTSEPCoarse and the entry PTSEPFine and the entry SPNEPCoarse and the entry SPNEPFine are obtained as follows. Assuming that sub table (EP fine table) contains Nf entries arranged in the ascending order of the values of associated data SPNEPStart. Each entry PTSEPFine is obtained from the corresponding entry PTSEPStart according to the following formula (1).

$$\text{PTSEPFine}[EP\_fine\_id] = (\text{PTSEPStart}[EP\_fine\_id] >> 9)/2^{11}. \quad (1)$$

The relationship between the entry PTSEPCoarse and the corresponding entry PTSEPFine is expressed by the following formulas (2) and (3).

$$\text{PTSEPCoarse}[i] = (\text{PTSEPStart}[\text{RefToEPFineID}[i] >> 19)/2^{14} \quad (2)$$

$$\text{PTSEPFine}[\text{ReFToEPFineID}[i]] = (\text{PTSEPStart}[\text{RefToEPFineID}[i]] >> 9)/2^{11}. \quad (3)$$

Each entry SPNEPFine is obtained from the corresponding entry SPNEPStart according to the following formula (4).

$$\text{SPNEPFine}[EP\_fine\_id] = \text{SPNEPStart}[EP\_fine\_id]/2^{17} \quad (4)$$

The relationship between the entry SPNEPCoarse and the corresponding entry SPNEPFine is expressed by the following formulas (5) and (6).

$$\text{SPNEPCoarse}[i] = \text{SPNEPStart}[\text{RefToEPFineID}[i]] \quad (5)$$

$$\text{SPNEPFine}[\text{RefToEPFineID}[i]] = \text{SPNEPStart}[\text{RefToEPFineID}[i]]/2^{17} \quad (6)$$

In the foregoing formulas (1) to (6), symbol ">>x" denotes that bits having digits in excess of x bits on the LSB side are used.

Next, a block blkExtensionData( ) for storing extension data will be described. This block blkExtensionData( ) is defined such it can store predetermined extension data. The block blkExtensionData( ) can be described in each of the file "index.bdmv" that stores an index table, the file "xxxxx.mpls" that stores a play list, and a clip information file "zzzzz.clpi".

FIG. 27 shows syntax that represents an example of the structure of a block blkExtensionData( ). A field Length has a data length of 32 bits and represents the data length immediately after this field Length until the end of the block blkExtensionData( ) in bytes. Unless the data length represented by the field Length is "0", followed by an if statement, information is described.

A field DataBlockStartAddress has a data length of 32 bits and represents the start address of a block DataBlock( ) that stores the main body of extension data of this syntax as the relative number of bytes from the beginning of bytes of the block blkExtensionData( ). In other words, the relative number of bytes starts with "0". The field DataBlockStartAddress needs to satisfy a 32-bit alignment condition that follows.

$$\text{DataBlockStartAddress} \% 4 = 0$$

Followed by an area reserved having a data length of 24 bits, a field NumberofExtDataEntries is placed. The field NumberOfExtDataEntries has a data length of 8 bits and represents the number of entries of extension data stored in the block DataBlock( ) of the block blkExtensionData( ). Entries of extension data store information necessary to obtain the main body of extension data. In this example, entries of extension data are a block ext_data_entry( ) that is composed of a field ExtDataType, a field ExtDataVersion, a field ExtDataStartAddress, and a field ExtDataLength. In the block blkExtensionData( ), blocks ext_data_entry( )'s exist for the number represented by the field NumberofExtDataEntries according to the first for loop statement.

The field ExtDataType has a data length of 16 bits and denotes that extension data contained in this block blkExtensionData( ) are extension data for a recording apparatus. The value of this field ExtDataType is a first value with which extension data are identified. The value of the field ExtDataType can be defined to be assigned by a licensor of a standard including this block blkExtensionData( ). The field ExtDataVersion is a second value with which extension data are identified. The field ExtDataVersion can be defined to represent the version number of this extension data. In this block blkExtensionData( ), two or more entries of block ext_data_entry( ) cannot exist when the values of the field ExtDataType and the field ExtDataVersion of these entries are the same.

The field ExtDataStartAddress has a data length of 32 bits and represents the start address of extension data corresponding to the entry (block ext_data_entry( )) of extension data that contain this field ExtDataStartAddress. The field ExtDataStartAddress represents the start address of extension data ext_data as the relative number of bytes from the beginning of bytes of the block blkExtensionData( ). The field ExtDataStartAddress needs to satisfy a 32-bit alignment condition that follows.

$$\text{ExtDataStartAddress} \% 4 = 0$$

The field ExtDataLength has a data length of 32 bits and represents the data length of extension data corresponding to the entry (block ext_data_entry( )) of extension data that contain the field ExtDataStartAddress. The data length is represented in bytes.

When entries (blocks ext_data_entry( )'s) of extension data are described for the number represented by the field NumberOfExtDataEntries, a field padding_word having a data length of 16 bits and composed of any data sequence is repeated the number of times L1 as pairs of two fields. Thereafter, the block DataBlock( ) that stores the main body of extension data is described. The block DataBlock( ) stores at least one entry of extension data. Each entry of extension data ext_data is obtained from the block DataBlock( ) based on the foregoing field ExtDataStartAddress and field ExtDataLength.

Figure 28:
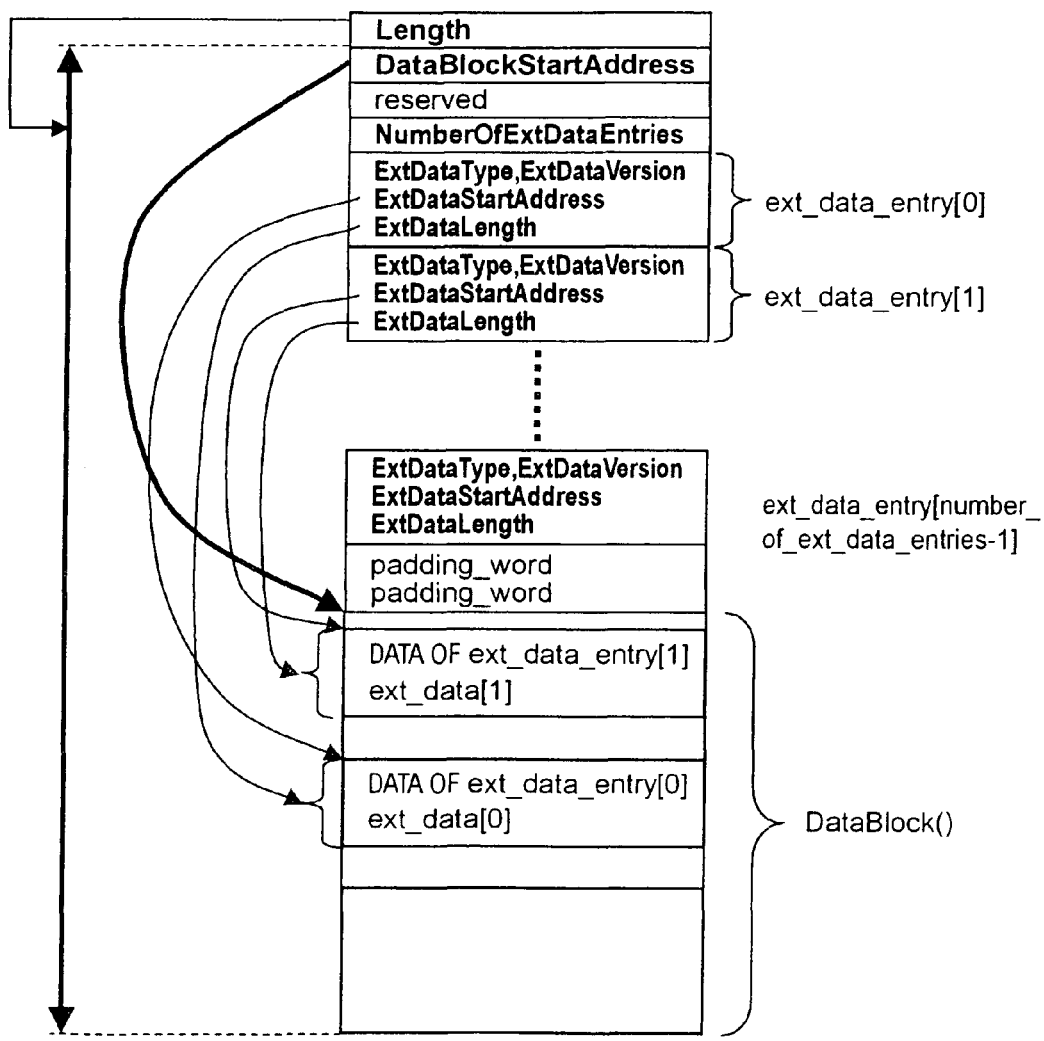
FIG. 28 is a schematic diagram showing a reference relationship of each entry of data of a block blkExtensionData( )

FIG. 28 shows the relationship of references of entries of data in the block blkExtensionData( ). A field length represents the data length immediately after the field Length until the end of the block blkExtensionData( ). A field DataBlockStartAddress represents the start position of a block DataBlock( ). Blocks ext_data_entry's are described for the number represented by a field NumberOfExtDataEntries. A field padding_word having any data length is placed between the last block ext_data_entry and the block DataBlock( ).

In the block DataBlock( ), extension data ext_data represented by a block ext_data_entry( ) is placed. The position and data length of each of extension data ext_data's are represented by a field ExtDataStartAddress and a field ExtDataLength of the corresponding block ext_data_entry( ). Thus, the order of extension data ext_data's in the block DataBlock( ) may not need to match the order of the corresponding block' ext_data_entry( )'s.

When extension data are structured in two layers of the block DataBlock( ) that stores the main body of the extension data and the block ext_data_entry( ) that stores access information for extension data contained in the block DataBlock( ), a plurality of entries of extension data can be stored.

Figure 29:
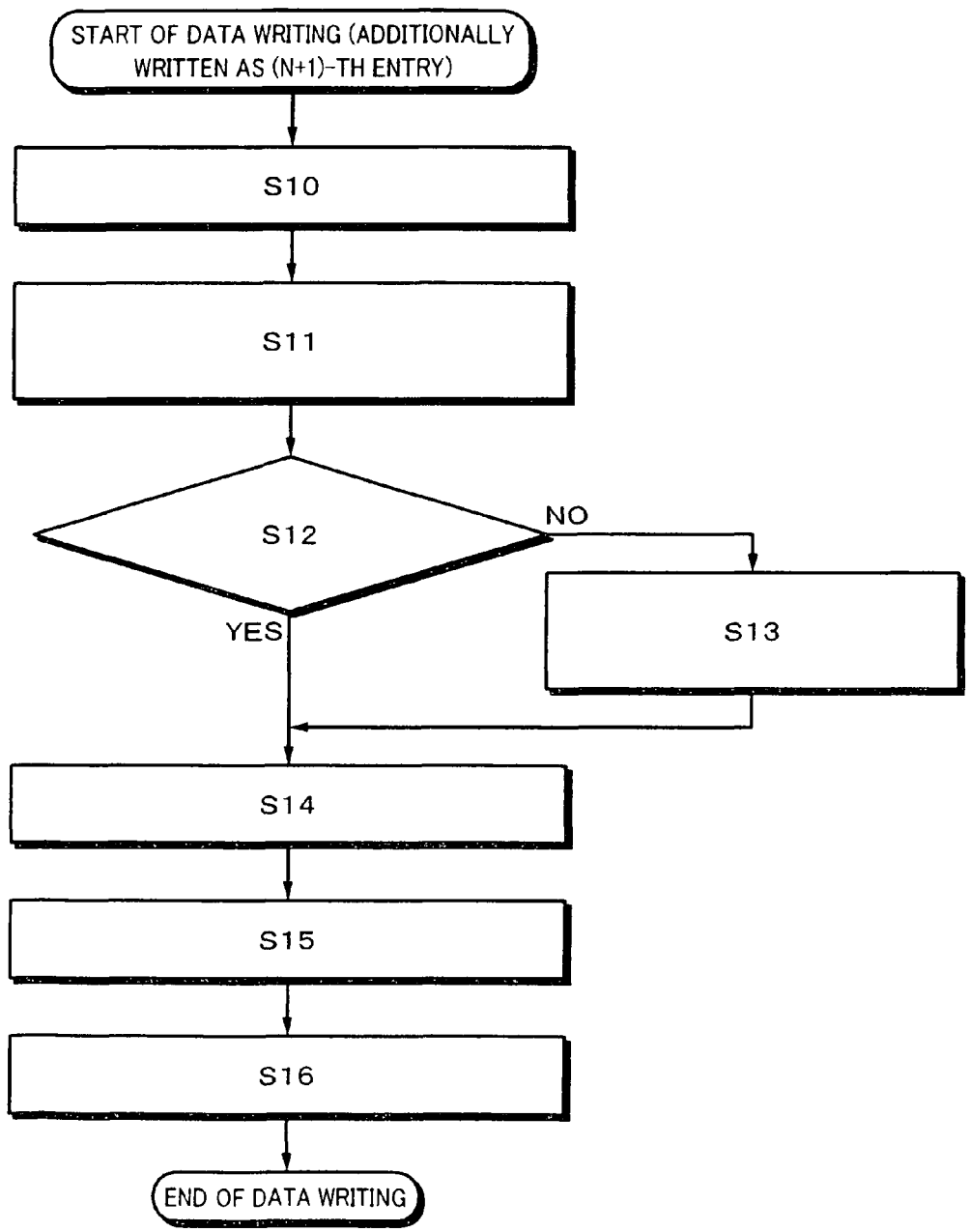
FIG. 29 is a flow chart showing an example of a process of writing data to a block blkExtensionData( )

Next, an example of a method of creating and reading the foregoing extension data will be described. FIG. 29 is a flow chart showing an example of a process of writing data in the block blkExtensionData( ). FIG. 29 shows an example of which extension data are added as an (n+1)-th entry to the block blkExtensionData( ) such that the block blkExtensionData( ) is rewritten.

First of all, at step S10, the data length of extension data to be written is obtained and set as the value of the field ExtDataLength[n+1]. The notation "[n+1]" represents an (n+1)-th entry number. At the next step S11, the values of the field ExtDataLength and the field ExtDataStartAddress of blocks ext_data_entry( )'s listed in the current block blkExtensionData( ) are checked and the use state of the block DataBlock( ) is obtained.

At the next step S12, it is determined whether or not the block DataBlock( ) has a continuous free area equal to or larger than the data length represented by the field ExtDataLength[n+1] that represents the data length of extension data to be written. When the determined result denotes that block DataBlock( ) has such an area, the flow of the process advances to step S14.

In contrast, when the determined result denotes that the block DataBlock( ) does not have a continuous free area that is in excess of the data length represented by the field ExtDataLength[n+1], the flow of the process advances to step S13. At step S13, the value of the field Length of the block blkExtensionData( ) is increased such that a continuous free area that is equal to or larger than the data length represented by the field ExtDataLength[n+1] is created in the block DataBlock( ). After such a free area has been created, the flow of the process advances to step S14.

At step S14, the start address of the area in which the extension data are written is decided such that the value of the start address is set to the field ExtDataStartAddress[n+1]. At the next step S15, the extension data ext_data[n+1] having the data length represented by the field ExtDataLength[n+1] that has been set at step S10 are written from the field ExtDataStartAddress[n+1].

After the data have been written, the flow of the process advances to step S16. At step S16, the field ExtDataLength[n+1] and the field ExtDataStartAddress[n+1] are added to the block ext_data_entry( ).

In the foregoing, it is assumed that the block blkExtensionData( ) to be rewritten has been read from a record medium such as a disc and stored in the memory of the recording apparatus. Thus, the increase of the block blkExtensionData( ) by changing the value of the field Length at step S13 is performed by the system. The system properly allocates the memory.

Figure 30:
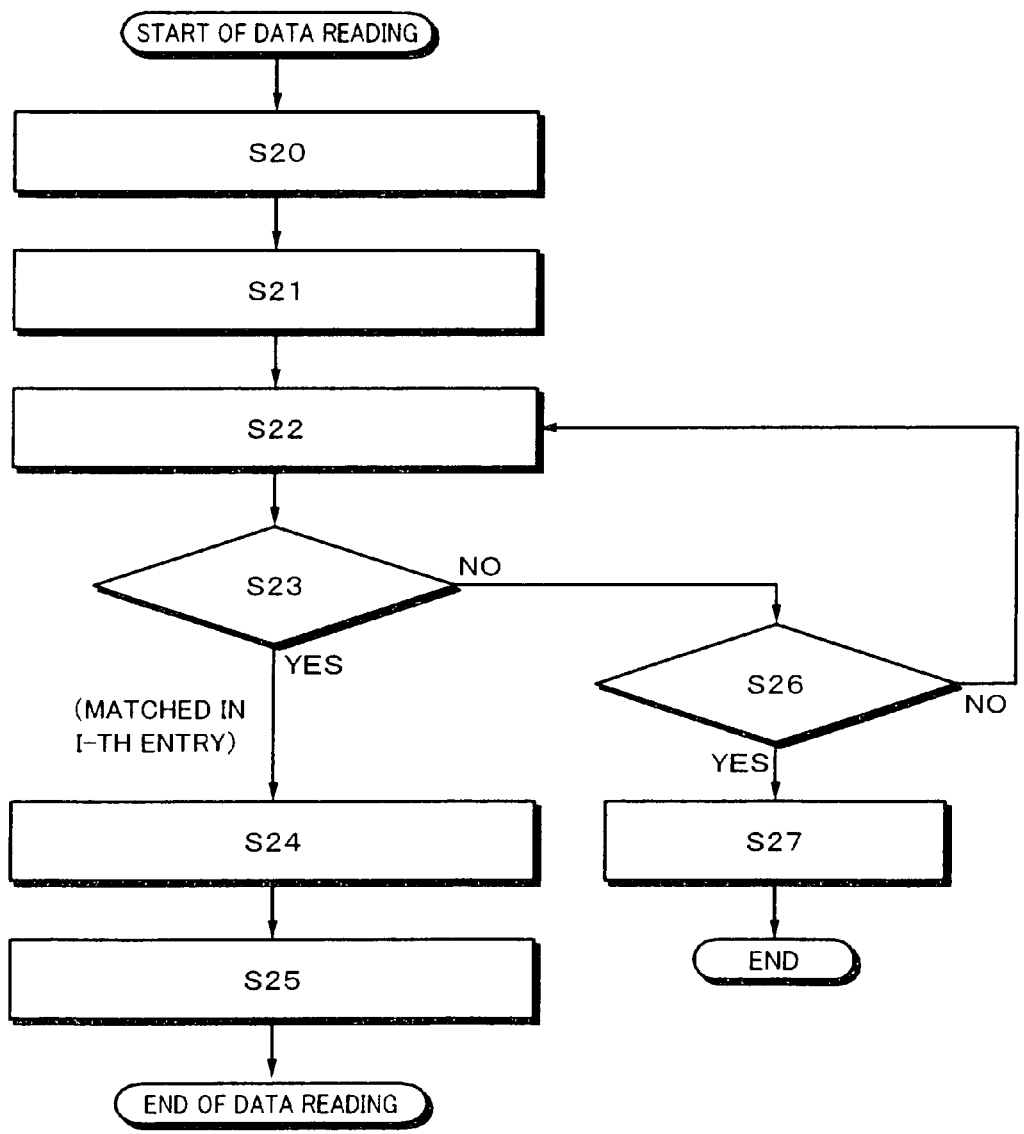
FIG. 30 is a flow chart showing an example of a process of reading extension data from a block blkExtensionData( )

FIG. 30 is a flow chart showing an example of a process of reading extension data from the block blkExtensionData( ). The process of the flow chart shown in FIG. 30 can be applied both to a reproduction-only record medium and a recordable record medium. First of all, at step S20, the value of the field ExtDataType is obtained from the standard on which extension data to be read are based. At step S21, the value of the field ExtDataVersion is obtained from the type of extension data to be read.

At the next step S22, each of blocks ext_data_entry( )'s listed in the block blkExtensionData( ) is read one by one. At step S23, it is determined whether or not the values of the field ExtDataType and the field ExtDataVersion of each of blocks ext_data_entry( )'s match the values of the field ExtDataType and the field ExtDataVersion obtained at the foregoing steps S20 and S21.

When the determined result denotes that they do not match, the flow of the process advances to step S26. At step S26, it is determined whether or not all blocks ext_data_entry( )'s listed in the block blkExtensionData( ) have been read. When the determined result denotes that all blocks ext_data_entry( )'s have been read, the flow of the process advances to step S27. At step S27, since extension data to be read do not exist in the block blkExtensionData( ), the process is completed. In contrast, when the determined result denotes that all blocks ext_data_entry( )'s have not been read, the flow of the process returns to step S22. At step S22, the next block ext_data_entry( ) is read.

When the determined result at step S23 denotes that the values of the field ExtDataType and the field ExtDataVersion of the block ext_data_entry( ) match the values of the field ExtDataType and the field ExtDataVersion obtained at the foregoing steps S20 and S21, the flow of the process advances to step S24. In this example, it is assumed that they match for the [i]-th entry of the block blkExtensionData( ).

At step S24, the value of the field ExtDataLength[i] and the value of the field ExtDataStartAddress[i] are read from the [i]-th entry of the block ext_data_entry( ). At step S25, data are read from the address represented by the field ExtDataStartAddress[i] that has been read at step S24 for the data length represented by the field ExtDataLength[i].

Next, the extension data block blkExtensionData( ) that stores extension data and that can be defined in the foregoing index file "index.bdmv", movie object file "MovieObject.bdmv, play list file xxxxx.mpls", and clip information file "zzzzz.clpi" will be described.

First of all, an example of an extension data block defined in the index file "index.bdmv" will be described. In this example, an extension data block of which attribute information unique to a recordable record medium is added to each play list will be described. FIG. 31 shows syntax that represents an example of the structure of a block DataBlock( ) (refer to FIG. 27) of a block blkExtensionData( ) in the file "index.bdmv". In the example shown in FIG. 31, the block DataBlock( ) is described as the block blkIndexExtensionData( ).

First of all, with reference to FIG. 27, value "0x1000" and value "0x0100" are set to the field ExtDataType and the field ExtDataVersion of the block blkExtensionData( ), respectively. The values that have been described in these field ExtDataType and field ExtDataVersion are identified with reference to a table that has been stored, for example, in the ROM (Read Only Memory) on the reproducing apparatus side. The block blkIndexExtensionData( ) is stored in an area represented by the field ExtDataStartAddress and the field ExtDataLength in the block DataBlock( ).

In the block blkIndexExtensionData( ), a field TypeIndicator describes a four-letter character string encoded according to an encoding system prescribed in the ISO 646. The four-letter character string represents the type of data that follow. In the example shown in FIG. 31, the field TypeIndicator describes a four-letter character string "IDEX" that has been encoded according to the system prescribed in the ISO 646 and that denotes that the type of data that follow is extension data of an index file.

The field TypeIndicator is followed by an area reserved having a data length of 32 bits, followed by a field TableofPlayListStartAddress having a data length of 32 bits. The field TableOfPlayListStartAddress represents the start address of the block blkTableOfPlayList( ) based on the beginning of this block blkIndexExtensionData( ).

The field TableOfPlayListStartAddress is followed by a field MakersPrivateDataStartAddress having a data length of 32 bits. The field MakersPrivateDataStartAddress represents the start address of a block blkMakersPrivateData( ) based on the beginning of the block blkIndexExtensionData( ). Followed by an area reserved having a data length of 192 bits, a block blkUIAppInfoAVCHD( ) is placed. A padding word padding_word having a data length of 16 bits is repeated the number of times represented by a value N1. Thereafter, the block blkTableofPlayList( ) is placed. Thereafter, a padding word padding_word having a data length of 16 bits is repeated the number of times represented by a value N2. Thereafter, a block blkMakersPrivateData( ) is placed. The block blkMakersPrivateData( ) is followed by a padding word padding_word having a data length of 16 bits. The padding word padding_word is repeated the number of times represented by a value N3.

Since the block blkUIAppInfoAVCHD( ) and the block blkMakersPrivateData( ) less relate to the present invention, their description will be omitted.

FIG. 32 shows syntax that represents an example of the structure of the foregoing block blkTableofPlayList( ). A field length has a data length of 32 bits and represents the data length immediately after this field Length until the end of the block blkTableOfPlayList( ) in bytes. The field Length is followed by a block blkFirstPlaybackTitlePlayLists( ) that describes information about a play list with which a playback title is reproduced and a block blkMenuTitlePlayLists( ) that describes information about a menu title. Since these block blkFirstPlaybackTitlePlayLists( ) and block blkMenuTitlePlayLists( ) less relate to the present invention, their description will be omitted.

Thereafter, a field NumberofTitlePlayListPair having a data length of 16 bits is placed. The field NumberOfTitlePlayListPair describes the number of play lists with which a title other than a playback title and a menu title is reproduced. According to the next for loop statement, blocks blkMovieTitlePlayListPair( )'s are described for the number represented by the field NumberOfTitlePlayListPair. The block blkmovieTitlePlayListPair( ) contains a field PlayListFileName, a field PlayListAttribute, and a field RefToTitleId. In other words, the block blkMovieTitlePlayListPair( ) structurizes information of composed of the file name, attributes, and reference title ID for the [i]-th play list represented by this for loop statement.

Entries in the for loop statement are based on the order of which they are recorded. In other words, when one play list is added, the value of the field NumberOfTitlePlayListPair is incremented by "1" and information of the added play list is additionally written after information of existing play lists.

The field PlayListFileName has a data length of 40 bits (5 bytes) and describes the file name of the play list that has been encoded according to an encoding system prescribed in the ISO 646. The field PlayListFileName is followed by an area reserved having a data length of 6 bits, followed by the field PlayListAttribute. The field PlayListAttribute has a data length of 2 bits and represents an attribute assigned to the current play list. Play lists are categorized on the basis of their causes as a first type created together with a clip, a second type corresponding to a play list created with an existing title or all or a part of a play list, and a third type used to reproduce a menu. Each play list is assigned an attribute "Real" (first type), an attribute "Virtual" (second type), or an attribute "Menu" (third type) depending on the type of the play list.

Hereinafter, a play list assigned the attribute "Real" is referred to as a real play list. A play list assigned the attribute "Virtual" is referred to as a virtual play list. A play list assigned the attribute "Menu" is referred to as a menu play list.

The field RefToTitleId describes the ID (number) of the title to which the play list represented in the field PlayListFileName of the same loop belongs when the play list is created. As a more specific example, the field RefToTitleId describes the corresponding value title_id of the block blkindexes( ) in the index file "index.bdmv". When this play list is reproduced only from a first play back title, the value of the field RefToTitleId is a first fixed value, for example, "0xFFFF". On the other hand, when this play list is reproduced only from a menu title, the value of the field RefToTitleId is a second fixed value, for example, "0xFFFE".

Next, a real play list, a virtual play list, and a menu play list will be described in brief. A real play list assigned the attribute "Real" is created together with for example a clip and recorded on a disc. Since a real play list is the first play list that represents a material, it is also referred to as an original play list. For example, in a real play list, the beginning and last end of a created clip are designated as an IN point and an OUT point, respectively.

A real play list is a play list that refers to a clip that is the entity of a stream. When a clip is newly created, a real play list that refers to the created clip is always created. In other words, there is no clip that is not referred from any real play list. Thus, the total reproduction time of real play lists on a disc matches the total reproduction time of clips recorded on the disc. In other words, the remaining recordable time of the disc matches the recordable time of real play lists or a title composed of only real play lists from the view point of the user.

A real play list and a clip as a material always have the relationship of one to one. Thus, when a real play list is deleted, for example, by editing, the corresponding clip is also deleted from the disc. In addition, when a part of a real play list to which clip refers is deleted, a part of the clip corresponding to the real play list is also deleted. Thus, when a real play list is edited, the entity of a clip recorded on the disc is also changed. Thus, this editing is referred to as, for example, entity editing or real editing.

A virtual play list assigned the attribute "Virtual" is a play list created with an existing title or a part or all of a play list. A virtual play list is a play list created by setting an IN point and an OUT point to an existing clip and referring to a region defined by the IN point and the OUT point.

For example, a virtual play list designates an IN point and an OUT point for the foregoing real play list. For example, a virtual play list designates an IN point and an OUT point for each of a plurality of real play lists and designates the reproduction order of the plurality of regions designated by these IN points and OUT points. In addition, based on a virtual play list, anther virtual play list may be created. In other words, a virtual play list that designates an IN point and an OUT point for one or each of a plurality of virtual play lists can be created.

A virtual play list can be quickly created without necessity of changing a clip for example having a large size (stream entity). In addition, a virtual play list can be deleted by deleting the reference relation to a clip without necessity of changing the entity of the clip. Since a virtual play list is edited without necessity of changing the entity of a clip, this editing is referred to as virtual editing or the like.

A menu play list assigned the attribute "Menu" is a play list used to reproduce a menu. A menu play list is created when a menu is created or updated. A menu play list is a play list called from a movie object used to reproduce a menu title.

Next, an example of an extension data block defined to the play list file "xxxxx.mpls" will be described. FIG. 33 shows syntax that represents an example of the structure of a block DataBlock( ) (refer to FIG. 27) of the block blkExtensionData( ) in the play list file "xxxxx.mpls". In the example shown in FIG. 33, the block DataBlock( ) is represented as the block blkPlayListExtensionData( ).

First of all, with reference to FIG. 27, it is assumed that the values of the field ExtDataType and the field ExtDataVersion of the block blkExtensionData( ) in the play list file "xxxxx.mpls" are predetermined values, for example, value "0x1000" and value "0x0100", respectively, as in the foregoing example.

In the block blkPlayListExtensionData( ), a field TypeIndicator describes a predetermined four-letter character string that has been encoded according to an encoding system prescribed in the ISO 646 and that represents the type of data that follow. The character string described in this field TypeIndicator denotes that the type of data that follow is extension data of a play list file.

The field TypeIndicator is followed by an area reserved having a data length of 32 bits (4 bytes), followed by a field PlayListMarkExtStartAddress having a data length of 32 bits, followed by a field MakersPrivateDataStartAddress having a data length of 32 bits. The field PlayListMarkExtStartAddress and the field MakersPrivateDataStartAddress represent the start addresses of the block blkPlayListExt( ) and the block blkMakersPrivateData( ) based on the beginning of the block blkPlayListExtensionData( ).

The field MakersPrivateDataStartAddress is followed by an area reserved having a data length of 192 bits, followed by a block blkPlayListMenu( ). A padding word padding_word having a data length of 16 bits is repeated the number of times represented by a value N1. Thereafter, a block blkPlayListMarkExt( ) is placed. In addition, a padding word padding_word having a data length of 16 bits is repeated the number of times represented by a value N2, followed by a block blkMakersPrivateData( ). The block blkMakersPrivateData( ) is followed by a padding word padding_word having a data length of 16 bits. The padding word padding_word is repeated the number of times represented by a value N3.

FIG. 34 shows syntax that represents an example of the structure of the block blkPlayListMeta( ). A field Length has a data length of 32 bits and represents the data length immediately after this field Length until the end of this block blkPlayListMenu( ). The field Length is followed by a field MakerID and a field MakerModelCode each having a data length of 16 bits. The field MakerID and the field MakerModelCode describe a maker that has updated this play list file and information that identifies the model of this maker, respectively.

The field MakerModelCode is followed by an area reserved having a data length of 32 bits, followed by a field RefToMenuThumbnailIndex having a data length of 16 bits. When a thumbnail image that represents a sequence of clips reproduced by this play list file exists, this field RefToMenuThumbnailIndex describes a thumbnail number that identifies the thumbnail image. Thereafter, a block blkTimeZone( ) that has a data length of 8 bits is placed. When this play list file is updated, information that represents the time zone that has been set to the apparatus is described in the block blkTimeZone( ). Thereafter, a field RecordTimeAndData that has a data length of 56 bits is placed. The field RecordTimeAndData represents the time and data at and on which this play list file was updated.

The field RecordTimeAndData is followed by an area reserved having a data length of 8 bits, followed by a field PlayListCharacterSet and a field PlayListNameLength each having a data length of 8 bits, followed by a field PlayListName having a data length of 255 bytes. These field PlayListCharacterSet, field PlayListNameLength, and field PlayListName describes information with respect to the name of a play list represented by this play list file.

In other words, the field PlayListCharacterSet represents a character set of a character string described in the field PlayListName. The field PlayListNameLength represents the byte length of the play list name described in the field PlayListName. The field PlayListName describes the name assigned to this play list. In the field PlayListName, the number of bytes from the left represented by the field PlayListNameLength is a significant character string that is the name of this play list. In the field PlayListName, the significant character string represented by the field PlayListNameLength may be followed by any value.

The field PlayListName is followed by a block Additional_data( ). This block Additional_data( ) is a reserved area that stores additional information. In the block Additional_data( ), an area having a data length of the number of bytes represented by a field Length2 having a data length of 32 bits is reserved.

FIG. 35 shows syntax that represents an example of the structure of the block blkMakersPrivateData( ) in a play list file. The block blkMakersPrivateData( ) is a block that describes maker's unique information about this play list file. A field length has a data length of 32 bits and represents the data length immediately after this field Length until the end of this block blkMakersPrivateData( ). When the value of this field Length is "0", it denotes that this MakersPrivateData( ) does not describe information. Unless the value of the field Length is "0", followed by an if statement, information is described.

A field DataBlockStartAddress has a data length of 32 bits and represents the start address of block DataBlock( ) that stores the main body of maker's unique information in this syntax as the relative number of bytes from the beginning of this block blkMakersPrivateData( ). Followed by an area reserved having a data length of 24 bits, a field NumberOfMakerEntries having a data length of 8 bits is placed.

According to the next for statement, entries of extension data, namely fields MakerID's, fields MakerModelCode's, fields MpdStartAddress's, and fields MpdLength's, are described for the number represented by the field NumberOfMakerEntries. The field MakerID and the field MakerModelCode each have a data length of 16 bits and represent identification information of the maker and identification information of the model of the maker, respectively. The field MpdStartAddress and the field MpdLength each have a data length of 32 bits and represent the start address of the block DataBlock( ) that stores the main body of extension data from the beginning of the block blkExtensionData( ) as the relative number of bytes and the data length of the block DataBlock( ), respectively.

When entries of extension data are described for the number represented by the field NumberOfMakerEntries, a field padding_word that has a data length of 16 bits and that is composed of any data sequence is repeated the number of times L1 as pairs of two fields. Thereafter, the block DataBlock( ) that stores the main body of extension data is described. The block DataBlock( ) stores at least one extension data ext_data. In other words, maker's unique extension data are stored in the block DataBlock( ) for each maker and each model represented by the field MakerID and the field MakerModelCode, respectively. Each entry of extension data is obtained from the block DataBlock( ) based on the foregoing field MpdStartAddress and field MpdStartAddress.

Since the block blkPlayListMarkExt( ) in the block blkPlayListExtensionData( ) of extension data of a play list file less relates to the present invention, the description will be omitted.

Next, an example of an extension data block defined for the clip information file "zzzzz.clpi" will be described. FIG. 36 shows syntax that represents an example of the structure of the block DataBlock( ) (refer to FIG. 27) in the block blkExtensionData( ) in a clip information file. In the example shown in FIG. 36, the block DataBlock( ) is represented as a block blkClipExtensionData( ).

In the block blkClipExtensionData( ), a field TypeIndicator describes a predetermined character string composed of four letters that represents the type of data that follow and that has been encoded according to an encoding system prescribed in the ISO 646. The character string described in the field TypeIndicator denotes that the type of data that follow is extension data of a clip information file.

The field TypeIndicator is followed by an area reserved having a data length of 32 bits (4 bytes), followed by a field ProgramInfoExtStartAddress and a field MakersPrivateDataStartAddress each of which has a data length of 32 bits, respectively. The field ProgramInfoExtStartAddress and the field MakersPrivateDataStartAddress represent the start address of the block blkProgramInfoExt( ) and the block blkMakersPrivateData( ) in the block blkClipExtensionData( ) based on the beginning of this block blkClipExtensionData( ).

The field MakersPrivateDataStartAddress is followed by an area reserved having a data length of 192 bits, followed by a block blkClipInfoExt( ). A padding word padding_word having a data length of 16 bits is repeated the number of times represented by a value N1, followed by a block blkProgramInfoExt( ). Thereafter, a padding word padding_word having a data length of 16 bits is repeated the number of times represented by a value N2, followed by a block blkMakersPrivateData( ). The block blkMakersPrivateData( ) is followed by a padding word padding word having a data length of 16 bits. The padding word padding_word is repeated the number of times represented by a value N3.

FIG. 37 shows syntax that represents an example of the structure of the block blkClipInfoExt( ). A field Length has a data length of 32 bits and represents the data length immediately after this field Length until the end of the block blkProgramInfoExt( ). Thereafter, followed by an area reserved having a data length of 8 bits, a field NumberofProgramSequence is placed.

The field NumberOfProgramSequence has a data length of 8 bits and represents the number of entries of information of the program sequence contained in this block blkProgramInfoExt( ). In this example, the value of the field NumberOfProgramSequence is fixed to "1". According to the next first for loop statement, a field NumberOfStreamCodingInfoExtInPs[i] and the next second for loop statement are repeated the number of times represented by the field NumberOfProgramSequence. The second for loop statement stores pairs of fields StreamPIP[i][j]'s and blocks blkStreamCodingInfoExt (i, j)'s for the number represented by the field NumberOfStreamCodingInfoExtInPs[i] having a data length of 8 bits.

The field StreamPIP[i][j] has a data length of 16 bits. The field StreamPIP[i][j] composes a table designated by a value [i] and a value [j] and represents the value of the PID corresponding to an elementary stream described in a PMT (Program Map Table) referred from an [i]-th program sequence. The next block blkStreamCodingInfoExt(i, j) describes information with respect to the encoding system of the elementary stream designated by the value [i] and the value [j].

FIG. 38 shows syntax that represents an example of the structure of the block blkStreamcodingInfoExt(i, j). A field Length has a data length of 8 bits and represents the data length immediately after this field Length until the end of the block blkStreamcodingInfoExt(i, j). The next field StreamCodingType has a data length of 8 bits and represents the type of encoding of the corresponding stream. When the value of the field StreamCodingType is "0x1B", followed by an if statement, information is described. The first field HorizontalSize having a data length of 8 bits represents the vertical size of the screen, namely the number of lines of the screen. Since information preceded by the field HorizontalSize in the block blkStreamCodingInfoExt(i, j) less relates to the present invention, the description will be omitted.

In addition, since the block ClipEnfoExto and the block blkMakersPrivateData( ) in the block blkClipExtensionData( ) of a clip information file less relate to the present invention, their description will be omitted.

Next, a virtual player will be described in brief. When a disc having the foregoing data structure is loaded into a player, the player needs to convert commands contained in a movie object or the like that has been read from the disc into unique commands with which hardware of the player is controlled. The player has stored software with which such conversion is performed for these commands in a ROM (Read Only Memory) built in the player. Since this software causes the player to operate in accordance with prescriptions of the AVCHD format through the disc and the player, this software is referred to as the virtual player.

Figures 39A, 39B:
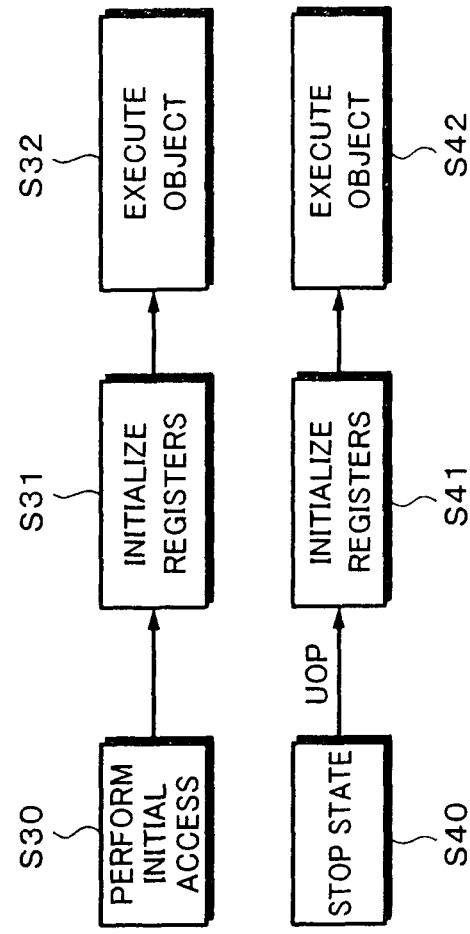
FIG. 39A and FIG. 39B are flow charts showing an outline of an operation of a virtual player.

FIG. 39A and FIG. 39B show an outline of the operation of the virtual player. FIG. 39A shows an example of which the virtual player loads a disc. When the disc is loaded into the player and the disc is initially accessed (at step S30), registers that store common parameters commonly used for one disc are initialized (at step S31). At the next step S32, a program described in a movie object or the like is read from the disc and executed. The initial access denotes that data are initially reproduced from the disc, for example, when the disc is loaded.

FIG. 39B shows an example of the operation of the player in the case that the user presses, for example, a play key in the stop state to command the player to reproduce data from the disc. In the initial stop state (at step S40), the user commands the player to reproduce data from the disc, for example, with a remote control commander or the like (UO: User Operation). When the player is commanded to reproduce data from the disc, the registers, namely common parameters, are initialized (at step S41). At the next step S42, a movie object execution phase starts.

Next, with reference to FIG. 40, the reproduction of a play list in the movie object execution phase will be described. It is assumed that by the UO or the like, the player has been commanded to start reproducing contents of title #1 from the disc. When the player has been commanded to start reproducing contents from the disc, the player refers to the index table (Index Table) shown in the foregoing FIG. 2 and obtains an object number corresponding to the reproduction of contents of title #1. Assuming that the number of an object that accomplishes the execution of contents of title #1 is #1, the player starts executing movie object #1.

Figure 40:
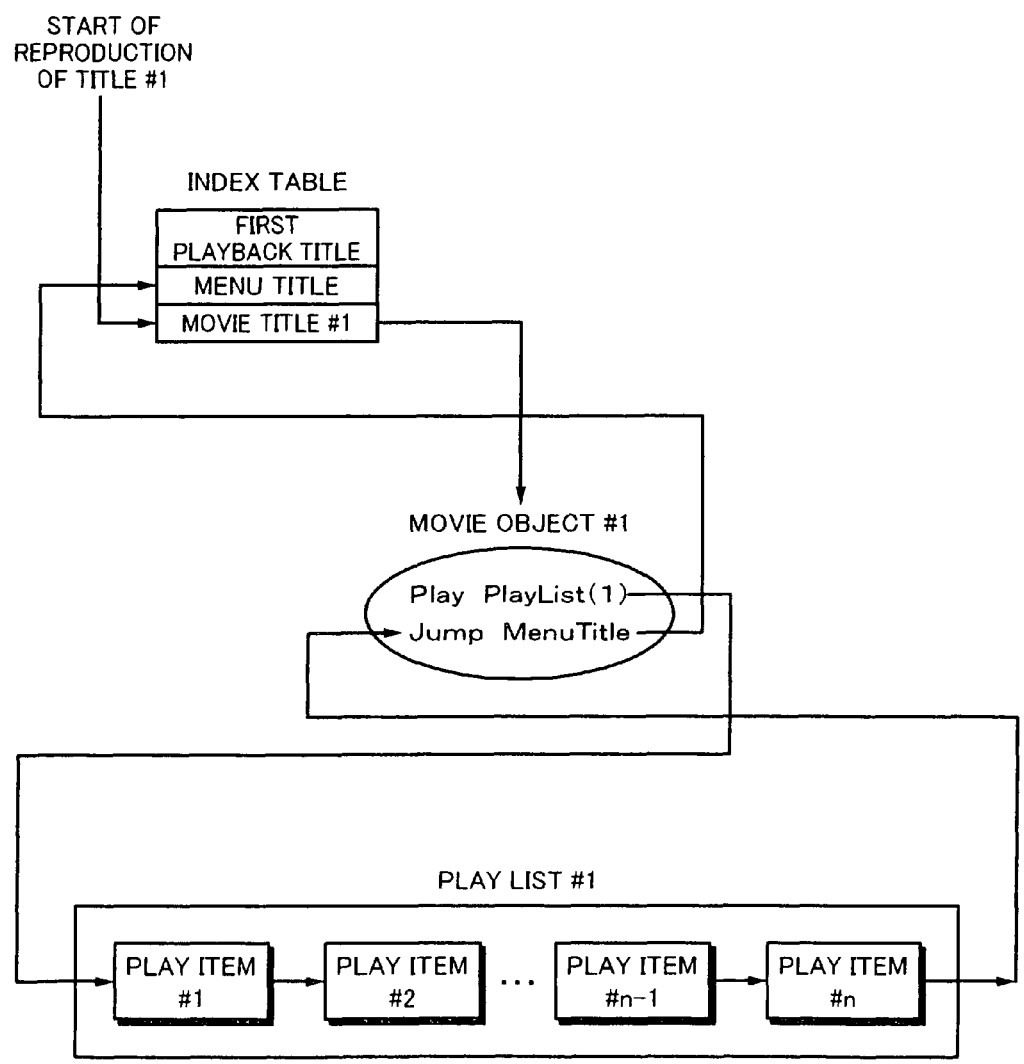
FIG. 40 is a schematic diagram showing an outline of an operation of the virtual player.

In the example shown in FIG. 40, assuming that a program described in movie object #1 is composed of two lines and a command of the first line is "Play PlayList(1)", the player starts reproducing play list #1. Play list #1 is composed of one or more play items. The player continuously reproduces the play items. After the player has completed the reproduction of all the play items of play list #1, the player restores the execution of movie object #1 and executes a command of the second line. In the example shown in FIG. 40, the command of the second line is "jump MenuTitle". The player executes this command and starts executing a movie object that accomplishes the menu title (menuTitle) described in the index table.

Next, an embodiment of the present invention will be described. According to the present invention, when a clip is recorded to a record medium, a chapter based on the clip to be recorded is additionally written to an existing play list. When a chapter is additionally written to an existing play list, it is determined whether or not the chapter based on the clip can be additionally written to the play list based on predetermined restrictions of the play list. When the determined result denotes that the chapter can be additionally written, the chapter based on the clip is additionally written to the play list. In contrast, when the determined result denotes that the chapter cannot be additionally written, a play list is newly created and the chapter based on the recorded clip is registered thereto.

When such a recording control is performed, the user can record a clip without necessity of recognizing restrictions of the play list. As a result, the operability of the apparatus is improved and the user friendliness becomes excellent.

Figure 41:
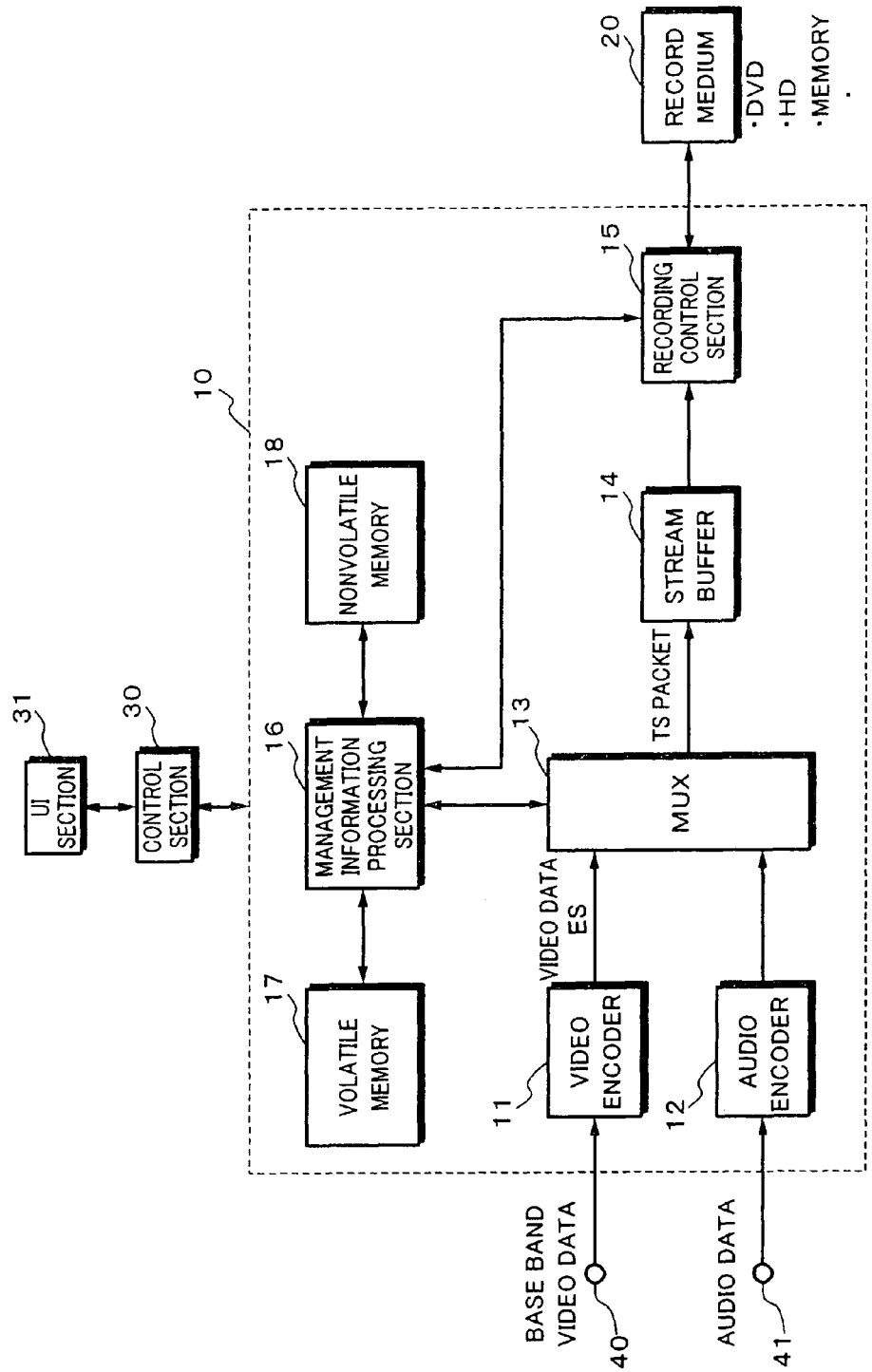
FIG. 41 is a block diagram showing an example of the structure of a recording apparatus according to an embodiment of the present invention.

FIG. 41 shows an outline of an example of the structure of a recording apparatus according to an embodiment of the present invention. This recording apparatus records an AV stream of which input digital video data and digital audio data have been compression-encoded and multiplexed in a predetermined system to a record medium.

The recording apparatus exemplified in FIG. 41 may be a single recording apparatus that records video data and audio data that are input from the outside to a record medium or a recording block that is used for a video camera apparatus together with a camera block having an optical system, an image capturing device, and so forth and that records video data based on a captured image signal to a record medium.

It can be contemplated that there are many types of applicable compression-encoding systems and multiplexing systems. For example, a system defined in the H.264|AVC may be applied for a compression-encoding system of an embodiment of the present invention. Instead, compression-encoding may be performed on the basis of the MPEG2 system. On the other hand, as a multiplexing system, for example, the MPEG2 systems may be used. In the following, it is assumed that video data are compression-encoded on the basis of a system prescribed in the H.264|AVC and video data and audio data are multiplexed on the basis of a system prescribed in the MPEG2 systems.

A control section 30 is composed of, for example, a CPU (Central Processing Unit), a RAM (Random Access Memory), a ROM (Read Only Memory), and so forth (not shown). The control section 30 controls each section of a recording section 10 of the recording apparatus using the RAM as a work memory on the basis of a program and data stored in the ROM. In FIG. 41, lines that connect the control section 30 and each section of the recording section 10 are omitted to prevent the drawing from becoming complicated.

A UI (User Interface) section 31 has operation switches with which the user operates the recording apparatus and outputs control signals according to the operations of the operation switches. The control signals are supplied to the control section 30. The control section 30 controls the operation of each section of the recording section 10 with processes of software performed on the basis of the control signals supplied from the UI section 31 according to the user's operation. For example, the control section 30 controls the record start and stop operations of the recording apparatus according to operations for the UI section 31.

For example, the control section 30 executes application software that provides a user interface and controls each section of the recording section 10 on an OS (Operating System) that is composed of predetermined programs and provides fundamental functions of software. In addition, the control section 30 executes driver software that mediates software and hardware of each section of the recording section 10. The OS also provides a file system that manages files and data recorded on a record medium 20. The file system will be described later. The application software accesses files recorded on the record medium 20 through the file system provided by the OS.

Base band digital video data are input from a terminal 40. As the digital video data are input, base band digital audio data are input from a terminal 41.

The digital video data are input from the terminal 40 to the recording section 10 and supplied to a video encoder 11. The video encoder 11 compression-encodes the supplied digital video data according to the predetermined system. In this example of which compression-encoding is performed on the basis of the system prescribed in the H.264|AVC, intra-frame compression is performed, for example, using DCT (Discrete Cosine Transform) and intra-screen prediction. Inter-frame compression is performed using a moving vector. Entropy encoding is performed to improve the compression efficiency. Digital video data that have been compression-encoded by the video encoder 11 are supplied as an H.264|AVC elementary stream (ES) to a multiplexer (MUX) 13.

Digital audio data are input from the terminal 41 to the recording section 10 and supplied to an audio encoder 12. The audio encoder 12 compression-encodes the digital audio data according to the predetermined compression-encoding system, for example, AC3 (Audio code number 3). The compression-encoding system for audio data is not limited to AC3. Instead, base band audio data are contemplated to be used without compression-encoding audio data. The digital audio data that have been compression-encoded are supplied to a multiplexer 13.

The multiplexer 13 multiplexes the digital video data and digital audio data, which have been compression-encoded and provided, according to the predetermined system and outputs the multiplexed data as one data stream. In this example of which multiplexing is performed on the basis of the MPEG2 systems, the provided compressed video data and audio data are multiplexed on the time division basis using an MPEG2 transport stream. For example, the multiplexer 13 has a buffer memory. The multiplexer 13 stores the compressed video data and audio data that have been supplied in the buffer memory.

The compressed video data stored in the buffer memory are PES (packetized Elementary Stream) packetized by dividing them in a predetermined size and adding a header to each divided portion. Likewise, the compressed audio data are PES-packetized by dividing them in a predetermined size and adding a header to each divided portion. The header stores predetermined information prescribed in the MPEG2 systems, such as a PTS that represents the reproduction time of data stored in the packet and a DTS (Decoding Time Stanp) that represents the decoding time. The PES packet is further divided and stored in a payload of a transport packet (TS packet). A header of the TS packet stores a PID (Packet Identification) that identifies data stored in the payload. The TS packet that is output from the multiplexer 13 is temporarily stored in a stream buffer 14.

Specifically, a header having a predetermined size is added to the TS packet by the multiplexer 13. The TS packet with the header is output. A packet to which the predetermined header is added to the TS packet is referred to as a source packet.

A recording control section 15 controls recording of data to the record medium 20. As the record medium 20, for example, a recordable type DVD (Digital Versatile Disc) may be used. Instead, as the record medium 20, a hard disk drive may be used.

Instead, a semiconductor memory may be applied for the record medium 20. A Blu-ray Disc (registered trademark) that accomplishes a larger capacity than other record mediums can be contemplated to be applied for the record medium 20.

The recording control section 15 monitors the amount of data stored in the stream buffer 14. When data stored in the stream buffer 14 is in excess of a predetermined amount, data are read from the stream buffer 14 for the amount of the recording unit of the record medium 20 and written to the record medium 20.

A management information processing section 16 is composed of, for example, a CPU, a RAM as a work memory, and a ROM that pre-stores a program and predetermined data (these sections are not shown). In addition, the management information processing section 16 can accomplish its function by a program process of, for example, the control section 30. In this case, the RAM of, for example, the control section 30 is used as a nonvolatile memory 17 and a nonvolatile memory 18 is connected to the control section 30.

The management information processing section 16 uses the nonvolatile memory 17 as a work memory on the basis of record data and creates information to be stored in the foregoing index file "index.bdmv", movie object file "MovieObject.bdmv", play list file "xxxxx.mpls", and clip information file "zzzzz.clpi". The created information is written to the record medium 20 at a predetermined timing.

For example, the management information processing section 16 obtains time information of the record data from the multiplexer 13 and address information of the record data for the record medium 20 from the recording control section 15 and creates EP_map information based on the obtained these time information and address information. In addition, the clip information file "zzzzz.clpi" is created on the basis of a control signal that is output from the control section 30 according to the record start operation or the record stop operation for the UI section 31 and information about the record data supplied from the multiplexer 13a and the recording control section 15. Information about the created clip information file is additionally written to the play list file. In such a manner, the play list file "xxxxx.mpls" is updated.

When the play list file is updated, it is determined whether or not the predetermined restrictions for the play list file to which information about the clip information file is additionally written are satisfied. When the determined result denotes that the restrictions are not satisfied, a play list file is newly created. Information about the created clip information file is recorded to the newly created play list file.

In addition, when data are newly recorded to the record medium 20, the index file "index.bdmv" and the movie object file "MovieObject.bdmv" are created or updated.

Figure 42:
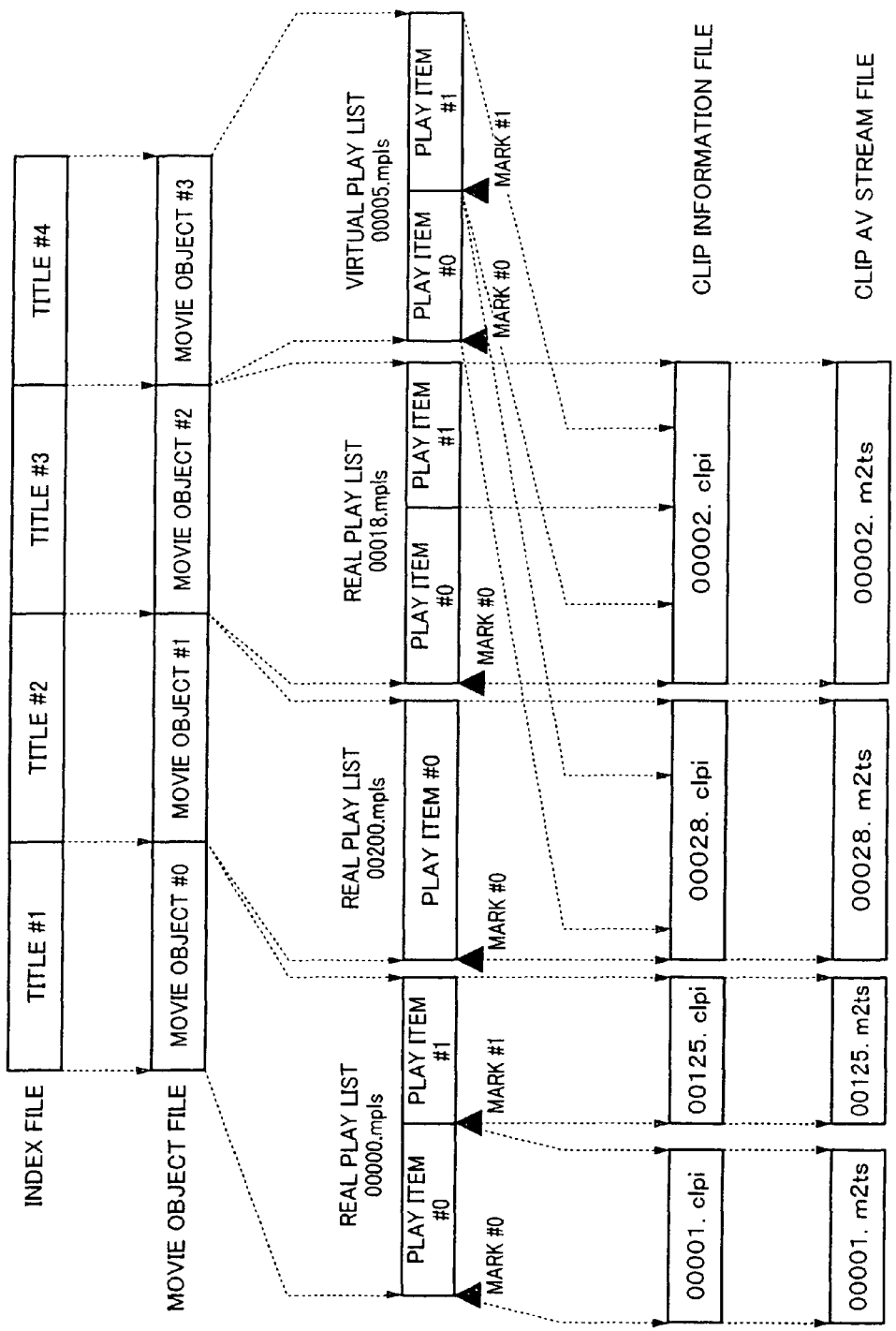
FIG. 42 is a schematic diagram showing an example of a data structure according to an embodiment of the present invention.

FIG. 42 shows an example of the data structure applicable to an embodiment of the present invention. The index file "index.bdmv" has one or a plurality of titles. The movie object file "Movieobject.bdmv" contain one or a plurality of movie objects corresponding to the title (titles) that the index file "index.bdmv" has. Each movie object calls one play list file "xxxxx.mpls". The play list file "xxxxx.mpls" contains one or a plurality of play items. Each play item refers to clip information file "zzzzz.clpi". A clip information file "zzzzz.clpi" and a clip AV stream file "zzzzz.m2ts" that is the entity of a clip have the relationship of one to one.

In such a structure, the user can see a clip recorded on the record medium in the unit of a title that index file "index.bdmv" has. When the user selects his or her desired title, a movie object corresponding to the title is referred from the movie object file "MovieObject.bdmv". A play list file "xxxxx.mpls" described in the referred movie object is called, the clip information file "zzzzz.clpi" is referred according to a play item contained in the play list file, and the corresponding clip AV stream file "zzzzz.m2ts" is reproduced.

When a mark (play list mark) that represents time information is added to a play list file "xxxxx.mpls", a jump position can be set. A chapter is defined with a mark. A chapter is a reproduction unit of a title that the user can see. A mark is always placed at a record start position. A mark may be placed at a position other than a record start position.

In other words, when a play list mark for the record start operation is set in a play list file "xxxxx.mpls" and a play item that refers to a clip is registered, a chapter is formed in the play list file. In other words, when a play list mark is recorded to a play list file and a play item is recorded, it can be said that a chapter is recorded to the play list file.

As described above, a real play list is created together with a clip. In the example shown in FIG. 42, play list files "00000.mpls", "00200.mpls", and "00018.mpls" have an attribute of a real play list.

Among them, the play list file "00000.mpls" is an example of which information about a newly created clip is additionally written to a play list. For example, play item #1 that refers to a clip information file "00125.m2ts" corresponding to the newly recorded clip AV stream file "00125.m2ts" is additionally recorded to a play list file "00000.mpls" that has stored play item #0 that refers to a clip information file "00001.clpi" corresponding to a clip AV stream file "00001.m2ts". A mark is placed at the start time that a play item represents. When the play list file "00000.mpls" is reproduced, the clip AV stream file "00001.m2ts" is reproduced on the basis of play item #0. Thereafter, the clip AV stream file "00125.m2ts" is reproduced on the basis of play item #1.

The play list file "00200.mpls" is an example of which one play list file is created for one clip and the play list file contains only one play item.

In addition, the play list file "00018.mpls" is an example of which a plurality of play items refer to one clip. It can be contemplated that when the record start operation or the record stop operation is performed, control is performed such that a play item is created and data are additionally written to one clip. A mark is placed at the beginning of play item #0. By continuously reproducing play item #0 and play item #1, the entire clip AV stream file "00002.m2ts" is reproduced.

On the other hand, as represented as a play list file "00005.mpls" shown in FIG. 42, a virtual play list designates a reproduction region for existing clips. In this example, play item #0 contained in the play list file "00005.mpls" refers to a clip information file "00028.clpi" and designates a region. Play item #1 refers to the clip information file "00002.clpi" and designates a region. Marks are placed at the beginning of the play item #0 and play item #1. When the play list file "00005.mpls" is reproduced, a designated region of the clip AV stream file "00028.m2ts" is reproduced on the basis of the play item #0. Thereafter, the clip AV stream file "00002.m2ts" is reproduced on the basis of the play item #1.

According to the present invention, as described above, it is determined whether a chapter based on a newly recorded clip is additionally written to an existing play list file or recorded to a newly created play list file based on the restrictions of the play list file. An example of restrictions of a play list file is as follows. Restrictions of a play list file can be contemplated to include those on the format, those on the mounting specifications, and those on product specifications.

Restrictions on the format can be contemplated to be the following restriction (1) to restriction (7).

Restriction (1): The upper limit of the number of play items that can exist in one play list file.

Restriction (2): The upper limit of the number of play list marks that can exist in one play list file.

Restriction (3): When one play list file refers to a plurality of clips, their predetermined video attributes need to match each other.

Restriction (4): The upper limit of the file size of one play list file.

Restriction (5): The upper limit of the total file size of a clip information file associated with one play list file.

Restriction (6): The upper limit of the total of entry points for coarse unit searches in a clip information file associated with one play list file.

Restriction (7): The upper limit of the total of entry points for fine unit searches in a clip information file associated with one play list file.

Among those, with respect to the number of play items of the restriction (1) and the number of play list marks of the restriction (2), the upper limit of the number of play items that can exist in one play list is restricted, for example, to 999 and the upper limit of the number of play list marks that can exist in one play list file is restricted, for example, to 999 on the format. Thus, when a chapter based on a clip that is newly recorded is additionally written to a play list file, it is necessary to determine whether or not these restrictions are satisfied.

With respect of video attributes of the restriction (3), the format prescribes that in a plurality of clip AV stream files to which one play list file refers, their attributes about encoding of video data such as frame size, scanning system, aspect ratio, frame rate, and codec type of a plurality of clip AV stream files to which one play list file refers need to match each other. Thus, when a clip is newly recorded, it is necessary to compare the attributes of a clip referred from a play item that has been recorded in a play list file to which a chapter based on the clip is additionally written with those of the clip newly recorded.

With respect to the file size of one play list of the restriction (4) and the total file size of a clip information file associated with one play list file of the restriction (5), their upper limits are prescribed. The prescription of the file size is associated with the memory capacity of the recording apparatus and the reproducing apparatus.

In other words, when the record operation is performed, a play list corresponding to a clip that has been recorded and a clip information file of a clip that has been recorded are temporarily stored in the memory of the recording apparatus. When the record operation is performed, an update process is performed for the play list file and the clip information file on the memory. These play list file and clip information file stored in the memory are written to the record medium at a predetermined timing. With the restriction about the total file size of a play list file and a clip information file associated with one play list file, a situation of which the memory becomes full during the record operation and it is forcedly stopped can be prevented.

The upper limit of the file size of a play list file is, for example, 600 kB (kilobytes). When the upper limit of the file size of one clip information file is, for example, 1 MB (megabytes), the upper limit of the total file size of a clip information file associated with one play list file is, for example, 2 MB.

The upper limits of the restriction (6) and the restriction (7) are associated with the upper limit of the file size of the foregoing clip information file. In other words, as described above, an entry point for a coarse unit search and an entry point for a fine unit search are information stored in the block blkEPMap( ) of the block blkCPI( ) in a clip information file. In other words, an entry point for a coarse unit search is the field PTSEPCoarse and the field SPNEPCoarse of the block blkEPMap( ). An entry point for a fine unit search is the field PTSEPFine and the field SPNEPFine of the block blkEPMap( ).

The upper limit of the total of entry points for coarse unit searches and that of entry points for fine unit searches in a clip information file associated with one play list file are prescribed on the format. Thus, when a clip is newly recorded, it is necessary to determine whether or not these restrictions are satisfied in a play list file to which a play item that refers to the clip is additionally written.

Restrictions on the mounting specifications can be contemplated to have the following items. Restriction (8): With respect to the block blkMakersPrivateData( ) in an extension data block of a play list file, when information of the block blkMakersPrivateData( ) of a play list file recorded by another apparatus cannot be taken over, the play list file must not be updated.

For example, as represented in the block DataBlock( ) shown in FIG. 35, the data size of the block blkMakersPrivateData( ) of extension data block of a play list file is not restricted. Thus, it can be contemplated that data having a relatively large data size, for example, several 100 kB, are written depending on specifications of the apparatus. It may be difficult to update or edit a play list file with taken-over information of the block blkMakersPrivateData( ) having a large size recorded by another apparatus, for example, due to the restriction of the memory capacity.

Restrictions on the product specifications can be contemplated to be the following items.

Restriction (9): Even if concepts of titles and chapters of, one apparatus are different from those of another apparatus, it is necessary to prevent the user from confusing them.

Restriction (10): It is necessary to be able to continuously perform a capturing operation and a recording operation for a prescribed time period or more.

With respect to titles and chapters of the restriction (9), play lists and chapters can be contemplated to have different structures depending on the apparatus. Thus, when a record medium on which a clip has been recorded by one apparatus is reproduced by another apparatus, there is a possibility of which a title may be abnormally displayed.

For example, it is assumed that a stationary type recording and reproducing apparatus (such as a video deck) that records a television broadcast has the following specifications. One program corresponds to one play list. Play list marks are automatically placed as chapters at intervals of 5 minutes. Whenever a video camera apparatus captures one image, namely the apparatus performs the record start operation, a play list mark is placed as a chapter. A plurality of chapters are registered to one play list. In addition, it is assumed that the stationary type recording and reproducing apparatus has the following specifications. A thumbnail image of only the beginning of a play list is displayed. Thus, a thumbnail image of each chapter is not displayed.

In these conditions, it is assumed that a record medium on which a play list file created by the stationary type recording and reproducing apparatus has been recorded is loaded into a video camera apparatus and a play item that refers to a clip recorded by the video camera apparatus is additionally written and recorded to a play list file created by the stationary type recording and reproducing apparatus. In this case, as a later scene of a program recorded by the stationary type recording and reproducing apparatus, a picture captured by the video camera apparatus is registered as a chapter. When the record medium of the video camera apparatus is loaded into the stationary type recording and reproducing apparatus again and the program is reproduced thereby, the chapter of the picture captured by the video camera apparatus is not displayed as a thumbnail image. Instead, the chapter is unnaturally reproduced as the last scene of the program recorded by the stationary type recording and reproducing apparatus.

With respect to the continuous capturing and recording for a prescribed time period or more of the restriction (10), specifications of a recoding apparatus commonly assure continuous recording for a predetermined time period or more. On the other hand, as described above, the format prescribes the upper limit of the total number of entry points in a clip information file associated with one play list. Even if the record medium has a sufficient free space, entry points for a predetermined time period to be assured in the play list file to which a play item that refers to a clip to be newly recorded may not be assured because of the total number of entry points of the clip information file that has been referred and the upper limit prescribed in the format. Thus, when a clip is newly recorded, it is necessary to determine whether or not continuous recording for the predetermined time period or more can be performed on the basis of the number of entry points associated with the play list file to which a play item that refers to the clip is additionally written.

Next, a process of determining whether or not a chapter based on a clip to be newly recorded can be additionally written to a play list file according to an embodiment of the present invention will be described. The determinations for the foregoing restriction (1) to restriction (10) are performed one by one. When the determined result denotes that at least one of these restrictions cannot be satisfied, a play list is newly created and a chapter based on a clip newly recorded is recorded to the newly created play list.

Figure 43:
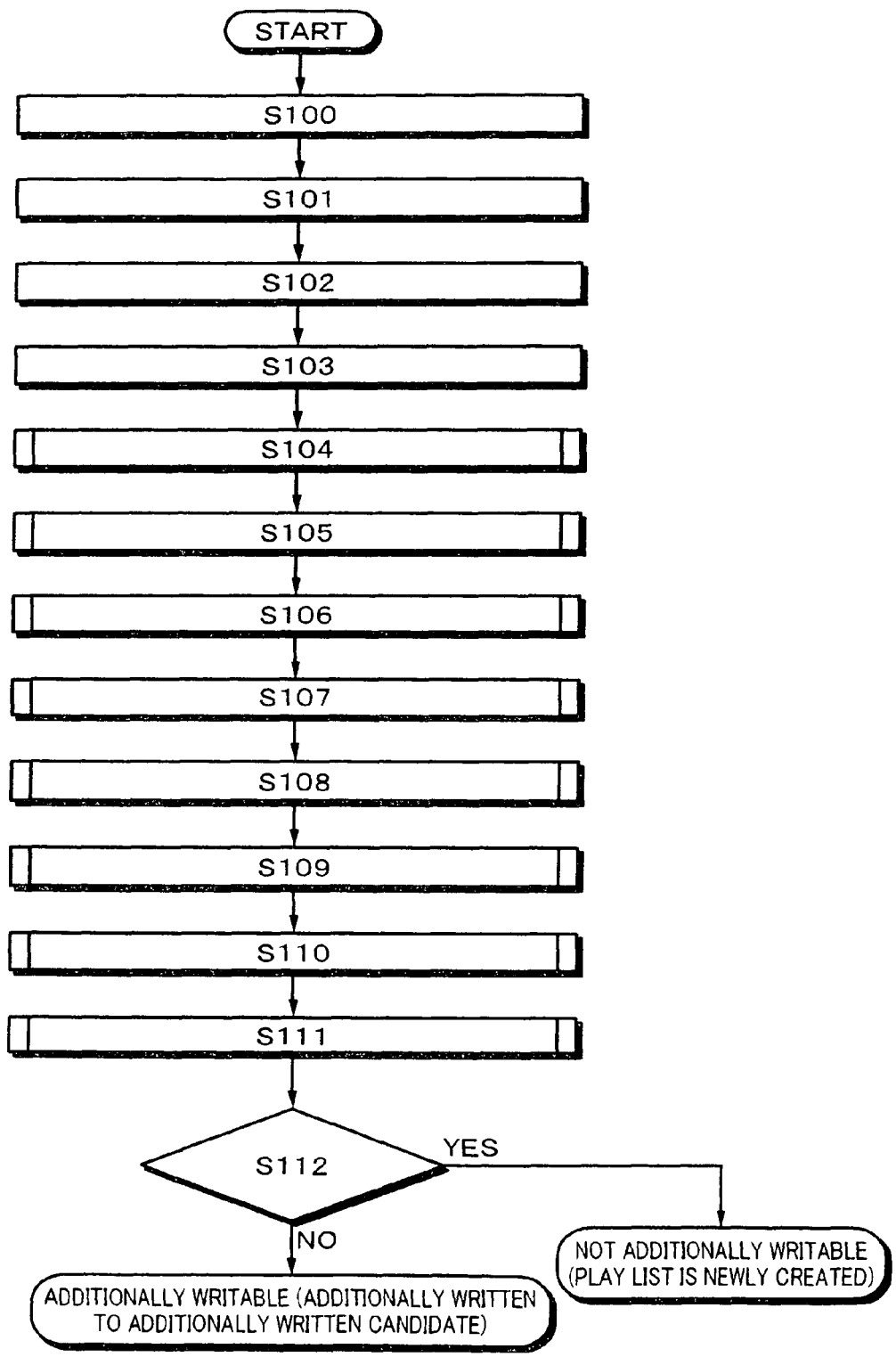
FIG. 43 is a flow chart showing an example of a process of determining whether or not a chapter can be additionally written to a play list file.

FIG. 43 is a flow chart showing an example of a process of determining whether or not a chapter based on a newly recorded clip can be additionally written to a play list. First of all, with reference to the flow chart shown in FIG. 43, a flow of an overall process will be described in brief. In this example, it is assumed that the record medium 20 is a disc-shaped record medium such as a recordable type DVD (hereinafter, referred to as the disc). In the recording apparatus described with reference to FIG. 41, each determination process and so forth that follow are performed by the control section 30.

When the record medium 20 is loaded into the recording apparatus, the control section 30 controls the recording control section 15 to read an index file "index.bdmv" from the record medium 20 (at step S100). The index file "index.bdmv" that has been read is stored in the nonvolatile memory 17, for example, through the management information processing section 16.

At the next step S101, the control section 30 identifies a candidate of a play list (play list file) to which a chapter based on a clip to be recorded next is additionally written on the basis of information described in the index file "index.bdmv" stored in the nonvolatile memory 17.

For example, with reference to the block blkTableofPlayLists( ) in the block blkIndexExtensionData( ) that is an extension data block of the index file "index.bdmv", the block blkTableofPlayLists( ) is searched for the newest real play list that has been recorded and thereby the file name thereof is obtained.

More specifically, with reference to FIG. 29, blocks blkMovieTitlePlayListPair( )'s listed in the block blkIndexExtensionData( ) are searched for a block blkMovieTitlePlayListPair( ) that has the field PlayListattribute assigned the attribute "Real" and that is described as the last block blkMovieTitlePlayListPair( ) in the block blkIndexExtensionData( ) and thereby data of the field PlayListFileName is obtained from the retrieved block blkMovieTitlePlayListPair( ).

At the next step S102, the play list file as the additionally writable candidate identified at step S101 is read from the record medium 20 and stored to the nonvolatile memory 17. Thereafter, all clip information files associated with the play list file as the additionally writable candidate that has been read are read from the record medium 20. The clip information files that have been read are stored in the nonvolatile memory 17.

More specifically, with reference to FIG. 10 to FIG. 12, all blocks blkPlayItem( )'s in the blocks blkPlayList( )'s are referred in the play list file as the additionally writable candidate. All data of the fields ClipInformationFileName's in the blocks blkPlayItem( )'s are obtained. All clip information files represented in the data of the obtained fields ClipInformationFileName's are read from the record medium 20.

At the following step S104 to step S111, it is determined whether or not a chapter can be additionally written on the basis of the play list file as the additionally writable candidate and clip information files stored in the nonvolatile memory 17 according to the foregoing restrictions. In other words, at step S104, the additionally writing ability/inability determination is performed on the basis of the number of play items contained in the play list file as the additionally writable candidate obtained at step S101 according to the foregoing restriction (1). At the next step S105, the additionally writing ability/inability determination is performed on the basis of the number of play list marks contained in the play list file as the additionally writable candidate according to the foregoing restriction (2). At the next step S106, the additionally writing ability/inability determination is performed on the basis of video attributes described in the play list file as the additionally writable candidate and video attributes of the clip to be newly recorded according to the foregoing restriction (3).

At the next step S107, the additionally writing ability/inability determination is performed on the basis of the file size of the play list file of the additionally writable candidate according to the foregoing restriction (4). At the next step S108, the additionally writing ability/inability determination is performed on the basis of the total file size of the clip information files referred from the play list file as the additionally writable candidate according to the foregoing restriction (5). At the next step S109, the additionally writing ability/inability determination is performed on the basis of the total number of entry points stored in the clip information files referred from the play list file as the additionally writable candidate according to the foregoing restrictions (6) and (7).

At the next step S110, the additionally writing ability/inability determination is performed on the basis of presence or absence of unique extension data of another apparatus in the play list file as the additionally writable candidate according to the foregoing restriction (8). At the next step S111, the additionally writing ability/inability determination is performed on the basis of the last update apparatus of the play list file as the additionally writable candidate according to the foregoing restriction (9).

At the next step S112, it is finally determined whether or not the chapter based on the clip newly recorded can be additionally written to the play list file as the additionally writable candidate on the basis of the determination result of each of the determination processes from the foregoing step S104 to step S111. The determined result of each process of step S104 to step S111 is stored, for example, in the register or the like of the control section 30. At step S112, a determination is performed on the basis of the determined result of each process stored in the register.

In other words, when the determined result in each process at each of step S104 to step S111 represents additionally writable, the flow of the process advances to step S112. At step S112, it is determined whether or not the chapter based on the clip newly recorded be additionally written to the play list file as the additionally writable candidate obtained at step S101.

In contrast, when at least one of the determined results of the additionally writing ability/inability determinations of step S104 to step S111 represents additionally not-writable, it is determined that the chapter based on the play list file as the additionally writable candidate obtained at step S101 be not able to be additionally written. In this case, a play list file of a real play list is newly created and the chapter based on the clip that is newly recorded is recorded to the newly created play list file.

The order of the processes from step S104 to step S111 is not limited to the foregoing order. In other words, the order of the processes from step S104 to step S111 may be changed in any manner. Instead, the processes from step S104 to step S111 may be performed in parallel. All the processes from step S104 to step S111 may not be performed. Instead, one or a plurality of these processes may be selectively performed.

Figure 44:
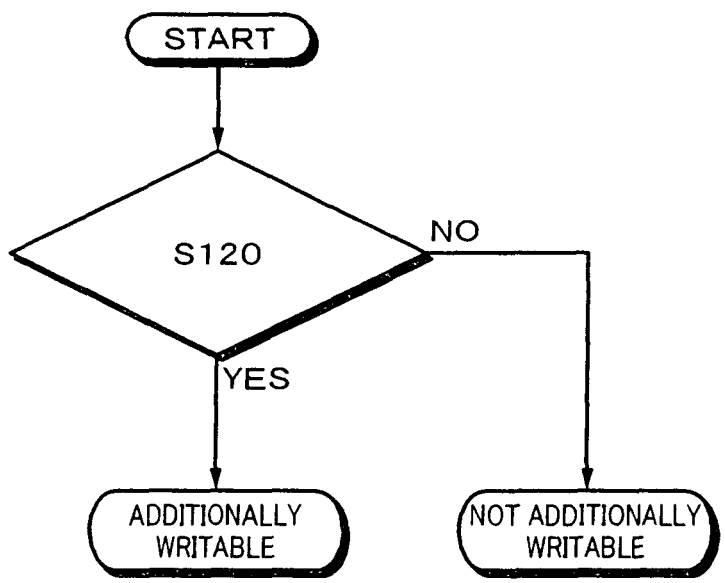
FIG. 44 is a flow chart showing an example of an additionally writing ability/inability determination on the basis of the number of play items.

Next, the processes from step S104 to step S111 will be described one by one in more detail. FIG. 44 shows an example of the additionally writing ability/inability determination process on the basis of the number of play items contained in the play list file as the additionally writable candidate according to the restriction (1) at step S104. In this process, as exemplified at step S120, with reference to the block blkPlayList( ) (refer to FIG. 11) of the play list file as the additionally writable candidate, the value of the field NumberofPlayItems is obtained. The obtained value of the field NumberofPlayItems is compared with the upper limit value that has been set for the number of play items that can exist in one play list file, for example, value "999".

When the compared result denotes that the value of the field NumberOfPlayItems is smaller than the predetermined upper limit value, it is determined that the chapter based on the clip that is newly recorded be able to be additionally written to the play list file as the additionally writable candidate. In contrast, when the value of the field NumberOfPlayItems is equal to or larger than the predetermined upper limit value, it is determined that the chapter be not able to be additionally written to the play list file as the additionally writable candidate.

Figure 45:
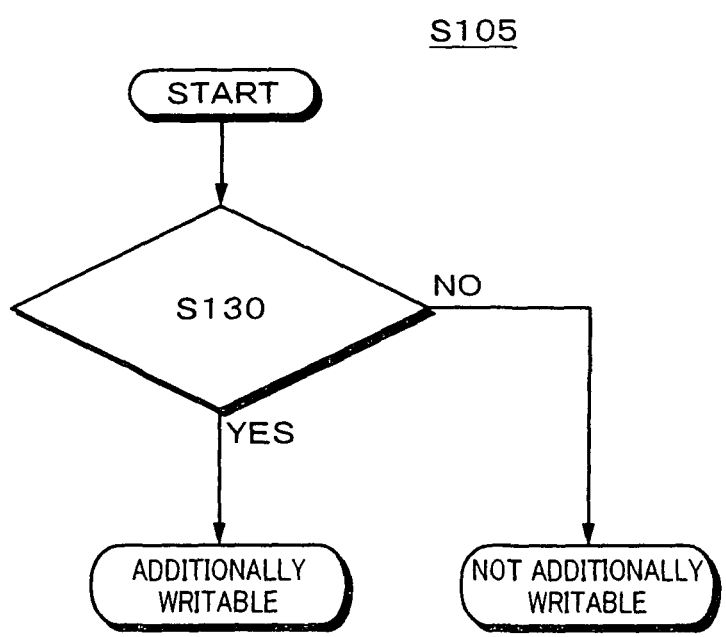
FIG. 45 is a flow chart showing an example of the additionally writing ability/inability determination process on the basis of the number of play list marks.

FIG. 45 shows an example of the additionally writing ability/inability determination process on the basis of the number of play list marks contained in the play list mark as the additionally writable candidate according to the foregoing restriction (2) at step S105. In this process, as exemplified at step S130, with reference to the value of the block blkPlayListMark( ) (refer to FIG. 14) in the play list file as the additionally writable candidate, the value of the field NumberOfPlayListMarks is obtained. The obtained value of the field NumberofPlayListMarks is compared with the predetermined upper limit value that has been set for the number of play list marks that can exist in one play list file, for example, value "999".

When the compared result denotes that the value of the field NumberOfPlayListMarks is smaller than the predetermined upper limit value, it is determined that the chapter based on the clip that is newly recorded be able to be additionally written to the play list file as the additionally writable candidate. In contrast, when the value of the field NumberOfPlayListMarks is equal to or larger than the predetermined upper limit value, it is determined that the chapter be not able to be additionally written to the play list file as the additionally writable candidate.

As described above, there are two types of play list marks, which are entry marks and link points. At step S130, it is determined whether or not the total of these entry marks and link points is smaller than the upper limit value.

Figure 46:
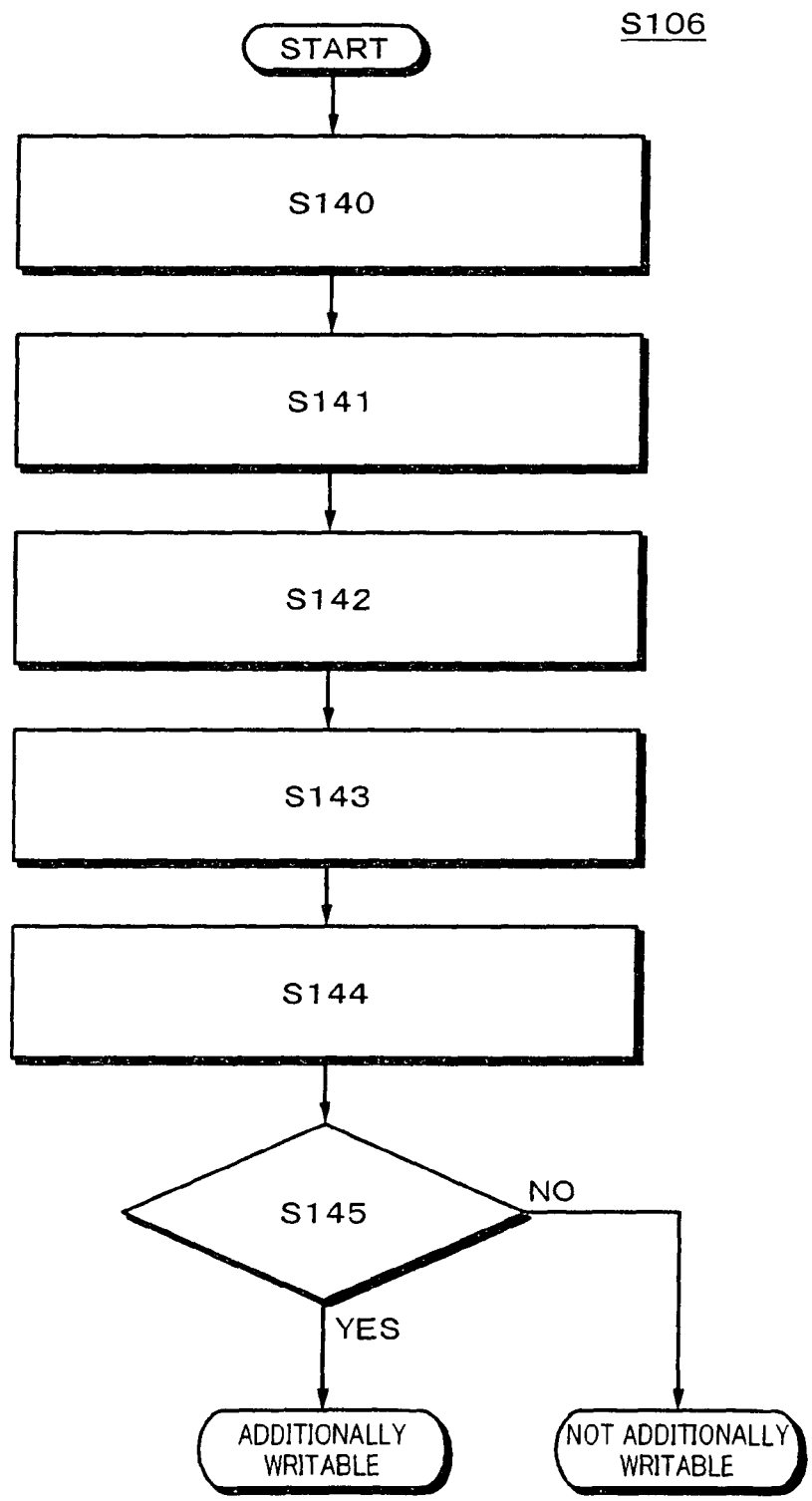
FIG. 46 is a flow chart showing an example of the additionally writing ability/inability determination process on the basis of a video attribute.

FIG. 46 shows an example of the additionally writing ability/inability determination process on the basis of video attributes described in the play list file as the additionally writable candidate and those of the clip that is newly recorded according to the foregoing restriction (3) at step S106. First of all, at the first step S140, attribute information of video data to be recorded is obtained. In this embodiment, frame size, aspect ratio, frame rate, and scanning type (interlace/progressive) are obtained as attribute information of video data to be recorded on the basis of the capturing mode or recording mode that has been currently set to the recording apparatus.

At the following step S141 to step S144, video attributes of a clip associated with the play list file as the additionally writable candidate are obtained. In this embodiment, when a plurality of play items are stored in the play list file as the additionally writable candidate, video attributes are obtained from a clip information file referred from a play item that was recorded as the oldest play item. In brief, as video attributes, at step S141, the image width is obtained; at step S142, the image height (the number of lines) and the scanning type are obtained; at step S143, the aspect ratio is obtained; and at step S144, the frame rate is obtained.

More specifically, with reference to a block blkPlayItem( ) (refer to FIG. 12) stored on the topmost side of the block blkPlayList( ) (refer to FIG. 11) in the play list file as the additionally writable candidate, data of the field ClipInformationFileName are obtained as the file name of a clip information file to which the play item refers. A clip information file corresponding to the obtained file name is referred from all clip information files that have been read in the process of step S103 of the flow chart shown in FIG. 43 and that are associated with the play list as the additionally writable candidate.

At step S141, with reference to the block blkProgramInfoExt( ) (refer to FIG. 37) in the block blkClipExtensionData( ) as extension data of the clip information file and the block blkStreamCodingInfoExt(i, j) (refer to FIG. 38) in the block blkProgramInfoExt( ), the value of the field HorizontalSize is obtained from the block blkStreamCodingInfoExt(i, j).

At step S142, with reference to the block blkStreamcodingInfo( ) (refer to FIG. 18) in the block blkProgramInfo( ) (refer to FIG. 17) of the clip information file, the value of the field VideoFormat is obtained. As described with reference to FIG. 19, the field VideoFormat represents a combination of the number of lines of video data and the scanning system (interlace/progressive) with a value represented by 4 bits.

As at step S142, at step S143, with reference to the block blkStreamCodingInfo( ), the value of the field AspectRatio is obtained. As described with reference to FIG. 21, the field AspectRatio represents the aspect ratio of the frame of video data with a value represented by 4 bits.

As at step S143 and step S143, at step S144, with reference to the block blkStreamCodingInfo( ), the value of the field FrameRate is obtained. As described with reference to FIG. 20, the field FrameRate represents the frame rate of video data with a value represented by 4 bits.

At step S145, each entry of attribute information of video data that are recorded and that have been obtained from the recoding apparatus at step S140 is compared with each of video attributes of a clip associated with the play list file as the additionally writable candidate and obtained at step S141 to step S144.

When the compared result denotes that all the entries of attribute information of video data that are recorded mach all the video attributes of the clip associated with the play list file as the additionally writable candidate, it is determined that the chapter based on the clip that is newly recorded be able to be additionally written to the play list file as the additionally writable candidate. In contrast, even if each of the attribute information of the video data that are recorded does not match each of the video attributes of the clip associated with the play list file as the additionally writable candidate, it is determined that the chapter be not able to be additionally written to the play list file as the additionally writable candidate.

Figure 47:
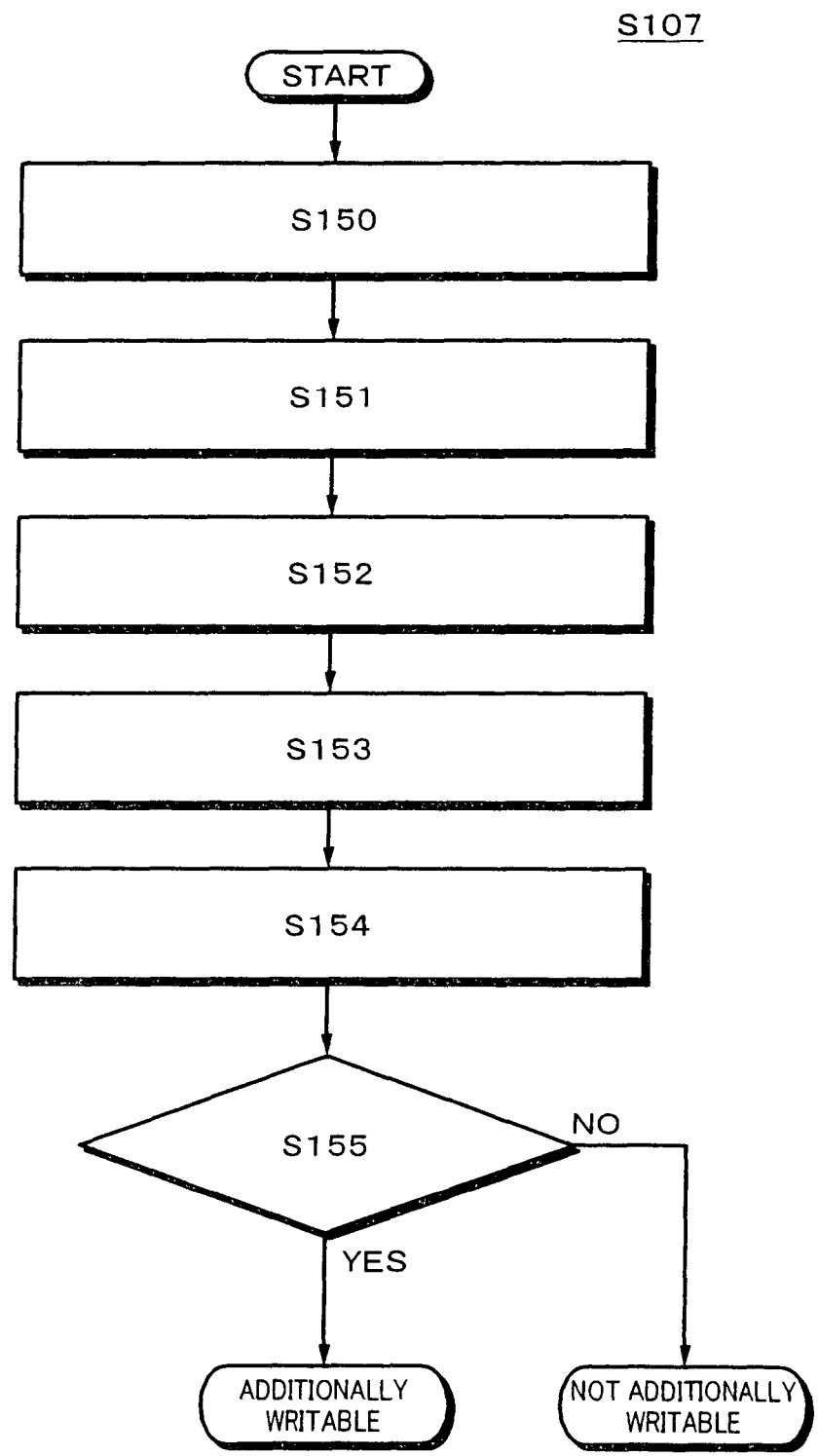
FIG. 47 is a flow chart showing an example of the additionally writing ability/inability determination process on the basis of a file size.

FIG. 47 shows an example of the additionally writing ability/inability determination process on the basis of the file size of the play list file as the additionally writable candidate according to the restriction (4) at step S107. In this additionally writing ability/inability determination process, it is determined whether or not the file size of the play list as the additionally writable candidate to which at least a predetermined number of chapters are additionally written is in excess of the upper limit of the file size of one play list.

The predetermined number of chapters can be contemplated to be one chapter, a plurality of chapters, the remaining number of chapters against the maximum number of chapters that can exist in one chapter, or the like that depends on the design concept of the recoding apparatus. In this example, the predetermined number of chapters is considered to be the remaining number of chapters against the maximum number of chapters that can exist in one play list file.

First of all, at step S150, size increment SIZE_1CHAP of the play list file per chapter that has been pre-calculated is obtained. In other words, at this step S150, the data amount of play items and play list marks that compose one chapter is calculated.

With reference to FIG. 12, in a play item, the field StillMode, the field StillTime, the block blkUoMaskTable( ), and the block blkSTNTable( ) are data whose data lengths may vary. Specifically, data of these fields and blocks have fixed lengths depending on the recording mode or the recording apparatus. With reference to FIG. 14, the value of each field of a play list mark has a fixed length. Thus, the data size of play items and play list marks created when one clip is recorded can be pre-calculated. In addition, the calculated value characteristically does not depend on record time. The value of the size increment SIZE_1CHAP of a play list file per chapter is pre-calculated and stored, for example, in a ROM or the like of the recording apparatus. Instead, the value of the size increment SIZE_1CHAP may be calculated whenever the process of the flow chart shown in FIG. 47 is executed.

When a chapter is additionally written to a play list, a play item and a play list mark are increased. Thus, when a chapter is additionally written to a play list, it is necessary to consider the number of play items and the number of play list marks that can exist in one play list file according to the restriction (1) and restriction (2).

At step S151, the number of play items PI_REMAIN that can be additionally written to the play list file as the additionally writable candidate is calculated. In other words, with reference to the block blkPlayList( ) (refer to FIG. 11) in the play list file as the additionally writable candidate, the value of the field NumberofPlayItems is obtained as the number of play items contained in the play list as the additionally writable candidate. By subtracting the number of play items contained in the play list as the additionally writable candidate from the predetermined upper limit value PI_MAX that has been set for the number of play items that can exist in one play item, for example, "999", the number of play items PI_REMAIN' that can be additionally written to the play list as the additionally writable candidate is obtained.

In other words, the number of play items PI_REMAIN that can be additionally written to the play list file as the additionally writable candidate can be obtained by the following formula (1).

$$PI\_REMAIN = PI\_MAX - NumberOfPlayItems \quad (1)$$

At step S152, the number of play list marks MARK_REMAIN that can be additionally written to the play list file as the additionally writable candidate is calculated. In other words, with reference to the block blkPlayListMark( ) (refer to FIG. 14) in the play list file as the additionally writable candidate, the value of the field NumberOfPlayListMarks is obtained as the number of play list marks contained in the play list as the additionally writable candidate. Thereafter, by subtracting the number of play list marks contained in the play list as the additionally writable candidate from predetermined upper limit value MARK_MAX that has been set for the number of play items that can exist in one play list, for example "999", the number of play list marks MARK_REMAIN that can be additionally written to the play list as the additionally writable candidate is obtained.

In other words, the number of play list marks MARK_REMAIN that can be additionally written to the play list file as the additionally writable candidate can be obtained from the following formula (2).

$$MARK\_REMAIN = MARK\_MAX - NumberOfPlayListMarks \quad (2)$$

At the next step S153, the smaller one of the number of play items PI_REMAIN that can be additionally written to the play list as the additionally writable candidate obtained at step S151 and the number of play list marks MARK_REMAIN that can be additionally written to the play list file as the additionally writable candidate obtained at step S152 is treated as the number of chapters CHAP_REMAIN that can be additionally written to the additionally writable candidate.

In other words, the number of chapters CHAP_REMAIN that can be additionally written to the play list file as the additionally writable candidate can be obtained from the following formula (3) with the results of the foregoing formula (1) and formula (2) assuming that "MIN" denotes that a smaller one of values in parentheses is selected. In the formula (3), "MIN" denotes that a smaller one of values in parentheses is selected.

$$CHAP\_REMAIN = MIN(PI\_REMAIN, MARK\_REMAIN) \quad (3)$$

At the next step S154, by obtaining the file size of the play list file as the additionally writable candidate, the remaining data size SIZE_REMAIN against the upper limit PL_SIZE_MAX of the file size of one play list file according to the restriction (4) is obtained. The file size of the play list file can be obtained, for example, using a function that the file system of the OS provides. The data size SIZE_REMAIN (kB) can be obtained from the following formula (4). In the following formula, the file size of the play list file as the additionally writable candidate is designated by FILE_SIZE (kB).

$$\text{SIZE\_REMAIN(kB)}=\text{PL\_SIZE\_MAX(kB)}-\text{FILE\_SIZE(kB)} \quad (4)$$

At the next step S155, it is determined whether or not the file size of the play list file as the additionally writable candidate to which play items and play list marks for chapters that can be additionally written to the play list file as the additionally writable candidate are additionally written is in excess of the upper limit of the file size of one play list file.

In other words, it is determined whether or not the following formula (5) is satisfied with the size increment SIZE_1CHAP of the play list file per chapter obtained at step S150 and the results of formula (3) and formula (4).

$$\text{SIZE\_1CHAP}\times\text{CHAP\_REMAIN}\geq\text{SIZE\_REMAIN} \quad (5)$$

If the formula (5) is satisfied, it is determined that the chapter based on the clip that is newly recorded be able to be additionally written to the play list file as the additionally writable candidate. In contrast, if the formula (5) is not satisfied, it is determined that the chapter be not able to be additionally written to the play list file as the additionally writable candidate.

Figure 48:
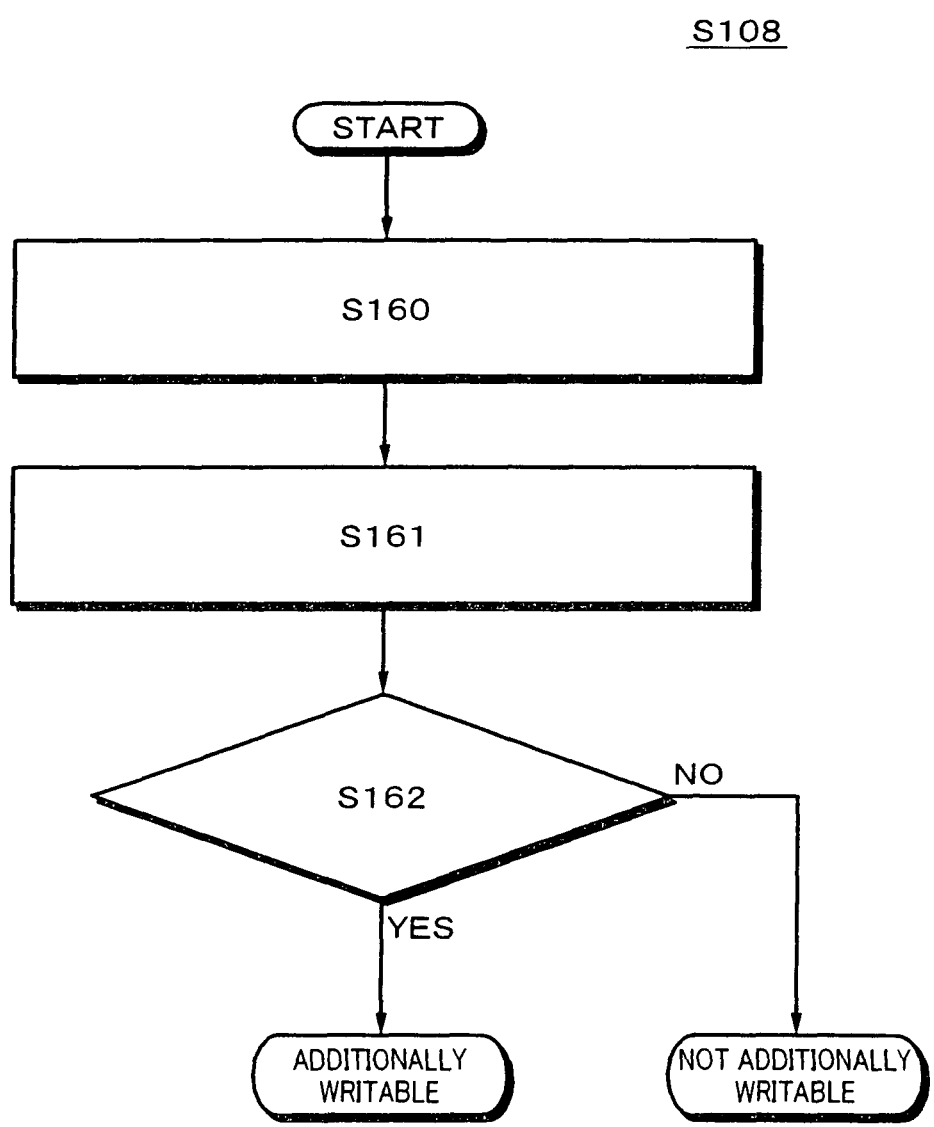
FIG. 48 is a flow chart showing an example of the additionally writing ability/inability determination process on the basis of a total file size of clip information files referred from a play list file as an additionally writable candidate.

FIG. 48 shows an example of the additionally writing ability/inability determination process on the basis of the total file size of clip information files referred from the play list file as the additionally writable candidate according to the foregoing restriction (5) at step S108.

According to the foregoing restriction (5), the upper limit value CLIP_SUM_MAX, for example 2 MB, is set for the total file size of clip information files referred from the play list file as the additionally writable candidate. When a clip information file is added to the play list as the additionally writable candidate as a chapter is additionally written thereto, the total size of the clip information files associated with the play list file as the additionally writable candidate needs not to be in excess of the upper limit value CLIP_SUM_MAX.

At step S160, the maximum size SIZE_1CLIP that has been calculated for one clip information file is obtained. In the clip information file, the block blkEPMap( ) stores information of an entry point that associates a PTS value with the byte address of a clip AV stream file (refer to FIG. 23 to FIG. 26). Information of this entry point is a value that varies on record time. Other information stored in the clip information file is a fixed value that does not depend on record time, but rather an encoding system. On the other hand, as described above, the minimum time that assures continuous recording is set as specifications of the recording apparatus. The number of entry points for the minimum time that assures continuous recording depends on the encoding systems of video and audio of the encoder. By calculating the total data size of entry points for the minimum time that assures continuous recording, the maximum size SIZE_1CLIP is obtained on the basis of the calculated result.

At the next step S161, by obtaining the file sizes of all clip information files referred from the play list file as the additionally writable candidate, the total size SIZE_TOTAL_CLIP is calculated.

In other words, with reference to all the blocks blkPlayItem( )'s (refer to FIG. 12) in the play list file as the additionally writable candidate, data of the field ClipInformationFileName of each of the blocks blkPlayItem( )'s is obtained. The file size of the clip information file represented by the obtained data of the field ClipInformationFileName is obtained for each of the blocks blkPlayItem( )'s in the play list file as the additionally writable candidate. The file size of each of the blocks blkPlayItem( )'s is added. The file size of each clip information file can be obtained, for example, using a function that the file system of the OS provides.

At the next step S162, the value of which the total size SIZE_TOTAL_CLIP of all the clip information files referred from the play list file as the additionally writable candidate calculated at step S161 is subtracted from the upper limit value of the total file size of the clip information files that can be associated with one play list file is compared with the maximum size SIZE_1CLIP of one clip information file calculated at step S160 according to the following formula (6) and it is determined whether or not the clip information files having the maximum size SIZE_LCLIP can be additionally written to the play list file as the additionally writable candidate.

$$\text{CLIP\_SUM\_MAX}-\text{SIZE\_TOTAL\_CLIP}\geq\text{SIZE\_1CLIP} \quad (6)$$

When the compared result denotes that the value of which the total size SIZE_TOTAL_CLIP of all the clip information files referred from the play list file as the additionally writable candidate is subtracted from the upper limit value of the total file size of the clip information files that can be associated with one play list file is compared with the maximum size SIZE_1CLIP of one clip information file is larger than the maximum size SIZE_1CLIP of one clip information file, it is determined that the chapter based on the clip that is newly recorded be able to be additionally written to the play list file as the additionally writable candidate.

In contrast, when the value of which the total size SIZE_TOTAL_CLIP of all the clip information files referred from the play list file as the additionally writable candidate is subtracted from the upper limit value of the total file size of the clip information files that can be associated with one play list file is smaller than the maximum size SIZE_1CLIP of one clip information file, it is determined that the chapter be not able to be additionally written to the play list file as the additionally writable candidate.

Figure 49:
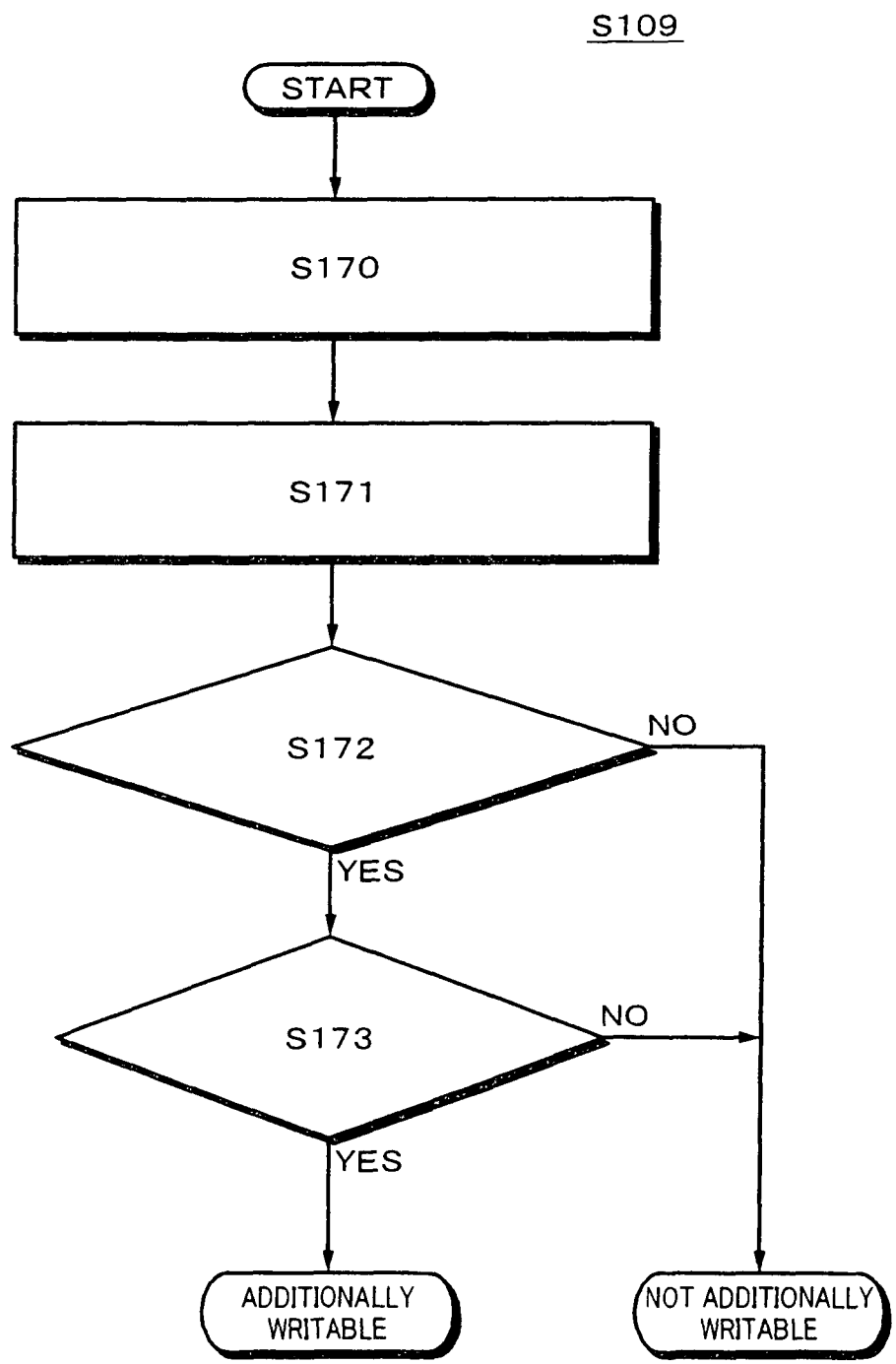
FIG. 49 is a flow chart showing an example of the additionally writing ability/inability determination process on the basis of a total number of entry points stored in a clip information file referred from a play list file as an additionally writable candidate.

FIG. 49 shows an example of the additionally writing ability/inability determination process on the basis of the total number of entry points stored in clip information files referred from the play list file as the additionally writable candidate according to the restriction (6) and restriction (7) at the foregoing step S109.

As described above, with respect to clip information files referred from one play list file, an upper limit is set for the total number of entry points stored in the block blkEPMap( ). When a clip information file is additionally written to the play list as the additionally writable candidate as a chapter is additionally written thereto, the total number of entry points stored in clip information files associated with the play list file as the additionally writable candidate needs not to be in excess of the upper limit value.

According to the restriction (6) and restriction (7), an upper limit value of entry points for coarse unit searches and an upper limit value of entry points for fine unit searches have been set. Thus, the determinations need to be performed separately for entry points for coarse unit searches and for entry points for fine unit searches.

The upper limit value MAX_EP_COARSE of the total value of entry points for coarse unit searches in clip information files associated with one play list file is, for example, 24576. On the other hand, the upper limit value MAX_EP_FINE of the total value of entry points for fine unit searches is, for example, 180000.

First of all, at step S170, the maximum number of entry points per chapter pre-calculated is obtained. As described above, generally as the specifications of the recoding apparatus, the minimum time that assures continuous recording is set. The maximum number of entry points for the minimum time that assures continuous recording is pre-calculated. At step S170, this value is obtained.

As described with reference to FIG. 25 and FIG. 26, an entry point for a coarse unit search is placed at an interval of 11.5 seconds (PTS: entry PTSEPCoarse) or 25 MB (source packet number: entry SPNEPCoarse). When it is assumed that the minimum time that assures continuous recording is designated by the time MIN_TIME(hr) and the data amount of a clip AV stream file created in recording for the minimum time is designated by the data amount MIN_SIZE(MB), the maximum number of entry points NEEDED_EP_COARSE per chapter for entry points for coarse unit searches is obtained from the following formula (7). In the formula (7) and formula (8) that will be described later, "CEIL" denotes that the fragment below the decimal point is rounded up to the next whole number of the value.

$$NEEDED\_EP\_COARSE = CEIL(3600\,[SEC] \times MIN\_TIME[hr]/11.5\,[sec] + CEIL(MIN\_SIZE[MB]/25[BM]) \quad (7)$$

Entry points for fine unit searches are placed at intervals of a GOP with an accuracy of a PTS (entry PTSEPFine) or an accuracy of a source packet (entry SPNEPFine). In this embodiment, as entry points for fine unit searches, only the entry PTSEPFine is used. When the frame frequency is 29.97 Hz and 1 GPO is composed of 15 frames, with respect to entry points for fine unit searches, the maximum number of entry points NEEDED_EP_FINE per chapter is obtained from the following formula (8). In the formula (8), "90 [kH]/3003", represents the frame frequency (29.97 Hz) based on the PTS accuracy.

$$NEEDED\_EP\_FINE = CEIL(3600\,[sec] \times MIN\_TIME[hr] \times 90\,[kHz]/3003/15[Frames/GOP]) \quad (8)$$

At the next step S171, with respect to all clip information files referred from the play list file as the additionally writable candidate, entry points for coarse unit searches and entry points for fine unit searches are obtained. The total number of entry points for coarse unit searches TOTAL_EP_COARSE and the total number of entry points for fine unit searches TOTAL_EP_FINE are obtained.

More specifically, the total number of entry points for coarse unit searches TOTAL_EP_COARSE and the total number of entry points for fine unit searches TOTAL_EP_FINE can be obtained on the basis of the field NumberOfStreamPIDEntries, the field NumberOfEPCoarseEntries[k], and the field NumberOfEPFineEntries[k] in a clip information file.

At the next step S172, it is determined whether or not entry points for coarse unit searches are in excess of the upper limit value MAX_EP_COARSE when the chapter is additionally written to the play list file as the additionally writable candidate. In other words, the determination is performed on the basis of the maximum number of entry points for coarse unit searches per chapter NEEDED_EP_COARSE obtained at the foregoing step S170 and the total number of entry points for coarse unit searches TOTAL_EP_COARSE obtained at step S171 according to the following formula (9).

$$MAX\_EP\_COARSE\_TOTAL\_EP\_COARSE \geq 2NEEDED\_EP\_COARSE \quad (9)$$

If the relationship of each value does not satisfy this formula (9), namely the maximum number of entry points for coarse unit searches per chapter NEEDED_EP_COARSE is larger than the difference between the upper limit value MAX_EP_COARSE of the total value of entry points for coarse unit searches of clip information files associated with one play list file and the total number of entry points for coarse unit searches TOTAL_EP_COARSE of the clip information files associated with the play list file as the additionally writable candidate, it is determined that the chapter be not able to be additionally written to the play list file as the additionally writable candidate.

In contrast, when the determined result denotes that the relationship of each value satisfies the formula (9), the flow of the process advances to step S173. At step S173, with respect to entry points for fine unit searches, the same determination is performed. In other words, the determination is performed for the upper limit value of entry points for coarse unit searches MAX_EP_FINE on the basis of the maximum number of entry points for fine unit searches per chapter NEEDED_EP_FINE obtained at the foregoing step S170 and the total number of entry points for fine unit searches TOTAL_EP_FINE obtained at step S171 according to the following formula (10).

$$MAX\_EP\_FINE - TOTAL\_EP\_FINEE \geq NEEDED\_EP\_FINE \quad (10)$$

If the determined result denotes that the relationship of each value does not satisfy this formula (10), it is determined that the chapter be not able to be additionally written to the play list file as the additionally writable candidate. In contrast, when the relationship of each value satisfies this formula (10), it is determined that the chapter be able to be additionally written to the play list file as the additionally writable candidate.

Figure 50:
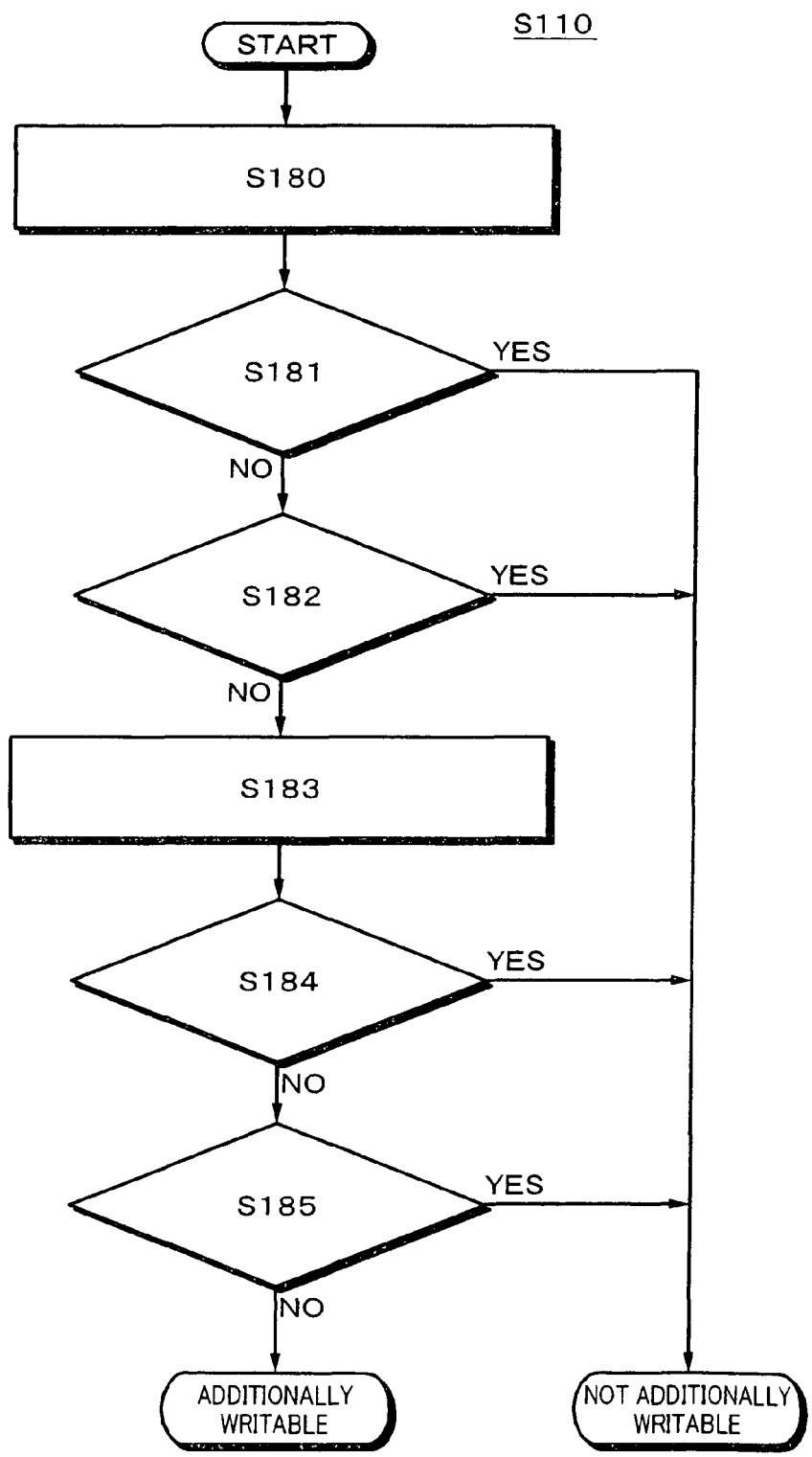
FIG. 50 is a flow chart showing an example of the additionally writing ability/inability determination process on the basis of presence or absence of unique extension data of another apparatus.

FIG. 50 shows an example of the additionally writing ability/inability determination process on the basis of presence/absence of unique extension data of another apparatus in the play list file as the additionally writable candidate according to restriction (8) at step S110.

First of all, at the first step S180, extension data of the play list file as the additionally writable candidate are searched for extension data based on the AVCDH format.

In other words, with reference to FIG. 10, the value of the field ExtensionDataStartAddress of the play list file as the additionally writable candidate is obtained and it is determined whether or not the obtained value is "0", (not shown). When the value is not "0", since the block blkExtensionData( ) of extension data exists in the play list file, the block blkExtensionData( ) is referred on the basis of the value of the field ExtensionDataStartAddress. With reference to FIG. 33, it is determined whether or not the values of the field ExtDataType and the field ExtDataVersion of the block blkPlayListExtensionData( ) of extension data in the play list file are values prescribed in the AVCHD format.

At the next step S181, it is determined whether or not extension data based on the AVCHD format exist in extension data of the play list file as the additionally writable candidate contain on the basis of the searched result at step S180.

In other words, if the value of the field ExtensionDataStartAddress in the play list file as the additionally writable candidate is "0" or the values of the field ExtDatatype and the field ExtDataVersion in the block blkPlayListExtensionData( ) of extension data are not the values defined in the AVCHD format based on the searched result at step S180, it is determined that extension data defined in the AVCHD format not exist in extension data of the play list file as the additionally writable candidate. In this case, it is determined that the chapter be not able to be additionally written to the play list file as the additionally writable candidate.

In contrast, when the determined result at step S181 denotes that extension data defined in the AVCHD format exist in extension data of the play list file as the additionally writable candidate, the flow of the process advances to step S182. At step S182, it is determined whether or not extension data other than the extension data based on the AVCDH format exist in extension data of the play list file as the additionally writable candidate. If the determined result denotes that they exist, it is determined that the chapter be not able to be additionally written to the play list file as the additionally writable candidate.

When the determined result at step S182 denotes that extension data other than the extension data based on the AVCHD format do not exist in extension data of the play list file as the additionally writable candidate, the flow of the process advances to step S183. At step S183, with reference to the block blkMakersPrivateData( ) of the block blkPlayListExtensionData( ) of extension data of the play list file as the additionally writable candidate, it is searched for data of this apparatus. In other words, with reference to FIG. 35, the field MakerID and the field MakerModelCode in the block blkMakersPrivateData( ) are searched for data that represent this apparatus.

At the next step S184, the determination is performed on the basis of the searched result at step S183. At step S184, if the determined result denotes that extension data of this apparatus do not exist on the basis of the searched result at step S183, it is determined that the chapter be not able to be additionally written to the play list file as the additionally writable candidate. In contrast, when the determined result denotes that extension data of this apparatus exist on the basis of the searched result at step S183, the flow of the process advances to step S185.

At step S185, it is determined whether or not extension data of an apparatus other than this apparatus exist in the block blkMakersPrivateData( ) on the basis of the searched result at step S183. In other words, when data other than those that represent this apparatus exist in the field MakerID and the field MakerModelCode in the block blkMakersPrivateData( ), it is determined that extension data of an apparatus other than this apparatus exist in the block blkMakersPrivateData( ).

When the determined result at step S185 denotes that extension data of an apparatus other than this apparatus exist in the block blkMakersPrivateData( ), it is determined that the chapter be not able to be additionally written to the play list file as the additionally writable candidate. In contrast, when the determined result denotes that extension data of only this apparatus exist in the block blkMakersPrivateData( ), it is determined that the chapter be able to be additionally written to the play list file as the additionally writable candidate.

At the foregoing step S181, when extension data based on the AVCHD format do not exist in the play list file as the additionally writable candidate, it is determined that the chapter be not able to be additionally written to the play list file as the additionally writable candidate. However, the determination performed at this step is not limited to this example. In other words, depending on the specifications of the recording apparatus, when no block blkMakersPrivateData exists in the play list file as the additionally writable candidate, it can be contemplated that the chapter can be additionally written to the play list file as the additionally writable candidate.

Figure 51:
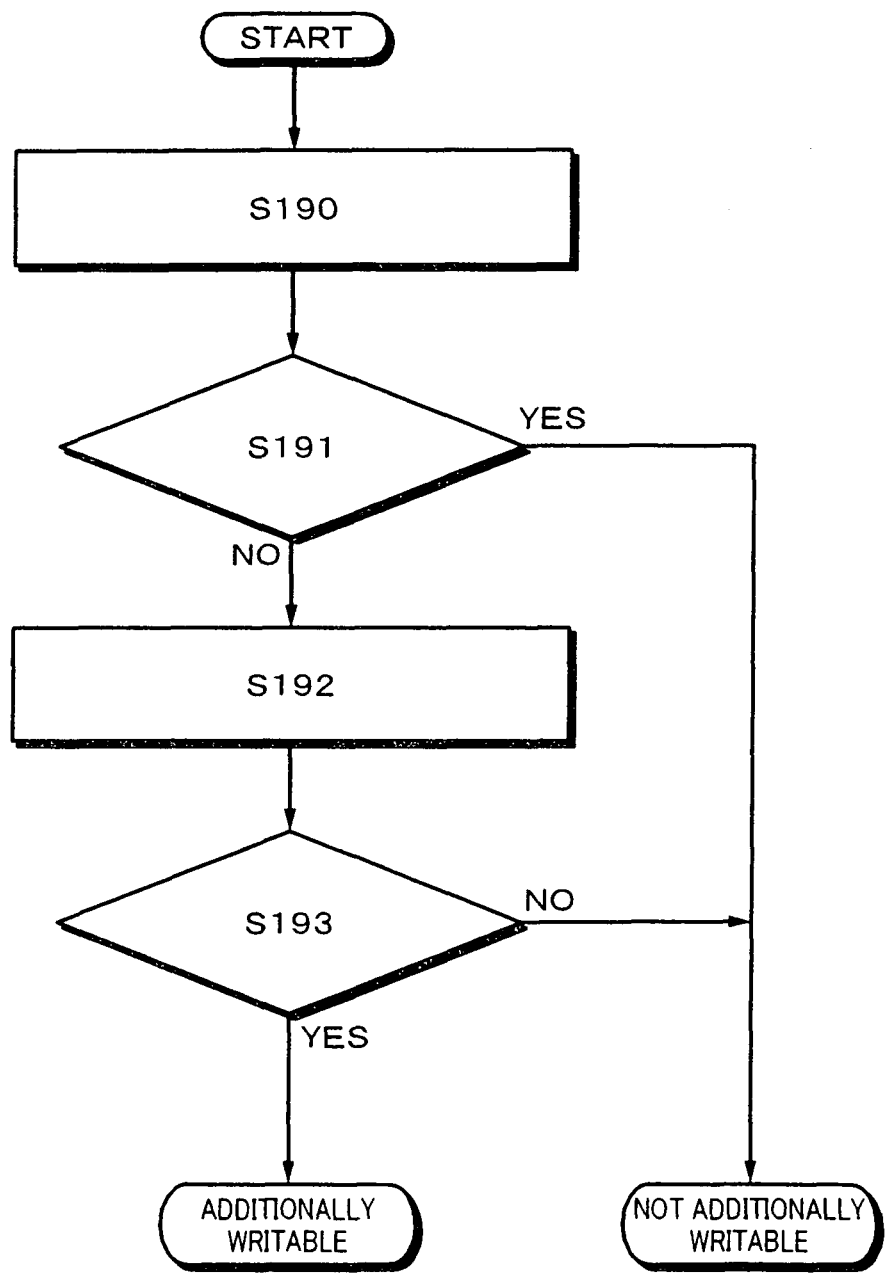
FIG. 51 is a flow chart showing an example of the additionally writing ability/inability determination process on the basis of a last update apparatus of a play list file as an additionally writable candidate.

FIG. 51 shows an example of the additionally writing ability/inability determination process on the basis of the last update apparatus of the play list file as the additionally writable candidate according to the restriction (9) at the foregoing step S111. When the last update apparatus of the play list file as the additionally writable candidate is not this local apparatus, the concept of titles and chapters of the play list file as the additionally writable candidate is different from that of this apparatus. Thus, there is a possibility of which a problem may occur when data are reproduced. When control is performed such that the chapter is additionally written to the play list file as the additionally writable candidate on the basis of information of the last update apparatus of the play list file as the additionally recordable candidate, only if the last update apparatus is this apparatus, a trouble due to the difference of the concept of titles and chapters in one play list file can be solved.

First of all, at the first step S190, extension data of the play list file as the additionally writable candidate is searched for extension data based on the AVCHD format. At the next step S191, it is determined whether or not extension data based on the AVCHD format exist in extension data of the play list file as the additionally writable candidate on the basis of the searched result at step S190. Since the processes at the step S190 and step S191 are the same as those at step S180 and step S181 described with reference to FIG. 50, for preventing complicity, their detailed description will be omitted.

When the determined result at step S191 denotes that extension data based on the AVCHD format do not exist in extension data of the play list file as the additionally writable candidate, it is determined that the chapter be unable to be additionally written to the play list file as the additionally writable candidate.

In contrast, when the determined result at step S191 denotes that extension data based on the AVCHD format exist in extension data of the play list file as the additionally writable candidate on the basis of the searched result at step S190, the flow of the process advances to step S192. At step S192, the last update apparatus of the play list file as the additionally writable candidate is checked. In other words, with reference to the block blkPlayListMeta( ) of the block blkPlayListExtensionData( ) of extension data, data of the field MakerID and the field MakerModelCode are obtained.

When the last update apparatus of the play list file as the additionally writable candidate has been checked at step S192, the flow of the process advances to step S193. At step S193, it is determined whether or not the checked last update apparatus is this apparatus. In other words, when data of the field MakerID and the field MakerModelCode in the block blkPlayListMeta( ) of the block blkPlayListExtensionData( ) of extension data represent this apparatus, it can be determined that the last update apparatus be this apparatus.

When the determined result at step S193 denotes that the last update apparatus of the play list file as the additionally writable candidate is this apparatus, it is determined that the chapter be able to be additionally written to the play list file as the additionally writable candidate. In contrast, when the determined result denotes that the last update apparatus of the play list file as the additionally writable candidate is not this apparatus, it is determined that the chapter is unable to be additionally written to the play list file as the additionally writable candidate.

Information about the last update apparatus can be also stored in the index file. Information about the last update apparatus can be contemplated to be stored, for example, in the block blkMakersPrivateData( ) in the block blkMakersPrivateData( ) of extension data of the index file. In this case, the determination of the flow chart shown in FIG. 51 may be performed with the information about the last update apparatus stored in the index file.

With respect to continuous capturing and recording according to the foregoing restriction (10), they are included in the process with respect to the file size of clip information files described with reference to FIG. 43 (step S108) and FIG. 48 and the process with respect to entry points in clip information files described with reference to FIG. 43 (step S109) and FIG. 49, their detailed description will be omitted.

In the foregoing description made with reference to FIG. 43, a sequence of determinations of whether a chapter is additionally written to a play list file as an additionally writable candidate or a play list file is newly created are performed when the record medium 20 is loaded into the recording apparatus. However, these determinations may not be performed in such a manner. Instead, whenever a chapter is additionally written, for example, the record start operation is performed, these determinations may be performed.

Figure 52:
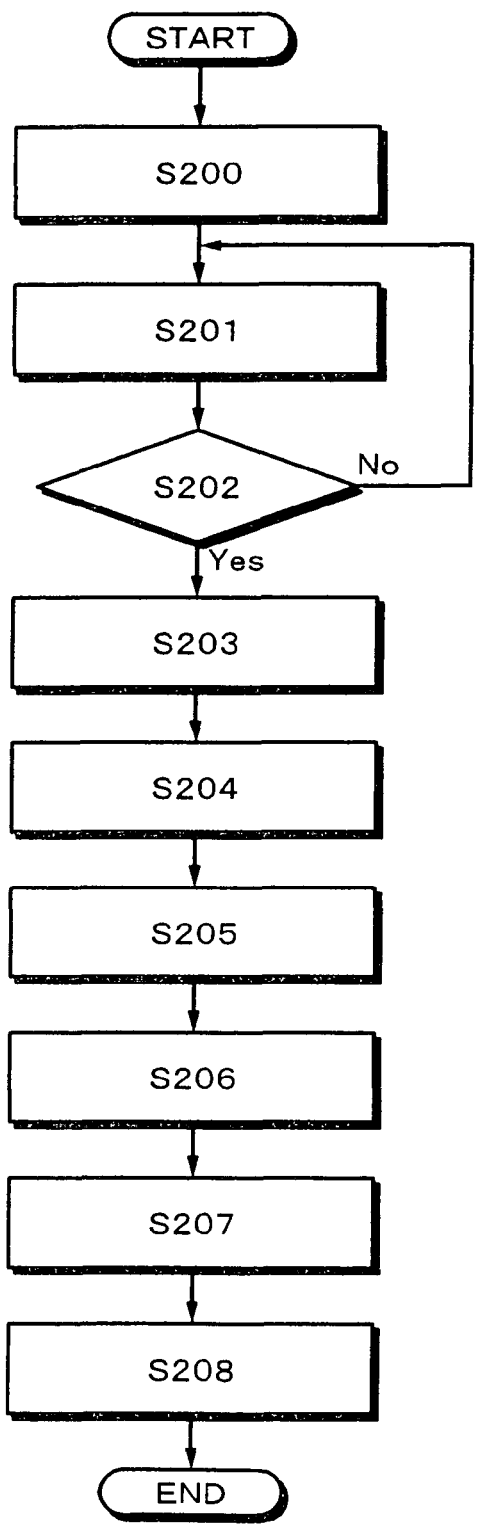
FIG. 52 is a flow chart showing an example of a recording method of a clip according to an embodiment of the present invention.

Next, a process of additionally writing a chapter to a play list file as an additionally writable candidate as the results of the processes described with reference to the foregoing FIG. 43 to FIG. 51 will be described. FIG. 52 is a flow chart showing an example of the process of additionally writing a chapter to a play list file.

When the record start operation is performed at step S200, the flow of the process advances to step S201. At step S201, a clip AV stream is started to be recorded to the record medium 20. For example, when a record start switch that is disposed in the UI section 31 and that commands the start of recording is operated, a control signal that commands the start of recording is supplied from the UI section 31 to the control section 30. The control section 30 controls each section of the recording section 10 to record base band video data that are input from the terminal 40 and base band audio data that are input from the terminal 41 to the record medium 20 on the basis of the control signal that commands the start of recording.

As the start of recording is controlled, a clip AV stream is recorded to the record medium 20 (at step S201). In other words, the input video data and audio data are compression-encoded by the video encoder 11 and the audio encoder 12, respectively, packetized as TS packets (specifically, source packets to which a predetermined header is added) by the multiplexer 13, and supplied to the stream buffer 14. When TS packets in excess of a predetermined amount have been stored in the stream buffer 14, the recording control section 15 reads the TS packets from the stream buffer 14. The TS packets that have been read are stored in a clip AV stream file that has been assigned a predetermined file name and recorded to the record medium 20.

For example, when a clip AV stream file having a file name "0000.m2ts" has been recorded on the record medium 20, a file name that is not redundant to file names of clip AV stream files that have been recorded is selected, for example, "00002.m2ts".

As a clip AV stream is recorded to the record medium 20, information that represents the relationship of the reproduction time and address of data that are recorded is created in real time by the management information processing section 16. This data are stored as data stored in the block blkEPMap( ) of the foregoing clip information file "zzzz.clpi".

At the next step S202, it is determined whether or not the record stop operation has been preformed. When the user has operated the record stop switch disposed in the UI section 31 and the determined result denotes that the recording has been stopped, the flow of the process advances to step S203. In contrast, when the recording has not been stopped, the flow of the process returns to step S201. At step S201, a clip AV stream is continued to be recorded to the record medium 20.

At step S203, as the recording has been stopped, all streams stored in the stream buffer 14 are written to the record medium 20. For example, the recording control section 15 reads all streams (TS packets) stored in the stream buffer 14 and writes them to the record medium 20 according to the record stop command received from the control section 30.

According to the record stop command, the operations of, for example, the video encoder 11 and the audio encoder 12 are stopped. At this point, to perform the first seamless connection described with reference to FIG. 13A, control is performed, for example, such that the operation of the audio encoder 12 is stopped a predetermined time after the operation of the video encoder 11 is stopped.

At the next step S204 to step S208, a clip information file with respect to the clip AV stream file written to the record medium 20 is created and the play list file as the additionally writable candidate is updated by the management information processing section 16.

First of all, at step S204, the clip information file "zzzzz.clpi" is created by the management information processing section 16. For example, the file name of the clip information file corresponds to the file name of the clip AV stream file that this clip information file represents. When the file name of the clip AV stream file is "00002.m2ts", the file name of this clip information file is "00002.clpi" of which the portion before the extension is the same as that of the file name of the clip AV stream file.

According to each syntax exemplified in FIG. 15 to FIG. 21, values of fields and flags are set and stored in the clip information file "00002.clpi" in a predetermined manner. For example, information with respect to TS packets and information with respect to the reproduction time (PTS) are created on the basis of information obtained from the multiplexer 13 by the management information processing section 16 while a clip is being recorded. In addition, information with respect to the record address on the record medium 20 is created on the basis of information obtained from the recording control section 15 by the management information processing section 16 while the clip is being recorded. Values unique to the system are based on information stored, for example, in the ROM (not shown). In addition, information of the foregoing block blkEPMap( ) that represents the relationship between the reproduction time and address is stored in the block blkCPI( ) of the clip information file "00002.clpi".

When the recording of the clip is stopped by a user's operation, the value of the flag IsCC5 in the block blkClipInfo( ) is set to "1" (binary value). Accordingly, data represented by the if statement (refer to FIG. 16) in the block blkClipInfo( ) are set in a predetermined manner.

After the clip information file has been created, the flow of the process advances to the next step S205. Processes from step S205 to step S208 are those for a play list file. In the processes from step S205 to step S208, a play item corresponding to the newly recorded clip AV stream file "00002.m2ts" is added to the play list file that exists on the record medium 20.

First of all, at step S205, the value of the field ConnectionCondition in the block blkPlayItem( ) in the play list file is set to "5" that denotes that this clip is connected to the next clip as the first seamless connection (refer to FIG. 12). At the next step S206, the value of the field NumberOfPlayItems of the play item file is incremented by "1" that denotes that one play item has been added to the play list (refer to FIG. 11).

At the next step S207, the field ClipInformationFileName, the field INTime, and the field OUTTime of the block blkPlayItem( ) are set and thereby the block blkPlayItem( ) that is added as a clip is recorded is created. The file name "00002.clpi" of the clip information file created at the foregoing step S205 is stored in the field ClipInformationFileName. Specifically, since the extension of a clip information file is fixed, the portion "00002" before the period is stored. The field INTime and the field OUTTime are information that represents times of the beginning and the last end of a video stream stored in the corresponding clip AV stream file "00002.m2ts", for example, based on information of the block blkEPMap( ) of the block blkCPI( ) in the clip information file "00002.clpi".

At the next step S208, the value of the field NumberOfPlayListMarks in the block blkPlayListMark( ) in the play list file as the additionally writable candidate is incremented by "1". Accordingly, the value of the field MarkTimeStamp added to the for loop statement is set to the value of the field INTime in the block blkPlayItem( ) at the foregoing step S207. In other words, a play list mark is placed at the beginning of the newly recorded clip. As the play list mark is placed, a chapter is formed. In other words, accordingly, the chapter is additionally written to the play list file as the additionally writable candidate.

In such a manner, the clip information file "00002.clpi" is created for the newly recorded clip AV stream file "00002.m2ts" and the play list file as the additionally writable candidate is updated. In addition, at this point, information of the block blkPlayListMeta( ) in the block blkPlayListExtensionData( ) of extension data of the play list file may be updated.

The process of writing the data stored in the stream buffer 14 at the foregoing step S203 may be performed after the process of step S208.

When a chapter is formed by newly creating a play list file, the processes after step S205 slightly differ from the foregoing processes. In other words, data of each field of the play list file are newly created. Instead, data of a template provided for a play list file may be contemplated to be changed.

Next, another embodiment of the present invention will be described. In the foregoing, an example of which the present invention is applied to a single recording apparatus (refer to FIG. 41) was described. In contrast, in the other embodiment, the present invention is applied to a video camera apparatus that has an image capturing device and an optical system that inputs light emitted from a subject to the image capturing device and that records video data to a record medium based on a captured image signal captured by the image capturing device.

FIG. 53 shows an example of the structure of a video camera apparatus 100 according to the other embodiment of the present invention. Since the structure of the recording apparatus described with reference to FIG. 41 can be nearly applied for the structure of the recording system of the video camera apparatus 100, sections that are in common with those shown in FIG. 41 are designated by the same reference numerals and their detailed description will be omitted.

In the structure shown in FIG. 53, a camera section 50 has an optical system 51, an image capturing device 52, a captured image signal processing section 53, a camera control section 54, and a display section 55 as a structure with respect to a video signal. The camera section 50 has a microphone (MIC) 56 and an audio signal processing section 57 as a structure with respect to an audio signal. By exchanging various types of control signals and information with each section of the camera section 50, the control section 30 controls the operation of the camera section 50. In addition, the camera section 50 controls the operations of the camera section 50 on the basis of control signals supplied from the UI section 31 according to user's operations.

When structured as the video camera apparatus 100, the record start operation and the record stop operation are normally performed, for example, such that a single record switch disposed in the UI section 31 is used and whenever the record switch is pressed, the start and stop of recording are alternately commanded. In this video camera apparatus 100, a disc record medium such as a recordable type DVD or Blu-ray Disc is applied for the record medium 20.

In the camera section 50, the optical system 51 has a lens system that guides light from a subject to the image capturing device 52, a diaphragm adjustment mechanism, a focus adjustment mechanism, a zoom mechanism, a shutter mechanism, and so forth. The operations of the diaphragm adjustment mechanism, the focus adjustment mechanism, the zoom mechanism, and the shutter mechanism are controlled by the camera control section 54 on the basis of control signals supplied from the control section 30.

The image capturing device 52 is composed, for example, of a CCD (Charge Coupled Device). The image capturing device 52 converts light emitted through the optical system 51 into an electric signal by photoelectric conversion, performs predetermined signal processes, and outputs the resultant signal as a captured image signal. The captured image signal processing section 53 performs predetermined signal processes for the captured image signal that is output from the image capturing device and outputs the resultant signal as base band digital video data.

For example, the captured image signal processing section 53 causes a CDS (Correlated Double Sampling) circuit to sample only a signal that has image information of the captured image signal that has been output from the image capturing device 52 and remove noise from the sampled signal, and causes an AGC (Auto Gain Control) circuit to adjust the gain of the signal. Thereafter, the captured image signal processing section 53 converts the gain adjusted signal into a digital signal by A/D conversion. Thereafter, the captured image signal processing section 53 performs a detection signal process for the digital signal, extracts components of colors of R (red), G (green), and B (blue) from the digital signal, performs processes such as γ correction, white balance correction, and so forth, and finally outputs the resultant signal as digital video data of one base band.

In addition, the captured image signal processing section 53 supplies information about the captured image signal that has been output from the image capturing device 52 to the control section 30. The control section 30 generates control signals for controlling the optical system 51 on the basis of the information and supplies the control signals to the camera control section 54. The camera control section 54 controls the focus adjustment mechanism, the diaphragm adjustment mechanism, and so forth on the basis of the control signals.

In addition, the captured image signal processing section 53 generates an image signal that causes the display section 55 that uses, for example, an LCD (Liquid Crystal Display) as a display device on the basis of the captured image signal that has been output from the image capturing device 52.

On the other hand, the microphone 56 collects a surrounding sound, converts it into an electric signal, and outputs the electric signal. An audio signal that has been output from the microphone 56 is supplied to the audio signal processing section 57. The audio signal processing section 57 performs an A/D conversion for the supplied audio signal through a limiter, performs predetermined audio signal processes such as noise reduction and sound quality correction, for the digital audio data and outputs the resultant data as base band digital audio data.

The base band digital video data that have been output from the captured image signal processing section 53 of the camera section 50 are supplied to the terminal 40 of the recording section 10. On the other hand, the base band digital audio data that have been output from the audio signal processing section 57 are supplied to the terminal 41 of the recording section 10.

When the record medium 20 is loaded into the video camera apparatus 100 in a predetermined manner for capturing, a play list file as an additionally writable candidate for a chapter based on video data that has been obtained by the capturing is identified and it is determined whether or not the chapter can be additionally written to the identified play list file as the additionally writable candidate according to the processes described with reference to FIG. 43.

For example, an index file is read from the record medium 20 under the control of the control section 30 and stored to the nonvolatile memory 17 through the management information processing section 16. The control section 30 identifies the play list file as the additionally writable candidate based on information about the index file stored in the nonvolatile memory 17 and issues a command to the recording control section 15 to read the play list file as the additionally writable candidate from the record medium 20. The play list file as the additionally writable candidate that has been read from the record medium 20 based on the command is stored in the nonvolatile memory 17 through the management information processing section 16.

The control section 30 issues a command to the recording control section 15 to read all clip information files associated with the play list file as the additionally writable candidate from the record medium 20 based on the information about the play list file as the additionally writable candidate stored in the nonvolatile memory 17. The clip information files that have been read from the record medium 20 based on this command are stored to the nonvolatile memory 17. The control section 30 performs the determinations from step S104 to step S111 in the flow chart shown in FIG. 43 on the basis of the play list file as the additionally writable candidate stored in the nonvolatile memory 17 and all the clip information files associated with the play list file as the additionally writable candidate. The determined results are stored, for example, in registers of the control section 30.

After the control section 30 has performed the determinations from step S104 to step S111, the flow of the process advances to step S112 shown in FIG. 43. At step S112, the control section 30 performs a total determination for the determined results from step S104 to step S111 and determines whether or not the chapter based on the video data that have been captured is additionally written to the play list file as the additionally writable candidate. The control section 30 controls the management information processing section 16 such that when the determined result denotes that the chapter is additionally written to the play list file, the chapter is additionally written to the play list file as the additionally writable candidate stored in the nonvolatile memory 17 and when the determined result denotes that the chapter is not additionally written to the play list file, a play list file is newly created and the chapter is recorded thereto.

When the record switch disposed in the UI section 31 is pressed in the record stop state, a control signal that commands the start of recording is supplied from the UI section 31 to the control section 30. The base band digital video signal and digital audio data that have been output from the camera section 50 are started to be recorded to the record medium 20 under the control of the control section 30.

In other words, as described above, the operations of the video encoder 11 and the audio encoder 12 are started under the control of the control section 30. The video data and the audio data are compression-encoded by the video encoder 11 and the audio encoder 12, respectively, and packetized and multiplexed in a predetermined manner as AV stream data by the multiplexer 13. The AV stream data are supplied to the recording control section 15 through the stream buffer 14 and recorded as a clip AV stream file to the record medium 20.

When the record switch of the UI section 31 is pressed again, the recording is stopped, a clip information file is created, and the play list file is updated. The management information processing section 16 creates a clip information file corresponding to a clip AV stream file recorded to the record medium 20 and a play item that refers to the clip information file on the basis of information supplied from the multiplexer 13 and the recording control section 15.

When the determined result denotes that the chapter is additionally written to the play list file as the additionally writable candidate, the created play item is added to the play list file as the additionally writable candidate and a play list mark is placed such that a chapter is formed. In contrast, when the determined result denotes that the chapter is unable to be additionally written to the play list file as the additionally writable candidate, the created play item is added to the newly created play list file and a play list mark is set.

When the record switch is pressed again in this state, recording is commanded to be started and thereby a new clip AV stream is started to be recorded to the record medium 20. When the recording is started again, the additionally recording ability/inability determination for a new chapter based on new recording to the play list file as the additionally writable candidate may be performed according to the flow chart shown in FIG. 43.

In the foregoing, the recording apparatus shown in FIG. 41 and the recording section 10 of the video camera apparatus 100 shown in FIG. 53 are described as a hardware structure. However, the present invention is not limited to such an example. In other words, the recording section 10 may be structured as software. In this case, software is pre-stored, for example, in the ROM (not shown) of the control section 30. Instead, the recording section 10 may be structured on a computer apparatus such as a personal computer. In this case, software that causes the computer apparatus to execute the recording section 10 is recorded to a record medium such as a CD-ROM or a DVD-ROM and supplied therewith. When the computer apparatus can be connected to a network, the software can be provided through the network such as the Internet.

DESCRIPTION OF REFERENCE NUMERALS

10 RECORDING SECTION
11 VIDEO ENCODER
2 AUDIO ENCODER
13 MULTIPLEXER
14 STREAM BUFFER
15 RECORDING CONTROL SECTION
16 MANAGEMENT INFORMATION PROCESSING SECTION
17 NONVOLATILE MEMORY
18 NONVOLATILE MEMORY
20 RECORD MEDIUM
30 CONTROL SECTION
31 USER INTERFACE SECTION

50 CAMERA SECTION
100 VIDEO CAMERA APPARATUS
S10 OBTAIN LENGTH OF DATA TO BE RECORDED AND SET IT TO VALUE OF ExtDataLength (n+1)
S11 CHECK ExtDataLength AND ExtDataStartAddress OF EACH OF ext_data_entry( )'S LISTED IN CURRENT blkExtensionData( ) AND OBTAIN USE STATE IN DataBlock.
S12 DOES DataBlock HAVE SUCCESSIVE FREE AREA THAT IS EQUAL TO OR LARGER THAN ExtDataLength (n+1).
S13 INCREASE LENGTH VALUE OF blkExtensionData( ) TO CREATE SUCCESSIVE FREE AREA EQUAL TO OR LARGER THAN ExtDataLength (n+1).
S14 DECIDE START ADDRESS OF AREA THAT STORES DATA AND SET IT AS ExtDataStartAddress (n+1).
S15 WRITE DATA HAVING LENGTH OF ExtDataLength (n+1) FROM ADDRESS REPRESENTED BY ExtDataStartAddress(n+1).
S16 ADD ExtDataLength(n+1) AND ExtDataStartAddress (n+1) TO ext_data_entry( ).
S20 OBTAIN ExtDataType FROM STANDARD ON WHICH DATA TO BE READ ARE BASED.
S21 OBTAIN ExtDataVersion FROM TYPE OF DATA TO BE READ BASED ON ExtDataType.
S22 READ ext_data_entry( )'S LISTED IN BlkExtensionData( ) ONE BY ONE.
S23 DO ExtDataType AND ExtDataVersion OF BOTH MATCH?
S24 READ ExtDataLength(i) AND ExtDataStartAddress(i).
S25 READ DATA HAVING LENGTH OF ExtDataLength(i) FROM ADDRESS REPRESENTED BY ExtDataStartAddress(i).
S26 HAVE ext_data_entry( )'S BEEN READ?
S27 DATA TRIED TO BE READ DO NOT EXIST.
S100 READ INDEX FILE FROM MEDIA.
S101 IDENTIFY PLAY LIST AS ADDITIONALLY WRITABLE CANDIDATE FROM INFORMATION OF INDEX FILE.
S102 READ PLAY LIST AS ADDITIONALLY WRITABLE CANDIDATE.
S103 READ ALL CLIP INFORMATION FILES ASSOCIATED WITH PLAY LIST AS ADDITIONALLY WRITABLE CANDIDATE.
S104 PERFORM ADDITIONALLY WRITING POSSIBILITY/IMPOSSIBILITY DETERMINATION ON BASIS OF NUMBER OF PLAY ITEMS.
S105 PERFORM ADDITIONALLY WRITING POSSIBILITY/IMPOSSIBILITY DETERMINATION ON BASIS OF NUMBER OF PLAY LIST MARKS.
S106 PERFORM ADDITIONALLY WRITING POSSIBILITY/IMPOSSIBILITY DETERMINATION ON BASIS OF VIDEO ATTRIBUTES.
S107 PERFORM ADDITIONALLY WRITING POSSIBILITY/IMPOSSIBILITY DETERMINATION ON BASIS OF FILE SIZE OF PLAY LIST FILE AS ADDITIONALLY WRITABLE CANDIDATE.
S108 PERFORM ADDITIONALLY WRITING POSSIBILITY/IMPOSSIBILITY DETERMINATION ON BASIS OF TOTAL FILE SIZE OF CLIP INFORMATION FILES REFERRED FROM PLAY LIST FILE AS ADDITIONALLY WRITABLE CANDIDATE.
S109 PERFORM ADDITIONALLY WRITING POSSIBILITY/IMPOSSIBILITY DETERMINATION ON BASIS OF TOTAL NUMBER OF EP'S IN CLIP INFORMATION FILES REFERRED FROM PLAY LIST FILE AS ADDITIONALLY WRITABLE CANDIDATE.
S110 PERFORM ADDITIONALLY WRITING POSSIBILITY/IMPOSSIBILITY DETERMINATION ON BASIS OF PRESENCE/ABSENCE OF UNIQUE EXTENSION DATA OF ANOTHER APPARATUS IN PLAY LIST FILE AS ADDITIONALLY WRITABLE CANDIDATE.
S111 PERFORM ADDITIONALLY WRITING POSSIBILITY/IMPOSSIBILITY DETERMINATION ON BASIS OF LAST UPDATE APPARATUS IN PLAY LIST FILE AS ADDITIONALLY WRITABLE CANDIDATE.
S112 DETERMINE WHETHER OR NOT AT LEAST ONE OF RESULTS DENOTES THAT ADDITIONAL WRITING BE IMPOSSIBLE.
S120 IS NUMBER OF PLAY ITEMS OF PLAY LIST AS ADDITIONALLY WRITABLE CANDIDATE SMALLER THAN UPPER LIMIT VALUE?
S130 IS NUMBER OF PLAY LIST MARKS OF PLAY LIST AS ADDITIONALLY WRITABLE CANDIDATE SMALLER THAN UPPER LIMIT VALUE?
S140 OBTAIN RECORDING IMAGE SIZE, RECORDING ASPECT, RECORDING FRAME RATE, AND RECORDING SCANNING TYPE ACCORDING TO CURRENT CAPTURING/RECORDING MODE.
S141 OBTAIN IMAGE WIDTH OF VIDEO FROM CLIP INFORMATION FILE TO WHICH FIRST PLAY ITEM OF PLAY LIST AS ADDITIONALLY WRITABLE CANDIDATE REFERS.
S142 OBTAIN VIDEO IMAGE HEIGHT AND SCANNING TYPE FROM CLIP INFORMATION FILE TO WHICH FIRST PLAY ITEM OF PLAY LIST AS ADDITIONALLY WRITABLE CANDIDATE REFERS.
S143 OBTAIN ASPECT RATIO OF VIDEO FROM CLIP INFORMATION FILE TO WHICH FIRST PLAY ITEM OF PLAY LIST AS ADDITIONALLY WRITABLE CANDIDATE REFERS.
S144 OBTAIN FRAME RATE OF VIDEO FROM CLIP INFORMATION FILE TO WHICH FIRST PLAY ITEM OF PLAY LIST AS ADDITIONALLY WRITABLE CANDIDATE REFERS.
S145 DO VIDEO ATTRIBUTE MATCH THOSE OF PLAY LIST AS ADDITIONALLY WRITABLE CANDIDATE?
S150 OBTAIN INCREASED NUMBER OF BYTES OF FILE SIZE OF PLAY LIST FILE PER CHAPTER PRE-CALCULATED. [SIZE_1CHAP=INCREASED NUMBER OF BYTES]
S151 OBTAIN NUMBER OF PLAY ITEMS OF PLAY LIST AS ADDITIONALLY WRITABLE CANDIDATE.

[PI_REMAIN=UPPER LIMIT VALUE−NUMBER OF PLAY ITEMS]

S152 OBTAIN NUMBER OF PLAY LIST MARKS OF PLAY LIST AS ADDITIONALLY WRITABLE CANDIDATE. [MARK_REMAIN=UPPER LIMIT VALUE−NUMBER OF PLAY LIST MARKS]
S153 TREAT SMALLER ONE OF NUMBER OF PLAY ITEMS AND NUMBER OF PLAY LIST MARKS THAT CAN BE ADDITIONALLY WRITTEN AS NUMBER OF CHAPTERS THAT CAN BE ADDITIONALLY WRITTEN. [CHAP_REMAIN=MIN(PI_REMAIN, MARK_REMAIN)] S154 OBTAIN FILE SIZE OF PLAY LIST AS ADDITIONALLY WRITABLE CANDIDATE USING FUNCTION OF FILE SYSTEM.

[SIZE_REMAIN=UPPER LIMIT VALUE−FILE SIZE]

S155 SIZE_1CHAP×CHAP_REMAIN≤SIZE_REMAIN?
S160 OBTAIN MAXIMUM SIZE PER CLIP INFORMATION FILE PRE-CALCULATED.

[SIZE_1CLIP=MAXIMUM SIZE].

S161 OBTAIN FILE SIZE OF CLIP INFORMATION FILES REFERRED FROM PLAY LIST AS ADDITIONALLY WRITABLE CANDIDATE AND CALCULATE TOTAL NUMBER OF BYTES OF CLIP INFORMATION FILES REFERENCED. [SIZE_TOTAL_CLIP=TOTAL NUMBER OF BYTES]

S162 CLIP_SUM_MAX−SIZE_TOTAL_CLIP≥SIZE_1CLIP?

S170 OBTAIN MAXIMUM NUMBER OF EP'S PER CHAPTER PRE-CALCULATED. [NEEDED_EP_COARSE, NEEDED_EP_FINE]

S171 OBTAIN EP'S OF CLIP INFORMATION FILES REFERRED FROM PLAY LIST AS ADDITIONALLY WRITABLE CANDIDATE AND CALCULATE TOTAL NUMBER OF EP'S REFERENCED. [TOTAL_EP_COARSE, TOTAL_EP_FINE]

S172 MAX_EP_COARSE−TOTAL_EP_COARSE NEEDED_EP_COARSE?

S173 MAX_EP_FINE−TOTAL_EP_FINE NEEDED_EP_FINE?

S180 SEARCH EXTENSION DATA OF PLAY LIST AS ADDITIONALLY WRITABLE CANDIDATE FOR EXTENSION DATA IN AVCHD FORMAT.

S181 DO EXTENSION DATA OF AVCHD EXIST?

S182 DO EXTENSION DATA EXIST AS WELL AS THOSE OF AVCHD?

S183 SEARCH EXTENSION DATA OF MAKER'S UNIQUE EXTENSION DATA OF AVCHD FORMAT FOR DATA OF THIS APPARATUS.

S184 DO NOT DATA OF THIS APPARATUS EXIST?

S185 DO DATA EXIST AS WELL AS DATA OF THIS APPARATUS?

S190 CHECK WHETHER OR NOT EXTENSION DATA IN AVCHD FORMAT EXIST BASED ON EXTENSION DATA OF PLAY LIST AS ADDITIONALLY WRITABLE CANDIDATE.

S191 DO NOT EXTENSION DATA OF AVCHD EXIST?

S192 CHECK LAST UPDATE APPARATUS BASED ON EXTENSION DATA OF PLAY LIST AS ADDITIONALLY WRITABLE CANDIDATE.

S193 IS LAST UPDATE APPARATUS THIS APPARATUS?

S200 PERFORM RECORD START OPERATION.

S201 RECORD STREAM TO RECORD MEDIUM.

S202 RECORD STOP OPERATION?

S203 WRITE STREAM STORED IN STREAM BUFFER TO RECORD MEDIUM.

S204 CREATE CLIP INFORMATION FILE.

S205 SET ConnectionCondition=5.

S206 NumberOfPlayItems+1

S207 SET ClipInfromationFileName, inTime, AND OutTime and CREATE blkPlayItem( ).

S208 SET MarkTimeStamp TO INTime AND ADD ONE blkPlayListMark.

The invention claimed is:

1. In a recording apparatus which multiplexes video data and audio data and records multiplexed data to a record medium, the recording apparatus comprising:
a data input section which inputs the video data and the audio data;
a record command input section which inputs a record start command and a record stop command for the video data and the audio data;
a recording section which multiplexes the video data and the audio data and records the multiplexed stream as a stream file to the record medium; and
a management information creation section which creates reproduction management information for controlling a reproduction of the stream file recorded on the record medium, the reproduction management information being composed of first management information which represents attribute information of the stream file and second management information which contains information which represents a reproduction method for the stream file, and
the management information creation section determines whether or not the information which represents the reproduction method for the stream file recorded on the record medium is additionally written to a predetermined entry of the second management information contained in an existing entry of the reproduction management information automatically in response to the record start command for recording the video data and audio data by the record command input section based on the existing entry of the reproduction management information,
wherein the determination whether or not the information is additionally written by the management information creation section is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

2. In the recording apparatus as set forth in claim 1, wherein when the management information creation section has determined that the information which represents the reproduction method for the stream file recorded on the record medium according to the record start command by the record command input section be not additionally written to the predetermined entry of the second management information contained in the existing entry of the reproduction management information, the management information creation section newly creates the second management information which contains the information which represents the reproduction method for the stream file recorded on the record medium according to the record start command by the record command input section.

3. In the recording apparatus as set forth in claim 1, wherein the management information creation section treats a latest updated entry of the second management information of the second management information updated as the stream file is recorded as the predetermined entry of the second management information.

4. In the recording apparatus as set forth in claim 1, wherein the first management information is composed of a file which stores information which represents at least a relationship of reproduction time information and address information of the stream file recorded to the record medium,
the second management information is composed of a file which contains at least one entry of the reproduction region information which is capable of storing mark information which represents reproduction time information for the stream file, and the second management information represents the reproduction method for the stream file with reference to the first management information from the reproduction region information.

5. In the recording apparatus as set forth in claim 4, wherein the determination whether or not the information is additionally written by the management information creation section is based on the number of entries of the mark information stored in the predetermined entry of the second management information.

6. In the recording apparatus as set forth in claim 5, wherein when the management information creation section has determined that the number of entries of the mark information stored in the predetermined entry of the second management information is smaller than a pre-set upper limit for a number of entries, the management information creation section performs the determination whether or not the information is additionally written such that the information which represents the reproduction method for the stream file recorded on the record medium is additionally written to the predetermined entry of the second management information.

7. In the recording apparatus as set forth in claim 4, wherein the first management information also stores video attribute information which represents an attribute of the video data stored in the corresponding stream file.

8. In the recording apparatus as set forth in claim 7, wherein when at least one of frame size, aspect ratio, frame rate, and scanning system of the video attribute based on the recording mode does not match that of the video attribute stored in the entry of the first management information, the management information creation section performs the determination whether or not the information is additionally written such that the information which represents the reproduction method for the stream file recorded on the record medium according to the record start command by the record command input section is not additionally written to the predetermined entry of the second management information.

9. In the recording apparatus as set forth in claim 4, wherein the determination whether or not the information is additionally written by the management information creation section is based on a file size of the predetermined entry of the second management information.

10. In the recording apparatus as set forth in claim 9, wherein when the management information creation section has determined that the file size of the second management information be not in excess of a pre-set upper limit based on the reproduction region information and a data size of the mark information created as the single stream file has been recorded, the management information creation section performs the determination whether or not the information is additionally written such that the information which represents the reproduction method for the stream file recorded on the record medium is additionally written to the predetermined entry of the second management information.

11. In the recording apparatus as set forth in claim 4, wherein the determination whether or not the information is additionally written by the management information creation section is based on a total file size of all entries of the first management information referred from the predetermined entry of the second management information.

12. In the recording apparatus as set forth in claim 11, wherein when the management information creation section has determined that the total file size of the first management information referred from the predetermined entry of the second management information is not in excess of a pre-set upper limit based on a data size of the first management information created as the single stream file has been recorded for an assured minimum continuous time, the management information creation section performs the determination whether or not the information is additionally written such that the information which represents the reproduction method for the stream file recorded on the record medium is additionally written to the predetermined entry of the second management information.

13. In the recording apparatus as set forth in claim 4, wherein the determination whether or not the information is additionally written by the management information creation section is based on a number of entries of information which represents a relationship of reproduction time information and address information contained in all entries of the first management information referred from the predetermined entry of the second management information.

14. In the recording apparatus as set forth in claim 13, wherein when the management information creation section has determined that a total of all entries of the first management information referred from the second management information is not in excess of a pre-set upper limit of the entries of the second management information based on a number of entries of the information which represents the reproduction time information and the address information contained in the first management information created as the single stream file has been recorded for an assured minimum continuous time, the management information creation section performs determination whether or not the information is additionally written such that the information which represents the reproduction method for the stream file recorded on the record medium to the predetermined entry of the second management information.

15. In the recording apparatus as set forth in claim 4, wherein the second management information is capable of storing unique apparatus information, and the determination whether or not the information is additionally written by the management information creation section is based on the unique apparatus information stored in the predetermined entry of the second management information.

16. In the recording apparatus as set forth in claim 15, wherein if the management information creation section has determined that the unique apparatus information has been created by the recording apparatus or another apparatus equivalent thereto when the unique apparatus information has been stored in the predetermined entry of the second management information, the management information creation section performs the determination whether or not the information is additionally written such that the information which represents the reproduction method for the stream file recorded on the record medium is additionally written to the predetermined entry of the second management information.

17. In the recording apparatus as set forth in claim 4, wherein
the second management information is capable of also storing information which represents a last update apparatus of the second management information, and
the determination whether or not the information is additionally written by the management information creation section is based on the last update information stored in the predetermined entry of the second management information.

18. In the recording apparatus as set forth in claim 17, wherein
if it has been determined that when the last update apparatus information has been stored in the predetermined entry of the second management information, the last update apparatus information represents the recoding apparatus, the determination whether or not the information is additionally written is performed such that the information which represents the reproduction method for the stream file recorded on the record medium is additionally written to the predetermined entry of the second management information.

19. In the recording apparatus as set forth in claim 1, wherein
when the management information creation section has determined that the number of entries of the reproduction region information which has been stored in the predetermined entry of the second management information be smaller than a pre-set upper limit for a number of entries, the management information creation section performs the determination whether or not the information is additionally written such that the information which represents the reproduction method for the stream file recorded on the record medium is additionally written to the predetermined entry of the second management information.

20. In the recording apparatus as set forth in claim 1, wherein
the management information creation section performs the determination whether or not the information is additionally written for one or a plurality of items, and
when at least one of the items of the determination whether or not the information is additionally written represents an additionally writing inability state, the management information creation section performs the determination whether or not the information is additionally written such that the second management information corresponding to the stream file recorded on the record medium be not additionally written to the predetermined entry of the second management information.

21. In the recording apparatus as set forth in claim 20, wherein
the one or plurality of items include at least one item of a number of entries of reproduction region information stored in the predetermined entry of the second management information, a number of entries of mark information stored in the predetermined entry of the second management information, video attribute information stored in the first management information, a file size of the predetermined entry of the second management information, a total file size of all the entries of the first management information referred from the predetermined entry of the second management information, a number of entries of information which represents a relationship of reproduction time information and address information contained in all the entries of the first management information referred from the predetermined entry of the second management information, unique apparatus information stored in the predetermined entry of the second management information, and last update apparatus information stored in the predetermined entry of the second management information.

22. In a recording method of multiplexing video data and audio data and recording multiplexed data to a record medium, the recording method comprising:
a record command input step of inputting a record start command and a record stop command for the video data and the audio data that have been input to a data input section;
a recording step of multiplexing the video data and the audio data and recording the multiplexed stream as a stream file to the record medium; and
a management information creation step of generating reproduction management information for controlling a reproduction of the stream file recorded on the record medium, the reproduction management information being composed of first management information which represents attribute information of the stream file and second management information which contains information which represents a reproduction method for the stream file,
the management information creation step being performed by determining whether or not the information which represents the reproduction method for the stream file recorded on the record medium is additionally written to a predetermined entry of the second management information contained in an existing entry of the reproduction management information automatically in response to the record start command for recording the video data and audio data by the record command input section based on the existing entry of the reproduction management information,
wherein the determining whether or not the information is additionally written by the management information creation step is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

23. A non-transitory medium containing a recording program of causing a computer apparatus to execute a recording method of multiplexing video data and audio data and recording multiplexed data to a record medium, the recording method comprising:
a record command input step of inputting a record start command and a record stop command for the video data and the audio data that have been input to a data input section;
a recording step of multiplexing the video data and the audio data and recording the multiplexed stream as a stream file to the record medium; and a management information creation step of generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information automatically in response to the record start command for recording the video data and audio data by the record command input section based on the existing entry of the reproduction management information, wherein the determining whether or not the information is additionally written by the management information creation step is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

24. In an image capturing apparatus which multiplexes video data captured and obtained from a subject by an image capturing section and audio data collected and obtained by a sound collecting section and records multiplexed video data and audio data to a record medium, the image capturing apparatus comprising:

the image capturing section which captures the image of the subject and outputs the video data;

the sound collecting section which collects a sound and outputs audio data, a recording section which multiplexes the video data and the audio data and records the multiplexed stream as a stream file to the record medium;

an operation section which accepts user's operations for a record start command and a record stop command for the video data and the audio data to the record medium; and a management information creation section which creates reproduction management information for controlling a reproduction of the stream file recorded on the record medium, the reproduction management information being composed of first management information which represents attribute information of the stream file and second management information which contains information which represents a reproduction method for the stream file, the management information creation section determines whether or not the information which represents the reproduction method for the stream file recorded on the record medium is additionally written to a predetermined entry of the second management information contained in an existing entry of the reproduction management information automatically in response to the record start command for recording the video data and audio data corresponding to the user's operations to the operation section based on the existing entry of the reproduction management information, wherein the determination whether or not the information is additionally written by the management information creation section is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

25. In the image capturing apparatus as set forth in claim 24, wherein when the management information creation section has determined that the information which represents the reproduction method for the stream file recorded on the record medium according to the record start command by the operation section be not additionally written to the predetermined entry of the second management information contained in the existing entry of the reproduction management information, the management information creation section newly creates the second management information which contains the information which represents the reproduction method for the stream file recorded on the record medium according to the record start command by the operation section.

26. In the image capturing apparatus as set forth in claim 24, wherein the management information creation section treats a latest updated entry of the second management information of the second management information updated as the stream file is recorded as the predetermined entry of the second management information.

27. In the image capturing apparatus as set forth in claim 24, wherein the first management information is composed of a file which stores information which represents at least a relationship of reproduction time information and address information of the stream file recorded to the record medium, the first management information is composed of a file which contains at least one entry of the reproduction region information which is capable of storing mark information which represents reproduction time information for the stream file, and the second management information represents the reproduction method for the stream file with reference to the first management information from the reproduction region information.

28. In the image capturing apparatus as set forth in claim 27, wherein the determination whether or not the information is additionally written by the management information creation section is based on the number of entries of the mark information stored in the predetermined entry of the second management information.

29. In the image capturing apparatus as set forth in claim 28, wherein
when the management information creation section has determined that the number of entries of the mark information stored in the predetermined entry of the second management information is smaller than a pre-set upper limit for a number of entries, the management information creation section performs the determination whether or not the information is additionally written such that the information which represents the reproduction method for the stream file recorded on the record medium is additionally written to the predetermined entry of the second management information.

30. In the image capturing apparatus as set forth in claim 27, wherein
the first management information also stores video attribute information which represents an attribute of the video data stored in the corresponding stream file, and
the determination whether or not the information is additionally written by the management information creation section is based on the video attribute information stored in the first management information.

31. In the image capturing apparatus as set forth in claim 30, wherein
the determination whether or not the information is additionally written by the management information creation section is based both on a video attribute based on a current recording mode and a video attribute stored in at least one entry of the first management information referred from the predetermined entry of the second management information.

32. In the image capturing apparatus as set forth in claim 31, wherein
when at least one of frame size, aspect ratio, frame rate, and scanning system of the video attribute based on the recording mode does not match that of the video attribute stored in the entry of the first management information, the management information creation section performs the determination whether or not the information is additionally written such that the information which represents the reproduction method for the stream file recorded on the record medium according to the record start command by the operation section is not additionally written to the predetermined entry of the second management information.

33. In the image capturing apparatus as set forth in claim 27, wherein
the determination whether or not the information is additionally written by the management information creation section is based on a file size of the predetermined entry of the second management information.

34. In the image capturing apparatus as set forth in claim 33, wherein
when the management information creation section has determined that the file size of the second management information be not in excess of a pre-set upper limit based on the reproduction region information and a data size of the mark information created as the single stream file has been recorded, the management information creation section performs the determination whether or not the information is additionally written such that the information which represents the reproduction method for the stream file recorded on the record medium is additionally written to the predetermined entry of the second management information.

35. In the image capturing apparatus as set forth in claim 27, wherein
the determination whether or not the information is additionally written by the management information creation section is based on a total file size of all entries of the first management information referred from the predetermined entry of the second management information.

36. In the image capturing apparatus as set forth in claim 25, wherein
when the management information creation section has determined that the total file size of the first management information referred from the predetermined entry of the second management information is not in excess of a pre-set upper limit based on a data size of the first management information created as the single stream file has been recorded for an assured minimum continuous time, the management information creation section performs the determination whether or not the information is additionally written such that the information which represents the reproduction method for the stream file recorded on the record medium is additionally written to the predetermined entry of the second management information.

37. In the image capturing apparatus as set forth in claim 27, wherein
the second management information refers to the first management information from the reproduction region information so as to control reproduction of the stream file, and
the determination whether or not the information is additionally written by the management information creation section is based on a number of entries of information which represents a relationship of reproduction time information and address information contained in all entries of the first management information referred from the predetermined entry of the second management information.

38. In the image capturing apparatus as set forth in claim 37, wherein
when the management information creation section has determined that a total of all entries of the first management information referred from the second management information is not in excess of a pre-set upper limit of the entries of the second management information based on a number of entries of the information which represents the reproduction time information and the address information contained in the first management information created as the single stream file has been recorded for an assured minimum continuous time, the management information creation section performs the determination whether or not the information is additionally written such that the information which represents the reproduction method for the stream file recorded on the record medium to the predetermined entry of the second management information.

39. In the image capturing apparatus as set forth in claim 27, wherein
the second management information is capable of storing unique apparatus information, and
the determination whether or not the information is additionally written by the management information creation section is based on the unique apparatus information stored in the predetermined entry of the second management information.

40. In the image capturing apparatus as set forth in claim 39, wherein
if the management information creation section has determined that the unique apparatus information has been created by the image capturing apparatus or another apparatus equivalent thereto when the unique apparatus information has been stored in the predetermined entry of the second management information,
the management information creation section performs the determination whether or not the information is additionally written such that the information which represents the reproduction method for the stream file recorded on the record medium is additionally written to the predetermined entry of the second management information.

41. In the image capturing apparatus as set forth in claim 27, wherein
the second management information is capable of also storing information which represents a last update apparatus of the second management information, and
the determination whether or not the information is additionally written by the management information creation section is based on the last update information stored in the predetermined entry of the second management information.

42. In the image capturing apparatus as set forth in claim 41, wherein
if it has been determined that when the last update apparatus information has been stored in the predetermined entry of the second management information, the last update apparatus information represents the recoding apparatus, the determination whether or not the information is additionally written is performed such that the information which represents the reproduction method for the stream file recorded on the record medium is additionally written to the predetermined entry of the second management information.

43. In the image capturing apparatus as set forth in claim 24, wherein
when the management information creation section has determined that the number of entries of the reproduction region information which has been stored in the predetermined entry of the second management information be smaller than a pre-set upper limit for a number of entries, the management information creation section performs the determination whether or not the information is additionally written such that the information which represents the reproduction method for the stream file recorded on the record medium is additionally written to the predetermined entry of the second management information.

44. In the image capturing apparatus as set forth in claim 24, wherein
the management information creation section performs the determination whether or not the information is additionally written for one or a plurality of items, and
when at least one of the items of the determination whether or not the information is additionally written represents an additionally writing inability state, the management information creation section performs the determination whether or not the information is additionally written such that the second management information corresponding to the stream file recorded on the record medium be not additionally written to the predetermined entry of the second management information.

45. In the image capturing apparatus as set forth in claim 44, wherein
the one or plurality of items include at least one item of a number of entries of reproduction region information stored in the predetermined entry of the second management information, a number of entries of mark information stored in the predetermined entry of the second management information, video attribute information stored in the first management information, a file size of the predetermined entry of the second management information, a total file size of all the entries of the first management information referred from the predetermined entry of the second management information, a number of entries of information which represents a relationship of reproduction time information and address information contained in all the entries of the first management information referred from the predetermined entry of the second management information, unique apparatus information stored in the predetermined entry of the second management information, and last update apparatus information stored in the predetermined entry of the second management information.

46. In an image capturing method of multiplexing video data captured and obtained from a subject by an image capturing section and audio data collected and obtained by a sound collecting section and recording multiplexed video data and audio data to a record medium,
the image capturing method comprising:
a recording step of multiplexing the video data and the audio data captured and obtained from an subject by the image capturing section and the audio data collected and obtained by the sound collecting section and recording the multiplexed stream as a stream file to the record medium;
an accepting step of accepting user's operations for a record start command and a record stop command for the video data and the audio data to the record medium against an operation section; and
a management information creation step for generating reproduction management information for controlling a reproduction of the stream file recorded on the record medium, the reproduction management information being composed of first management information which represents attribute information of the stream file and second management information which contains information which represents a reproduction method for the stream file,
the management information creation step being performed by determining whether or not the information which represents the reproduction method for the stream file recorded on the record medium is additionally written to a predetermined entry of the second management information contained in an existing entry of the reproduction management information automatically in response to the record start command for recording the video data and audio data corresponding to the user's operations to the operation section based on the existing entry of the reproduction management information,
wherein the determining whether or not the information is additionally written by the management information creation step is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

47. A non-transitory medium containing an image capturing program of causing a computer apparatus to execute an image capturing method of multiplexing video data captured and obtained from a subject by an image capturing section and audio data collected and obtained by a sound collecting section and recording multiplexed video data and audio data to a record medium, the image capturing method comprising:
- a recording step of multiplexing the video data and the audio data captured and obtained from an subject by the image capturing section and the audio data collected and obtained by the sound collecting section and recording the multiplexed stream as a stream file to the record medium;
- an accepting step of accepting user's operations for a record start command and a record stop command for the video data and the audio data to the record medium against an operation section; and
- a management information creation step for generating reproduction management information for controlling a reproduction of the stream file recorded on the record medium, the reproduction management information being composed of first management information which represents attribute information of the stream file and second management information which contains information which represents a reproduction method for the stream file, the management information creation step being performed by determining whether or not the information which represents the reproduction method for the stream file recorded on the record medium is additionally written to a predetermined entry of the second management information contained in an existing entry of the reproduction management information automatically in response to the record start command for recording the video data and audio data corresponding to the user's operations to the operation section based on the existing entry of the reproduction management information, wherein the determining whether or not the information is additionally written by the management information creation step is based on a number of entries of reproduction region information stored in the predetermined entry of the second management information, each of the entries of reproduction region information designating a reproduction region with a reproduction start point and a reproduction end point which are set to the stream file and having an arbitrary reproduction time length, and a result of a determination whether video attribute information about encoding included in the first management information referred from the predetermined entry of the second management information contained in the existing entry matches that of video attribute information about encoding based on a current recording mode.

\* \* \* \* \*